(12) United States Patent
Miyaki et al.

(10) Patent No.: US 12,061,076 B2
(45) Date of Patent: Aug. 13, 2024

(54) PROBE FOR THREE-DIMENSIONAL COORDINATE MEASURING DEVICE, THREE-DIMENSIONAL COORDINATE MEASURING DEVICE, THREE-DIMENSIONAL COORDINATE MEASURING SYSTEM, AND THREE-DIMENSIONAL COORDINATE MEASURING METHOD

(71) Applicant: Keyence Corporation, Osaka (JP)

(72) Inventors: Yuji Miyaki, Osaka (JP); Shuji Shimonaka, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 295 days.

(21) Appl. No.: 17/743,503

(22) Filed: May 13, 2022

(65) Prior Publication Data

US 2022/0412721 A1 Dec. 29, 2022

(30) Foreign Application Priority Data

Jun. 25, 2021 (JP) ................................ 2021-106155
Nov. 29, 2021 (JP) ................................ 2021-193501

(51) Int. Cl.
*G01B 11/00* (2006.01)
*G01B 5/012* (2006.01)

(52) U.S. Cl.
CPC ............ *G01B 11/007* (2013.01); *G01B 5/012* (2013.01)

(58) Field of Classification Search
CPC . G01B 11/00–03; G01B 11/007; G01B 11/14; G01B 5/012
See application file for complete search history.

(56) References Cited

U.S. PATENT DOCUMENTS 4,177,568 A * 12/1979 Werner ................ G01B 11/007
                                                                                  33/561
4,972,597 A * 11/1990 Kadosaki ............. G01B 11/007
                                                                                  33/561

(Continued)

FOREIGN PATENT DOCUMENTS

| CN | 112345835 A * 2/2021 ............ G01B 11/00 |
| WO | WO-2005098355 A1 * 10/2005 ........... G01B 21/047 |

OTHER PUBLICATIONS

Machine Translation of WO 2005098355 A1 (Year: 2005).*
Machine Translation of CN 112345835 A (Year: 2020).*

*Primary Examiner* — Nguyen Q. Ha
(74) *Attorney, Agent, or Firm* — Kilyk & Bowersox, P.L.L.C.

(57) ABSTRACT

Provided are a probe for a three-dimensional coordinate measuring device that enable calculation of coordinates of a measurement point of a measurement target with high accuracy. The probe is used in the three-dimensional coordinate measuring device that calculates coordinates of a measurement point of a measurement target. In the probe, a plurality of markers whose image is captured by an imaging unit are held by a probe holding unit. A stylus, which is brought into contact with the measurement target to specify the measurement point, is attached to the probe holding unit. The stylus has a predetermined positional relationship with respect to the plurality of measurement markers. The probe holding unit is connected to a probe casing in a freely movable manner. A magnetic sensor that outputs a signal corresponding to a displacement amount of the probe holding unit with respect to the probe casing is provided inside the probe casing.

13 Claims, 34 Drawing Sheets

(56) References Cited

U.S. PATENT DOCUMENTS

| | | | |
|---|---|---|---|
| 5,755,038 A * | 5/1998 | McMurtry | G01B 5/012 33/559 |
| 9,557,159 B2 | 1/2017 | Ikebuchi | |
| 9,778,023 B2 | 10/2017 | Osaki et al. | |
| 9,885,564 B2 | 2/2018 | Osaki et al. | |
| 10,145,666 B2 | 12/2018 | Jansson | |
| 10,267,620 B2 | 4/2019 | Ikebuchi | |
| 10,422,628 B2 * | 9/2019 | Shimaoka | G01B 5/012 |
| 10,619,994 B2 | 4/2020 | Futami | |
| 10,739,126 B2 | 8/2020 | Ikebuchi | |
| 10,817,160 B2 | 10/2020 | Ikebuchi | |
| 10,837,757 B1 | 11/2020 | Ikebuchi | |

* cited by examiner

PROBE FOR THREE-DIMENSIONAL COORDINATE MEASURING DEVICE, THREE-DIMENSIONAL COORDINATE MEASURING DEVICE, THREE-DIMENSIONAL COORDINATE MEASURING SYSTEM, AND THREE-DIMENSIONAL COORDINATE MEASURING METHOD

CROSS-REFERENCE TO RELATED APPLICATIONS

The present application claims foreign priority based on Japanese Patent Application No. 2021-106155, filed Jun. 25, 2021, and No. 2021-193501, filed Nov. 29, 2021, the contents of which are incorporated herein by references.

BACKGROUND OF THE INVENTION

1. Field of the Invention

The present invention relates to a probe for a three-dimensional coordinate measuring device, which is used in a three-dimensional coordinate measuring device calculating coordinates of a measurement point on a measurement target and is configured to specify the measurement point in contact with the measurement target, a three-dimensional coordinate measuring device, a three-dimensional coordinate measuring system, and a three-dimensional coordinate measuring method.

2. Description of Related Art

A contact-type three-dimensional coordinate measuring device uses a probe having a contact part. The contact part of the probe is brought into contact with a measurement target, and a contact position between the measurement target and the contact part is calculated. As a plurality of positions on the measurement target are calculated, dimensions of a desired portion of the measurement target is measured.

A three-dimensional coordinate measuring device described in JP2015-190927A includes a placement table, a probe, and an imaging unit. A contact part of the probe is brought into contact with a measurement target placed on the placement table. The imaging unit captures an image of a plurality of markers provided on the probe to generate image data.

Coordinates of a contact position between the measurement target and the contact part are calculated based on the image data.

If dimensions of each part of the probe change due to moisture absorption or a change in temperature environment, there is a possibility that a positional relationship between the plurality of markers also changes. The change in the positional relationship between the plurality of markers lowers the calculation accuracy of the coordinates of the contact position between the measurement target and the contact part. Thus, in the above-described three-dimensional coordinate measuring device, a plurality of members constituting the probe are made of a material having low moisture absorption properties and a small linear expansion coefficient in order to reduce a dimensional change of each part of the probe caused by the moisture absorption and the change in temperature environment.

SUMMARY OF THE INVENTION

However, the dimensional change of each part of the probe sometimes occurs due to factors other than the moisture absorption and the change in temperature environment. For example, the above-described probe is provided with a grip section. A user operates the probe while gripping the grip section. Thus, when the user strongly presses the contact part against the measurement target, there is a high possibility that distortion occurs in each part of the probe. In this case, a positional relationship between the plurality of markers and the contact part can change, and the calculation accuracy of the coordinates of the contact position between the measurement target and the contact part is lowered.

An object of the present invention is to provide a probe for a three-dimensional coordinate measuring device, a three-dimensional coordinate measuring device, a three-dimensional coordinate measuring system, and a three-dimensional coordinate measuring method that enable calculation of coordinates of a measurement point of a measurement target with high accuracy.

(1) A probe for a three-dimensional coordinate measuring device according to one embodiment of the invention is a probe used in a three-dimensional coordinate measuring device that calculates coordinates of a measurement point in a measurement target based on a plurality of measurement markers whose image has been captured by an imaging unit, and includes: a probe holding unit that holds the plurality of measurement markers; a stylus that includes a contact part, which is brought into contact with the measurement target to specify the measurement point, and is attached to the probe holding unit with a predetermined positional relationship with respect to the plurality of measurement markers; a probe casing that accommodates at least a part of the probe holding unit so as to enable capturing of an image of the plurality of measurement markers from an outside; an elastic body that is accommodated in the probe casing and arranged between the probe casing and the probe holding unit so as to enable the probe holding unit to be displaced with respect to the probe casing in accordance with the contact between the stylus and the measurement target; and a displacement sensor that is accommodated in the probe casing and outputs a signal corresponding to a displacement amount of the probe holding unit with respect to the probe casing as a signal related to the contact between the stylus and the measurement target.

In the probe, the contact part of the stylus is brought into contact with the measurement target to specify the measurement point. The stylus and the probe holding unit are coupled to each other with the predetermined positional relationship. The coordinates of the specified measurement point are calculated based on image data obtained by capturing an image of the plurality of markers of the probe holding unit and the positional relationship between the stylus and the probe holding unit. Thus, a load applied from the contact part of the stylus to the measurement target when the measurement point is specified is desirably set to a degree that does not cause a change in the positional relationship between the stylus and the probe holding unit, that is, a degree that does not cause excessive distortion in the stylus and the probe holding unit.

According to the above configuration, the probe holding unit is connected to the probe casing so as to be freely movable by the elastic body. Thus, when the contact part of the stylus is brought into contact with the measurement point that needs to be specified on the measurement target, the stylus and the probe holding unit move relative to the probe casing even before distortion occurs in the stylus and the probe holding unit. At this time, a change in the output of the displacement sensor represents a change in the positional relationship between the stylus and the probe holding unit, and the probe casing. Therefore, according to the output of the displacement sensor, it is possible to appropriately determine a timing for specifying the measurement point so as to prevent the excessive distortion in the stylus and the probe holding unit based on a degree of the change in the positional relationship between the stylus and the probe holding unit, and the probe casing. As a result, it is possible to calculate the coordinates of the measurement point of the measurement target with high accuracy regardless of the rigidity of the stylus and the probe holding unit.

(2) The probe for a three-dimensional coordinate measuring device may further include a probe control unit that outputs a trigger signal to permit a start of processing for calculating the coordinates of the specified measurement point in a case where a predetermined reference condition for the displacement amount corresponding to the signal output from the displacement sensor is satisfied when the measurement point is specified.

In this case, a timing for specifying the measurement point is appropriately determined based on the signal output from the displacement sensor and the reference condition, and the coordinates of the measurement point are calculated with high accuracy.

(3) The probe for a three-dimensional coordinate measuring device may further include a condition setting unit that sets the reference condition, the reference condition may be that a difference between the displacement amount corresponding to the signal output from the displacement sensor and a reference displacement amount is within a predetermined allowable range, and the condition setting unit may set a displacement amount corresponding to a signal output from the displacement sensor at one time point as the reference displacement amount, and update the reference displacement amount with a displacement amount corresponding to a signal output from the displacement sensor after a predetermined time has elapsed from the one time point.

Since the reference displacement amount is updated after the predetermined time has elapsed from the one time point in this case, the timing for specifying the measurement point is more appropriately determined based on the signal output from the displacement sensor and the reference condition.

(4) The probe for a three-dimensional coordinate measuring device may further include a motion detection unit that detects a motion of the probe casing, and the probe control unit may output the trigger signal in a case where a motion amount per unit time detected by the motion detection unit is equal to or smaller than a first threshold, and does not necessarily output the trigger signal in a case where the motion amount per unit time detected by the motion detection unit is larger than the first threshold.

In this case, the trigger signal is not output in a case where the motion of the probe casing greatly changes beyond the first threshold. Therefore, for example, the trigger signal is prevented from being erroneously output in a state in which the contact part is not brought into contact with the measurement point, and a decrease in calculation accuracy of the coordinates of the measurement point is suppressed.

(5) The probe for the three-dimensional coordinate measuring device may further include a posture detection unit that detects a posture of the probe casing, and the probe control unit may output the trigger signal in a case where a change amount of the posture per unit time detected by the posture detection unit is equal to or smaller than a second threshold, and does not necessarily output the trigger signal in a case where the change amount of the posture per unit time detected by the posture detection unit is larger than the second threshold.

In this case, the trigger signal is not output in a case where the posture of the probe casing greatly changes beyond the second threshold. Therefore, the decrease in the calculation accuracy of the coordinates of the measurement point is suppressed.

(6) The displacement sensor may include a magnetic sensor. According to the magnetic sensor, it is possible to detect the displacement amount of the probe holding unit with respect to the probe casing regardless of a displacement fluctuation direction. Therefore, an increase in the number of components of the probe is suppressed. In addition, the probe holding unit and the probe casing can be independently designed or manufactured in a case where a sensor capable of detecting the displacement in a non-contact manner, such as the magnetic sensor, is used, and thus, a design difficulty level or a manufacturing difficulty level is lowered.

(7) A grip section that can be gripped by a user may be connected to the probe casing. In this case, the user can easily specify a desired portion of the measurement target as the measurement point while gripping the grip section.

(8) A three-dimensional coordinate measuring device according to one embodiment of the invention includes: the above-described probe for a three-dimensional coordinate measuring device; an imaging unit that captures an image of the plurality of measurement markers of the probe based on an output signal of the displacement sensor; and a calculation unit that calculates coordinates of the measurement point specified by the contact part based on image data indicating the image of the plurality of measurement markers captured by the imaging unit.

The three-dimensional coordinate measuring device includes the above-described probe. As a result, it is possible to calculate the coordinates of the measurement point of the measurement target with high accuracy regardless of the rigidity of the stylus and the probe holding unit.

(9) A three-dimensional coordinate measuring system according to one embodiment of the invention includes: a three-dimensional coordinate measuring device that calculates coordinates of a measurement point in a measurement target based on a plurality of measurement markers whose image has been captured by an imaging unit; a probe including the plurality of measurement markers; a robot configured to be capable of moving while holding the probe; and a robot control unit, the probe including: a probe holding unit that holds the plurality of measurement markers; a stylus that includes a contact part, which is brought into contact with the measurement target to specify the measurement point, and is attached to the probe holding unit with a predetermined positional relationship with respect to the plurality of measurement markers; a probe casing that is held by the robot and accommodates at least a part of the probe holding unit so as to enable capturing of an image of the plurality of measurement markers from an outside; an elastic body that is accommodated in the probe casing and arranged between the probe casing and the probe holding unit so as to enable the probe holding unit to be displaced with respect to the probe casing in accordance with the contact between the stylus and the measurement target; a displacement sensor that is accommodated in the probe casing and outputs a signal corresponding to a displacement amount of the probe holding unit with respect to the probe casing as a signal related to the contact between the stylus and the measurement target; and a probe control unit that outputs a trigger signal to permit a start of processing for calculating the coordinates of the specified measurement point in a case where a predetermined reference condition for the displacement amount corresponding to the signal output from the displacement sensor is satisfied when the measurement point is specified, the robot control unit controlling an operation of the robot based on an output of the displacement sensor, and the three-dimensional coordinate measuring device including: the imaging unit that captures an image of the plurality of measurement markers of the probe in a case where the trigger signal is output from the probe control unit; and a calculation unit that calculates the coordinates of the measurement point specified by the contact part based on image data indicating the image of the plurality of measurement markers captured by the imaging unit.

In the three-dimensional coordinate measuring system, the probe casing of the probe is held by the robot. As the robot moves the probe casing, the contact part of the stylus is brought into contact with the measurement target, and the measurement point is specified. The stylus and the probe holding unit are coupled to each other with the predetermined positional relationship. The coordinates of the specified measurement point are calculated based on image data obtained by capturing an image of the plurality of markers of the probe holding unit and the positional relationship between the stylus and the probe holding unit. Thus, a load applied from the contact part of the stylus to the measurement target when the measurement point is specified is desirably set to a degree that does not cause a change in the positional relationship between the stylus and the probe holding unit, that is, a degree that does not cause excessive distortion in the stylus and the probe holding unit.

According to the above configuration of the probe, the probe holding unit is connected to the probe casing so as to be freely movable by the elastic body. Thus, when the contact part of the stylus is brought into contact with the measurement point that needs to be specified on the measurement target, the stylus and the probe holding unit move relative to the probe casing even before distortion occurs in the stylus and the probe holding unit. At this time, a change in the output of the displacement sensor represents a change in the positional relationship between the stylus and the probe holding unit, and the probe casing.

The robot operates based on the output of the displacement sensor. According to the output of the displacement sensor, it is possible to operate the robot so as to prevent the excessive distortion in the stylus and the probe holding unit based on a degree of the change in the positional relationship between the stylus and the probe holding unit, and the probe casing. In addition, the timing for specifying the measurement point can be appropriately determined.

In the above-described three-dimensional coordinate measuring device, the trigger signal for calculating the coordinates of the specified measurement point is output in the case where the displacement amount corresponding to the signal output from the displacement sensor satisfies the predetermined reference condition. As a result, the image of the plurality of measurement markers is captured, and the coordinates of the measurement point are calculated based on the image data obtained by the capturing. In this manner, a timing for specifying the measurement point is appropriately determined based on the signal output from the displacement sensor and the reference condition, and the coordinates of the measurement point are calculated with high accuracy. As a result, it is possible to calculate the coordinates of the measurement point of the measurement target with high accuracy regardless of the rigidity of the stylus and the probe holding unit.

(10) A three-dimensional coordinate measuring method according to one embodiment of the invention is a three-dimensional coordinate measuring method for calculating coordinates of a measurement point in a measurement target using a probe, the probe including: a probe holding unit that holds a plurality of measurement markers; a stylus that includes a contact part, which is brought into contact with the measurement target to specify the measurement point, and is attached to the probe holding unit with a predetermined positional relationship with respect to the plurality of measurement markers; a probe casing that accommodates at least a part of the probe holding unit so as to enable capturing of an image of the plurality of measurement markers from an outside; an elastic body that is accommodated in the probe casing and arranged between the probe casing and the probe holding unit so as to enable the probe holding unit to be displaced with respect to the probe casing in accordance with the contact between the stylus and the measurement target; and a displacement sensor that is accommodated in the probe casing and outputs a signal corresponding to a displacement amount of the probe holding unit with respect to the probe casing as a signal related to the contact between the stylus and the measurement target. The three-dimensional coordinate measuring method includes: a step of outputting a trigger signal to permit a start of processing for calculating the coordinates of the specified measurement point in a case where a predetermined reference condition for the displacement amount corresponding to the signal output from the displacement sensor is satisfied when the measurement point is specified; and a step of capturing an image of the plurality of measurement markers in response to the output of the trigger signal and calculating the coordinates of the measurement point specified by the contact part based on image data indicating the captured image of the plurality of measurement markers.

In the above-described probe, the contact part of the stylus is brought into contact with the measurement target to specify the measurement point. The stylus and the probe holding unit are coupled to each other with the predetermined positional relationship. The coordinates of the specified measurement point are calculated based on image data obtained by capturing an image of the plurality of markers of the probe holding unit and the positional relationship between the stylus and the probe holding unit. Thus, a load applied from the contact part of the stylus to the measurement target when the measurement point is specified is desirably set to a degree that does not cause a change in the positional relationship between the stylus and the probe holding unit, that is, a degree that does not cause excessive distortion in the stylus and the probe holding unit.

The probe holding unit is connected to the probe casing so as to be freely movable by the elastic body. Thus, in a case where the contact part of the stylus is brought into contact with the measurement point that needs to be specified on the measurement target, the stylus and the probe holding unit move relative to the probe casing even before distortion occurs in the stylus and the probe holding unit. At this time, a change in the output of the displacement sensor represents a change in the positional relationship between the stylus and the probe holding unit, and the probe casing. Therefore, according to the output of the displacement sensor, it is possible to appropriately determine a timing for specifying the measurement point so as to prevent the excessive distortion in the stylus and the probe holding unit based on a degree of the change in the positional relationship between the stylus and the probe holding unit, and the probe casing.

In the above-described three-dimensional coordinate measuring method, the trigger signal for calculating the coordinates of the specified measurement point is output in the case where the displacement amount corresponding to the signal output from the displacement sensor satisfies the predetermined reference condition. The image of the plurality of measurement markers is captured in response to the output of the trigger signal, and the coordinates of the measurement point are calculated based on the image data obtained by the capturing. In this manner, a timing for specifying the measurement point is appropriately determined based on the signal output from the displacement sensor and the reference condition, and the coordinates of the measurement point are calculated with high accuracy. As a result, it is possible to calculate the coordinates of the measurement point of the measurement target with high accuracy regardless of the rigidity of the stylus and the probe holding unit.

(11) The three-dimensional coordinate measuring method may further include a step of setting the reference condition, and the reference condition may be that a difference between the displacement amount corresponding to the signal output from the displacement sensor and a reference displacement amount is within a predetermined allowable range, and the step of setting the reference condition may include setting a displacement amount corresponding to a signal output from the displacement sensor at one time point as the reference displacement amount, and updating the reference displacement amount with a displacement amount corresponding to a signal output from the displacement sensor after a predetermined time has elapsed from the one time point.

Since the reference displacement amount is updated after the predetermined time has elapsed from the one time point in this case, the timing for specifying the measurement point is more appropriately determined based on the signal output from the displacement sensor and the reference condition.

(12) The three-dimensional coordinate measuring method may further include a step of detecting a motion of the probe casing, and the step of outputting the trigger signal may be performed in a case where a motion amount per unit time detected in the step of detecting the motion is equal to or smaller than a first threshold, and is not necessarily performed in a case where the motion amount per unit time detected in the step of detecting the motion is larger than the first threshold.

In this case, the trigger signal is not output in a case where the motion of the probe casing greatly changes beyond the first threshold. Therefore, for example, the trigger signal is prevented from being erroneously output in a state in which the contact part is not brought into contact with the measurement point, and a decrease in calculation accuracy of the coordinates of the measurement point is suppressed.

(13) The three-dimensional coordinate measuring method may further include a step of detecting a posture of the probe casing, and the step of outputting the trigger signal may be performed in a case where a change amount of the posture per unit time detected in the step of detecting the posture is equal to or smaller than a second threshold, and is not necessarily performed in a case where the change amount of the posture per unit time detected in the step of detecting the posture is larger than the second threshold.

In this case, the trigger signal is not output in a case where the posture of the probe casing greatly changes beyond the second threshold. Therefore, the decrease in the calculation accuracy of the coordinates of the measurement point is suppressed.

According to the present invention, it is possible to calculate the coordinates of the measurement point of the measurement target with high accuracy.

DETAILED DESCRIPTION OF PREFERRED EMBODIMENTS

1. First Embodiment

Figure 1:
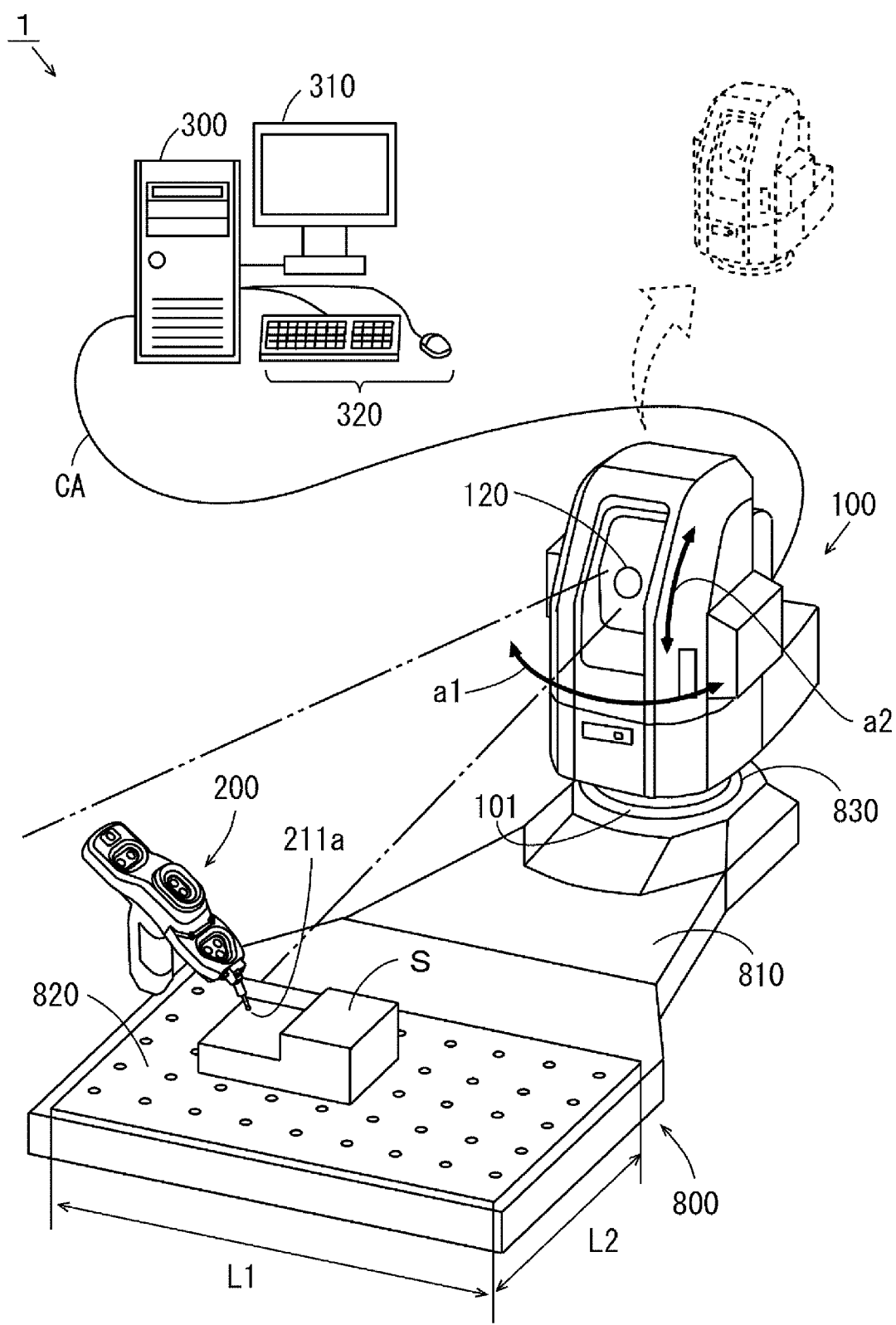
FIG. 1 is a schematic view illustrating a use example of a three-dimensional coordinate measuring device according to a first embodiment.

[1] Basic Configuration and Use Example of Three-Dimensional Coordinate Measuring Device FIG. 1 is a schematic view illustrating a use example of a three-dimensional coordinate measuring device according to a first embodiment. As illustrated in FIG. 1, a three-dimensional coordinate measuring device 1 according to the present embodiment mainly includes an imaging head 100, a probe 200, a processing device 300, and a holding unit 800.

The holding unit 800 includes an installation section 810, a placement table 820, and a head base 830. The installation section 810 has a flat plate shape formed to extend in one direction, and is installed on an installation surface such as an upper surface of a table. In addition, the installation section 810 is made of aluminum, iron, or alloys thereof, and has high rigidity. The placement table 820 is provided at one end part of the installation section 810. The placement table 820 of this example is an optical surface plate having a substantially rectangular shape, and is connected to an upper surface of the installation section 810 so as to have a short side parallel to the longitudinal direction of the installation section 810 (direction in which the installation section 810 extends). A length L1 of a long side of the placement table 820 is, for example, about 450 mm, and a length L2 of the short side of the placement table 820 is, for example, about 300 mm. The placement table 820 may have a square shape, a circular shape, or an elliptical shape. A measurement target S is placed on the placement table 820.

A head base 830 is provided at the other end part of the installation section 810. The head base 830 of this example is configured to enable attachment and detachment of a bottom (hereinafter, referred to as a head bottom) 101 of the imaging head 100. In a state in which the head bottom 101 is attached onto the head base 830, the imaging head 100 is fixed to the installation section 810 and the placement table 820. On the other hand, in a state in which the head bottom 101 is detached from the head base 830, the imaging head 100 is separated from the installation section 810 and the placement table 820 as indicated by a dotted arrow in FIG. 1.

The probe 200 is configured to be portable by a user. The probe 200 is provided with a contact part 211a. The user brings the contact part 211a of the probe 200 into contact with a desired portion of the measurement target S in order to specify a measurement point. Accordingly, the contact part 211a specifies the measurement point, and the contact portion of the measurement target S with the contact part 211a is specified as the measurement point.

The imaging head 100 is provided with a movable camera 120 therein. The movable camera 120 captures an image of a plurality of markers eq (FIG. 14 and the like), which will be described later, provided on the probe 200. In addition, the imaging head 100 is connected to the processing device 300 through a cable CA. The processing device 300 is, for example, a personal computer, and is connected to a main body display unit 310 and a main body operation unit 320. In the processing device 300, coordinates of a measurement point on the measurement target S are calculated based on image data (hereinafter, referred to as measurement image data) obtained by capturing an image of the probe 200 by the movable camera 120 and reference image data to be described later. As coordinates of one or a plurality of measurement points on the measurement target S are calculated, a physical quantity of the measurement target S is measured based on calculation results thereof.

In a case where the user moves the probe 200, a direction of an imaging field of view of the movable camera 120 follows the movement of the probe 200 as indicated by bold solid arrows a1 and a2 in FIG. 1. That is, the direction of the movable camera 120 changes such that the probe 200 is located within the imaging field of view of the movable camera 120 when the probe 200 moves. The movable camera 120 according to the present embodiment has a depth of field that covers at least a space on the placement table 820 in a state in which the imaging field of view is directed toward the placement table 820. Thus, the three-dimensional coordinate measuring device 1 has a wide measurable area including the space on the placement table 820. Therefore, a range of a position and a posture of the probe 200 required to measure the physical quantity of the measurement target S is expanded.

As described above, the physical quantity of the measurement target S placed on the placement table 820 can be measured in the state in which the imaging head 100 is attached onto the head base 830 according to the three-dimensional coordinate measuring device 1 of the embodiment. Meanwhile, the convenience of the three-dimensional coordinate measuring device 1 is improved if the physical quantity can also be measured for the measurement target S that is not placed on the placement table 820. Therefore, the three-dimensional coordinate measuring device 1 according to the present embodiment further includes a reference stand for fixing the imaging head 100 on an installation surface such as a floor surface in addition to the above configuration. A use example of the three-dimensional coordinate measuring device 1 using the reference stand will be described.

Figure 2:
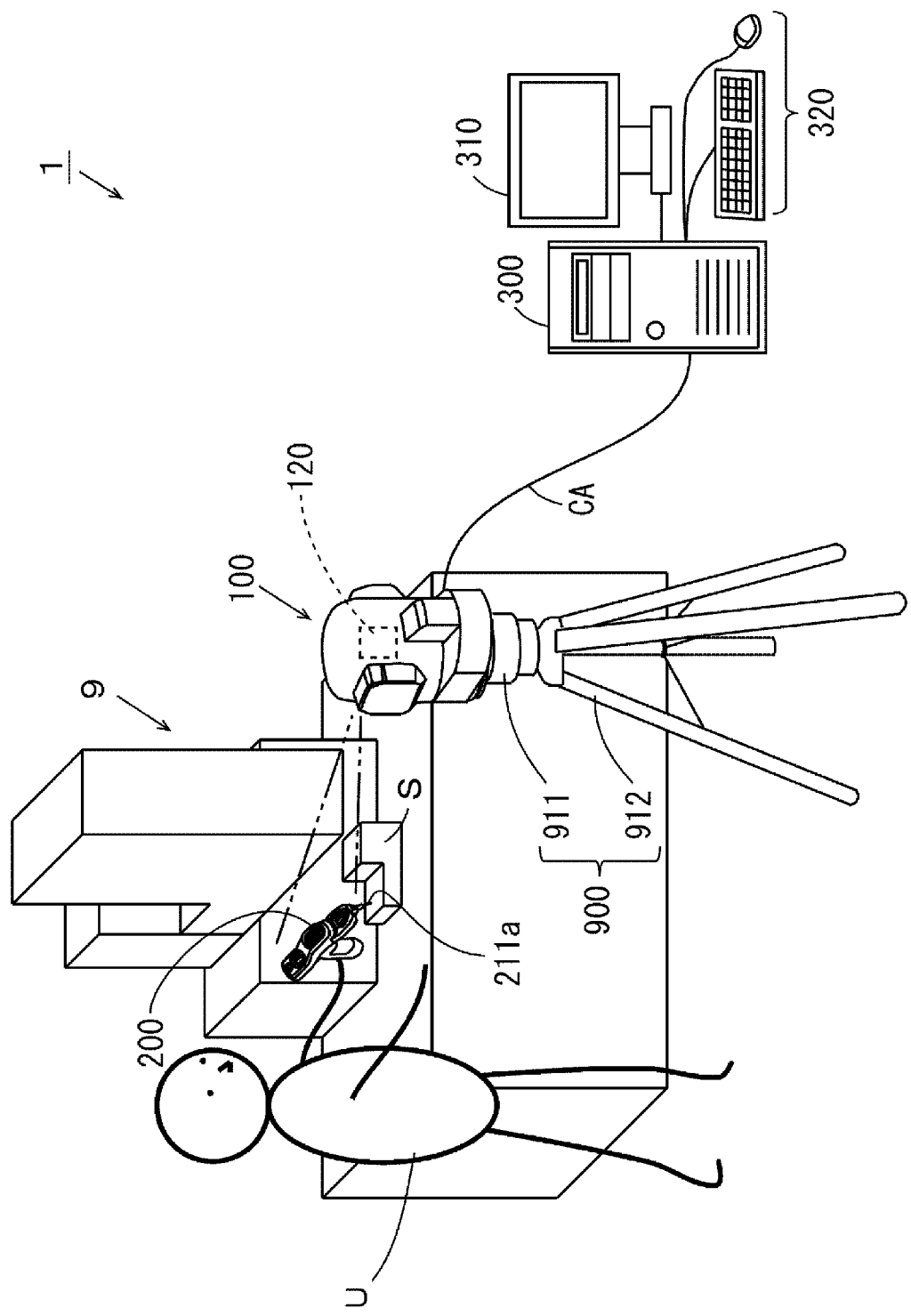
FIG. 2 is a schematic view illustrating another use example of the three-dimensional coordinate measuring device according to the first embodiment.

FIG. 2 is a schematic view illustrating another use example of the three-dimensional coordinate measuring device 1 according to the first embodiment. As illustrated in FIG. 2, the three-dimensional coordinate measuring device 1 further includes a reference stand 900. The reference stand 900 is a tripod, and includes a head base 911 and a leg section 912. The head base 911 is provided at an upper end part of the leg section 912, and is configured to enable attachment and detachment of the head bottom 101 of the imaging head 100, which is similar to the head base 830 of the holding unit 800 in FIG. 1. In this example, the imaging head 100 detached from the holding unit 800 in FIG. 1 is attached onto the head base 911 of the reference stand 900.

According to the above reference stand 900, a user U can fix the imaging head 100, for example, on the floor surface such that the measurement target S set in a processing machine 9 is located within a range of the depth of field of the movable camera 120. The processing machine 9 is, for example, a processing device such as a lathe, a milling machine, or an electric discharge machine. Alternatively, the user U can fix the imaging head 100, for example, on the floor surface such that the measurement target S placed on the floor surface is located within the range of the depth of field of the movable camera 120. Therefore, the user U can also measure the physical quantity of the measurement target S that is not placed on the placement table 820 of FIG. 1 by bringing the contact part 211a of the carried probe 200 into contact with the desired portion of the measurement target S. Note that, in a case where the user U moves while carrying the probe 200, the direction of the imaging field of view of the movable camera 120 follows the movement of the probe 200 in this example as well, which is similar to the example of FIG. 1. Hereinafter, a configuration of each unit of the three-dimensional coordinate measuring device 1 will be described in detail.

[2] Configurations of Imaging Head 100 and Processing Device 300

Figure 3:
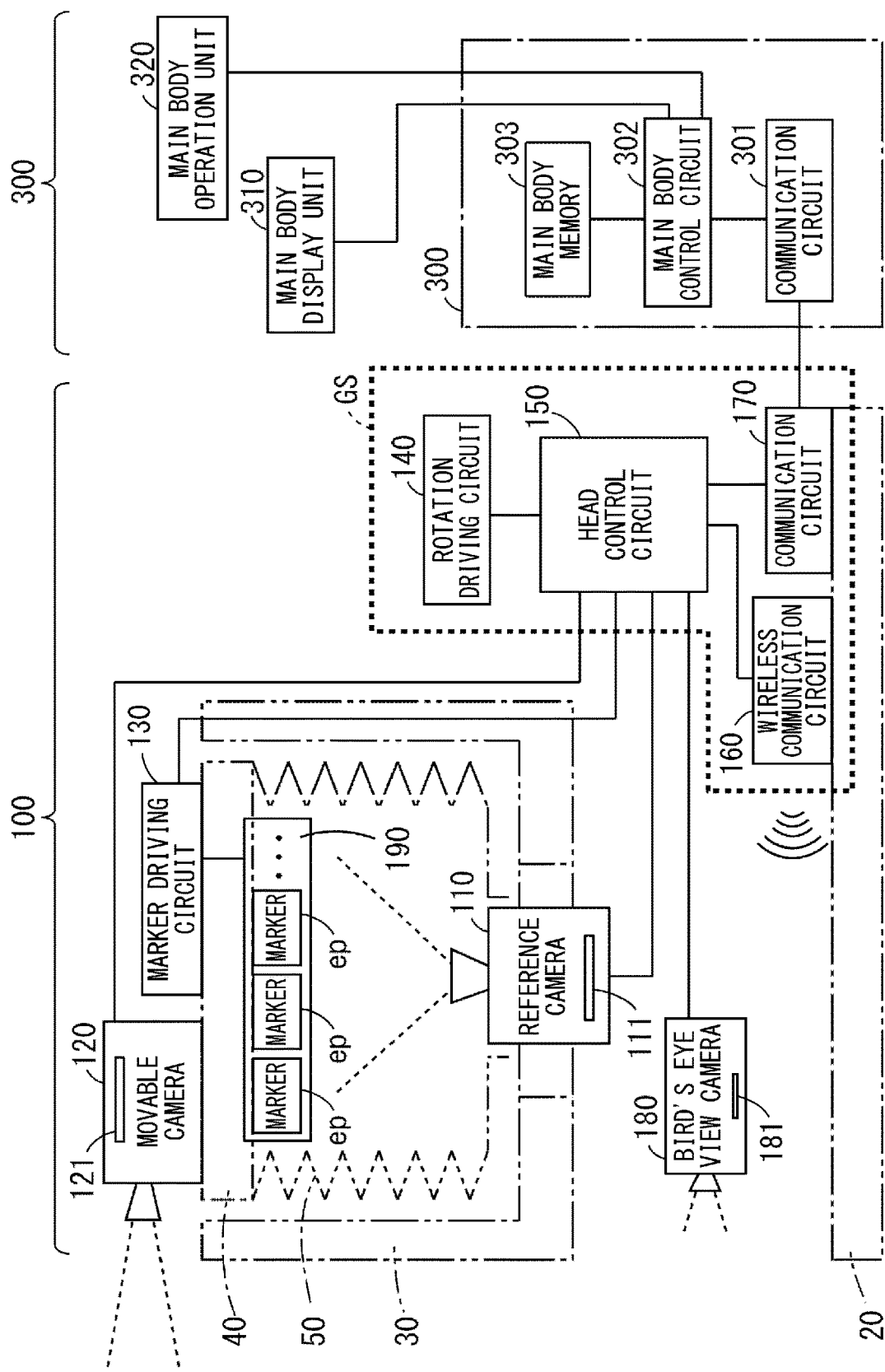
FIG. 3 is a block diagram illustrating configurations of an imaging head and a processing device.
Figure 4:
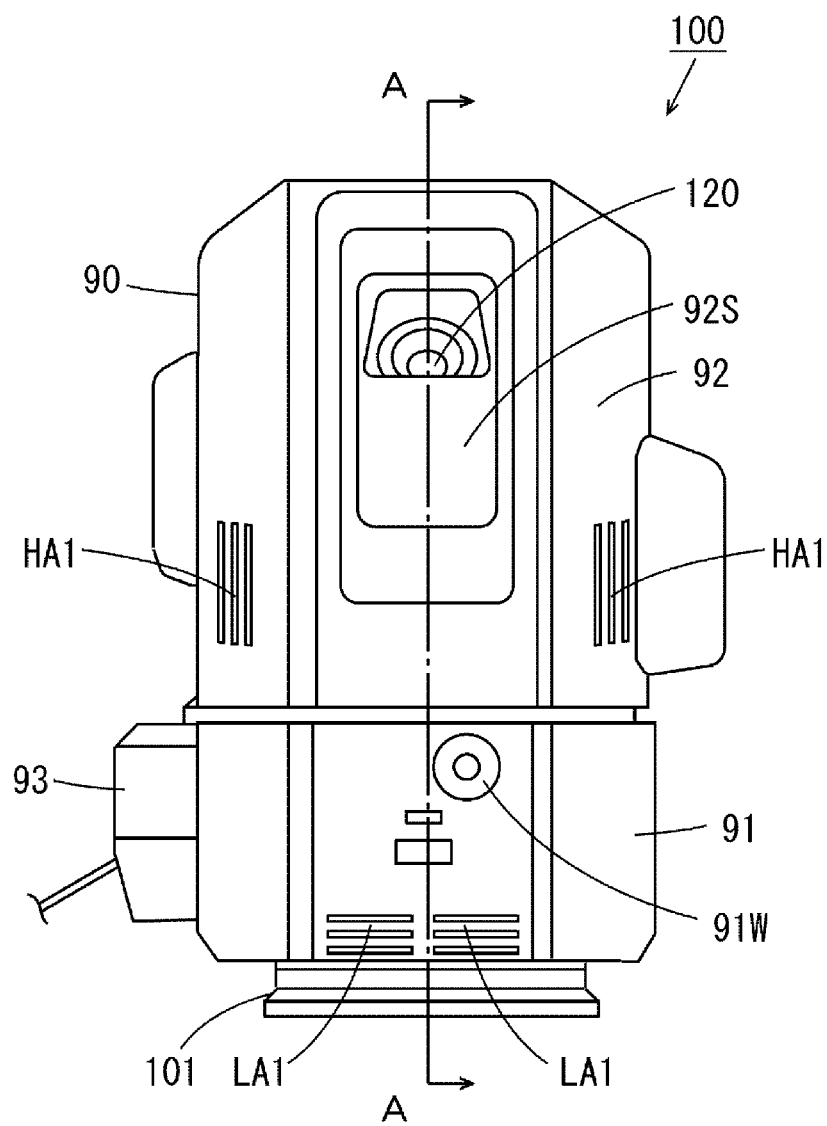
FIG. 4 is a front view of the imaging head.
Figure 5:
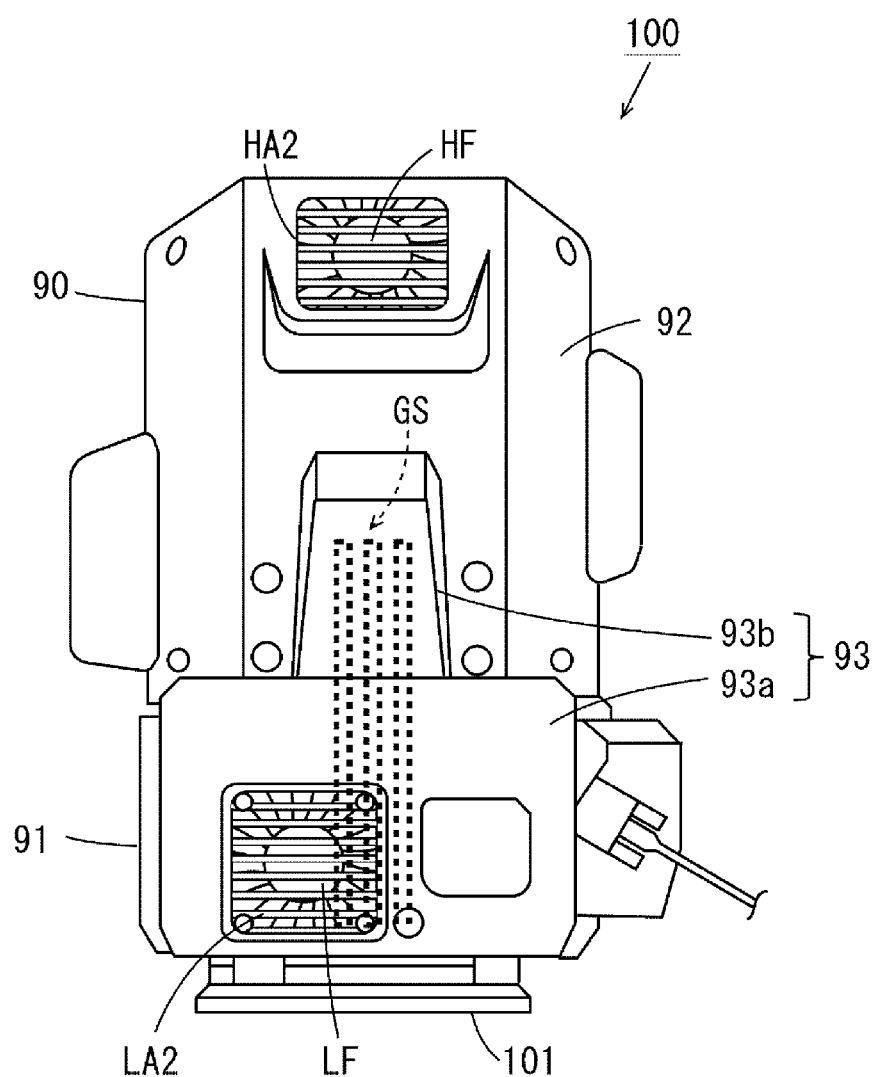
FIG. 5 is a rear view of the imaging head.
Figure 6:
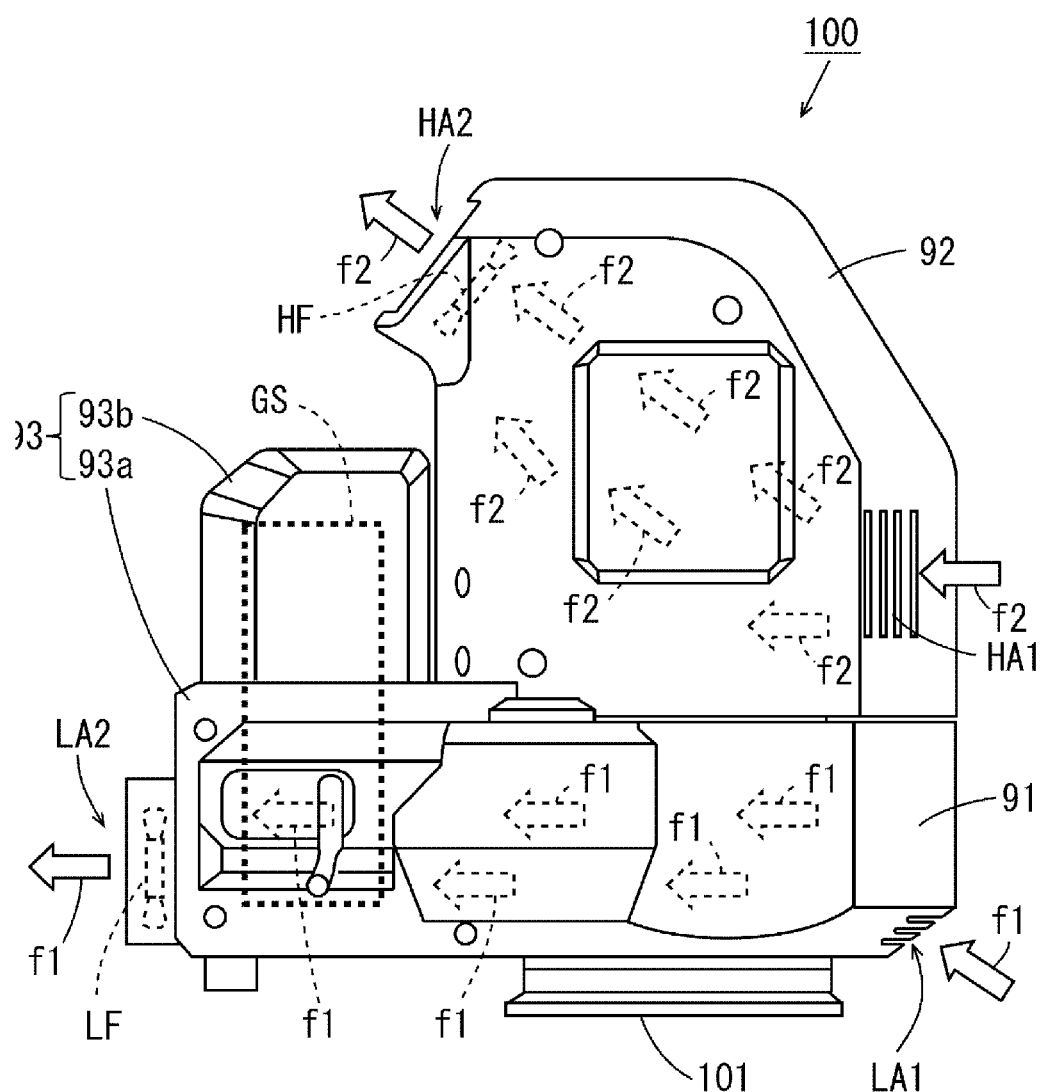
FIG. 6 is one side view of the imaging head.
Figure 7:
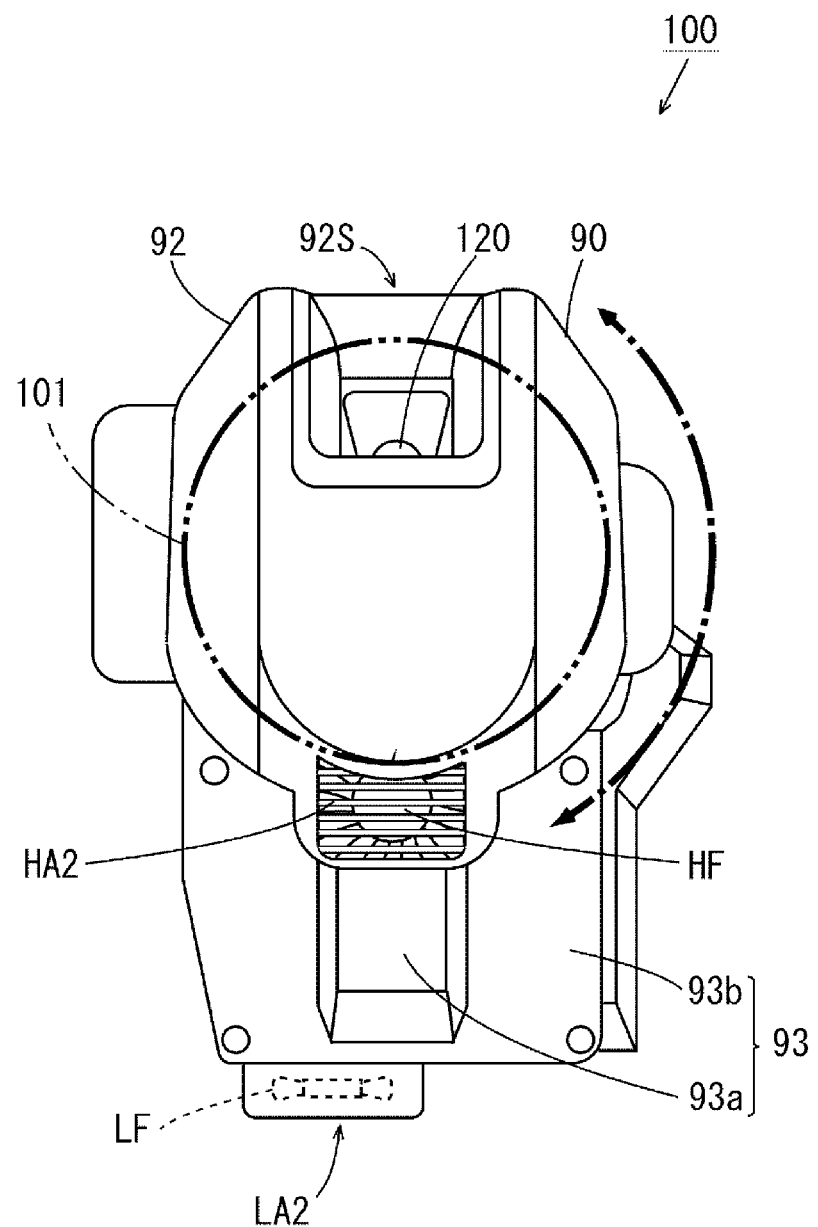
FIG. 7 is a plan view of the imaging head.
Figure 8:
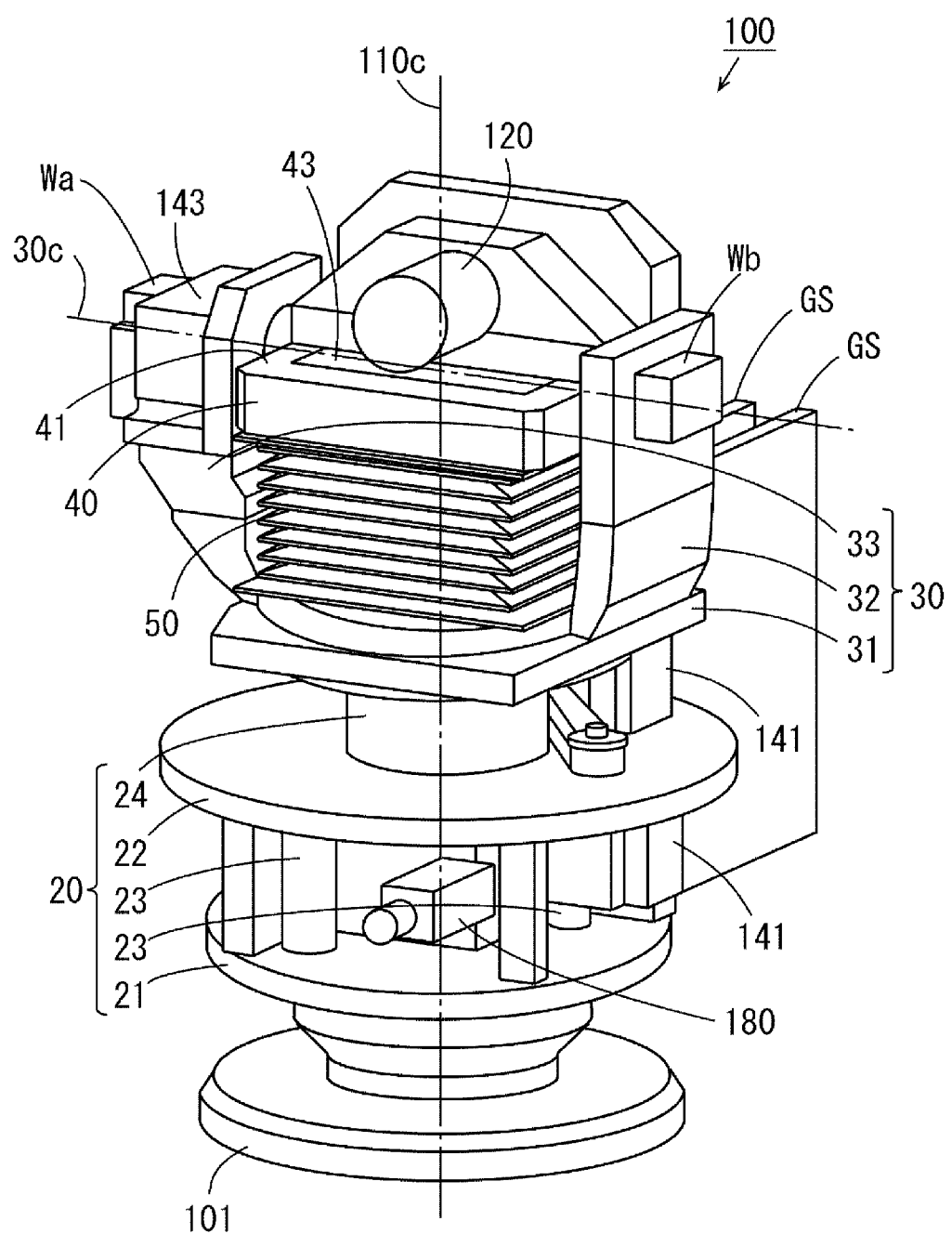
FIG. 8 is an external perspective view of the imaging head illustrating a state in which a casing has been removed.
Figure 9:
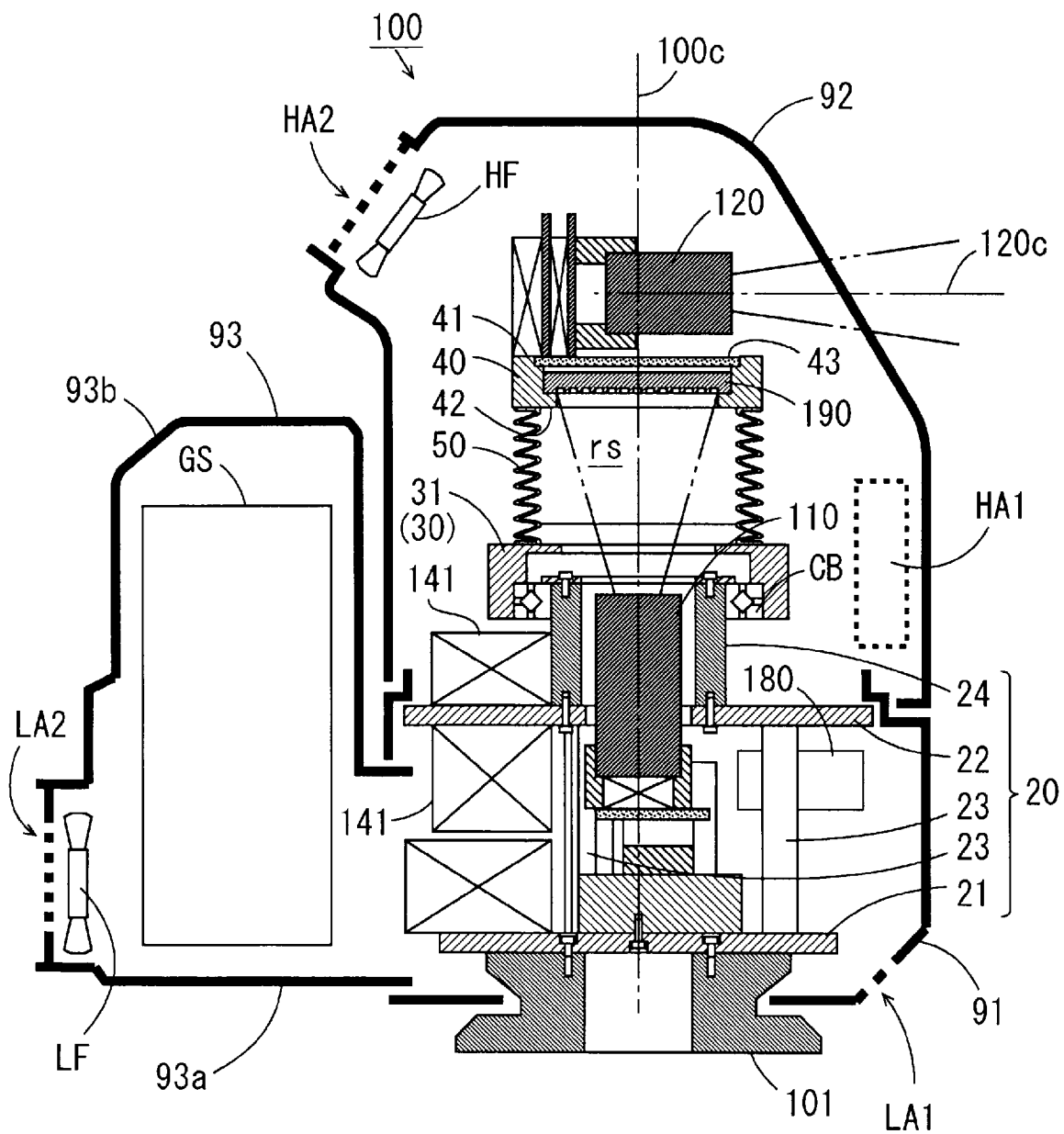
FIG. 9 is a schematic sectional view of the imaging head taken along line A-A in FIG. 4.

FIG. 3 is a block diagram illustrating configurations of the imaging head 100 and the processing device 300. FIG. 4 is a front view of the imaging head 100, and FIG. 5 is a rear view of the imaging head 100. In addition, FIG. 6 is a side view of one side of the imaging head 100, and FIG. 7 is a plan view of the imaging head 100. As illustrated in FIGS. 4 to 7, the imaging head 100 has a configuration in which a plurality of constituent elements are accommodated in a casing 90. FIG. 8 is an external perspective view of the imaging head 100 illustrating a state in which the casing 90 has been removed, and FIG. 9 is a schematic sectional view of the imaging head 100 taken along line A-A in FIG. 4.

(1) Imaging Head 100

First, the configuration of the imaging head 100 will be described. As illustrated in FIG. 3, the imaging head 100 includes, as electrical configurations, a reference camera 110, the movable camera 120, a marker driving circuit 130, a rotation driving circuit 140, a head control circuit 150, a wireless communication circuit 160, a communication circuit 170, a bird's eye view camera 180, and a reference member 190. These configurations are accommodated in the casing 90 illustrated in FIGS. 4 to 7 in the state of being supported by any of a fixing and coupling section 20, a support member 30, and a movable member 40 indicated by two-dot chain lines in FIG. 3.

Each of the reference camera 110, the movable camera 120, and the bird's eye view camera 180 includes a complementary metal oxide semiconductor (CMOS) image sensor capable of detecting infrared rays as an imaging element. The reference camera 110, the movable camera 120, and the bird's eye view camera 180 are provided with a substrates 111, 121, and 181 on which the CMOS image sensors are mounted, respectively. In FIG. 3, the plurality of circuits (140, 150, 160, and 170) surrounded by bold dotted lines have a higher heating amount than various elements mounted on the substrates 111, 121, and 181 of the reference camera 110, the movable camera 120, and the bird's eye view camera 180 during the operation. In the following description, one or a plurality of substrates on which the rotation driving circuit 140, the head control circuit 150, the wireless communication circuit 160, and the communication circuit 170 are mounted are collectively referred to as a heating substrate GS as appropriate.

As illustrated in FIGS. 4 to 7, the casing 90 includes a lower casing 91, an upper casing 92, and a substrate casing 93. The lower casing 91 has a substantially cylindrical shape, is fixed to the head bottom 101 of the imaging head 100, and extends upward from the head bottom 101 by a certain distance. The upper casing 92 is provided at a position above the lower casing 91. The upper casing 92 has a substantially bell shape and is provided so as to be rotatable within a horizontal plane together with the support member 30 (FIG. 8) to be described later.

As illustrated in a front view of FIG. 4, a rectangular opening 92S extending in an up-down direction from the vicinity of an upper end part to the center of the upper casing 92 is formed in a part of the upper casing 92. The rectangular opening 92S guides the imaging field of view of the movable camera 120 to the outside of the casing 90. In addition, in the upper casing 92, two intake sections HA1 are formed on both side parts of the rectangular opening 92S and in the vicinity of the lower end part of the upper casing 92.

A window 91W for a bird's eye view camera is formed in a part of an outer peripheral surface of the lower casing 91. The window 91W for a bird's eye view camera guides an imaging field of view of the bird's eye view camera 180 to the outside of the casing 90. In the following description, one direction in which the window 91W for a bird's eye view camera faces is referred to as a front side of the imaging head 100. In addition, a direction opposite to the above-described one direction with the imaging head 100 as a reference is referred to as a rear side of the imaging head 100. Not only the window 91W for a bird's eye view camera but also two intake sections LA1 are formed in a front part and in the vicinity of the lower end part of the lower casing 91.

As illustrated in FIGS. 5 and 6, the substrate casing 93 is connected to a portion (rear half portion) facing the rear side out of the outer peripheral surface of the lower casing 91. The substrate casing 93 includes a first accommodating section 93a and a second accommodating section 93b. The first accommodating section 93a has a box shape extending from the rear half of the lower casing 91 to the rear side of the imaging head 100. The second accommodating section 93b is formed so as to protrude upward from a part of an upper surface of the first accommodating section 93a.

In the substrate casing 93, an internal space of the first accommodating section 93a and an internal space of the second accommodating section 93b communicate with each other as illustrated in FIG. 9. In addition, the internal space of the first accommodating section 93a and an internal space of the lower casing 91 communicate with each other. On the other hand, the internal space of the lower casing 91 and an internal space of the upper casing 92 are partitioned by an upper fixing plate 22, which will be described later, and thus, do not communicate with each other.

As indicated by bold dotted lines or solid lines in FIGS. 5, 6, and 9, the heating substrate GS is accommodated in the substrate casing 93 from a lower part of the first accommodating section 93a to an upper part of the second accommodating section 93b. On the other hand, the plurality of substrates (the substrates 111, 121, 181, and the like) having lower heating properties than the heating substrate GS are accommodated in the lower casing 91 or the upper casing 92.

As illustrated in FIG. 5, an exhaust section LA2 is formed in a lower part of a rear end part of the first accommodating section 93a of the substrate casing 93. An exhaust fan LF is provided inside the first accommodating section 93a so as to be adjacent to the exhaust section LA2. The exhaust fan LF discharges the atmosphere in the lower casing 91 and the substrate casing 93 to the outside of the imaging head 100 through the exhaust section LA2. At this time, air outside the imaging head 100 flows into the lower casing 91 from the two intake sections LA1 in FIG. 4. As a result, a smooth flow of air from the front side of the imaging head 100 toward the rear side of the imaging head 100 through the internal spaces of the lower casing 91 and the substrate casing 93 is generated as indicated by a plurality of outlined arrows f1 in FIG. 6. In this case, the heating substrate GS accommodated in the substrate casing 93 is located downstream of the lower casing 91 in the flow of air in the lower casing 91 and the substrate casing 93. As a result, entry of heat generated in the heating substrate GS into the internal space of the lower casing 91 is reduced. Further, the heat generated in the heating substrate GS does not stay in the internal space of the lower casing 91, and thus the heat generated in the heating substrate GS is prevented from being transmitted to the internal space of the upper casing 92 through the internal space of the lower casing 91.

As illustrated in FIG. 7, in an upper part of the upper casing 92, an exhaust section HA2 is formed in a portion opposite to the rectangular opening 92S with the center of the upper casing 92 as a reference in a plan view. An exhaust fan HF is provided inside the upper casing 92 so as to be adjacent to the exhaust section HA2. The exhaust fan HF discharges the atmosphere in the lower casing 91 to the outside of the imaging head 100 through the exhaust section HA2. At this time, the air outside the imaging head 100 flows into the upper casing 92 from the two intake sections HA1 in FIG. 4. As a result, a smooth air flow directed obliquely upward from the lower part of the upper casing 92 is generated from the two intake sections HA1 of the lower casing 91 through the internal space of the upper casing 92 as indicated by a plurality of outlined arrows f2 in FIG. 6. In this case, heat, generated in a substrate 43 on which the movable camera 120 or the marker driving circuit 130 accommodated in the upper casing 92 is mounted as will be described later, smoothly flows from the lower side to the upper side in the lower casing 91, and is discharged to the outside of the lower casing 91.

As illustrated in FIGS. 8 and 9, the fixing and coupling section 20 includes a lower fixing plate 21, the upper fixing plate 22, a plurality of (for example, four) columns 23, and a hollow support shaft 24. The lower fixing plate 21 has a disk shape and is fixed onto an upper surface of the head bottom 101 using a screw. The upper fixing plate 22 is provided above the lower fixing plate 21 with the plurality of columns 23 interposed therebetween. The upper fixing plate 22 has a disk shape similarly to the lower fixing plate 21. A circular opening is formed in the center of the upper fixing plate 22. On an upper surface of the upper fixing plate 22, the hollow support shaft 24 is fixed using a screw so as to surround the opening in the center of the upper fixing plate 22. The lower casing 91 is attached to any member constituting the fixing and coupling section 20.

In the fixing and coupling section 20, the bird's eye view camera 180 is provided in a space between the lower fixing plate 21 and the upper fixing plate 22 together with various substrates (substrates having lower heating properties than the heating substrate GS) except for the heating substrate GS. In addition, the reference camera 110 is provided on the lower fixing plate 21 so as to extend from substantially the center of the lower casing 91 to the inside of the hollow support shaft 24 through the opening of the upper fixing plate 22 as illustrated in FIG. 9. In this state, an imaging field of view of the reference camera 110 is directed upward. In the present embodiment, an optical axis 110c of an optical system of reference camera 110 coincides with a central axis of the hollow support shaft 24.

On the lower fixing plate 21 and the upper fixing plate 22, a horizontal rotation mechanism 141 for rotating the support member 30, which will be described later, about the central axis of the hollow support shaft 24 (for rotating within a plane parallel to the upper surface of the head bottom 101) is provided in addition to the above-described various substrates and the reference camera 110. The horizontal rotation mechanism 141 includes, for example, a motor and various power transmission members.

As illustrated in FIG. 8, the support member 30 is provided on the hollow support shaft 24 of the fixing and coupling section 20. The support member 30 includes a rotation base 31 and a pair of support frames 32 and 33. The rotation base 31 has an opening at the center, and is attached to an upper end part of the hollow support shaft 24 using a cross roller bearing CB (FIG. 9) such that the support member 30 is rotatable about the central axis of the hollow support shaft 24. The upper casing 92 is attached to any member constituting the support member 30. When the support member 30 rotates with respect to the hollow support shaft 24, the upper casing 92 rotates relative to the lower casing 91 together with the support member 30 (see an arrow with a bold one-dot chain line in FIG. 7).

The pair of support frames 32 and 33 is formed so as to extend upward from one side part and the other side part of the rotation base 31 while facing each other. The movable member 40 is provided between the pair of support frames 32 and 33 at a position separated from the rotation base 31 by a predetermined distance.

The movable member 40 is supported by the support frames 32 and 33 so as to be rotatable (tillable with respect to the horizontal plane) about a rotational axis 30c passing through portions of the pair of support frames 32 and 33 facing each other. In the present embodiment, the rotational axis 30c is orthogonal to the optical axis 110c of the reference camera 110 (FIG. 9) and the central axis of the hollow support shaft 24.

In the vicinity of an upper end part of the support frame 33, a tilt rotation mechanism 143 is attached to a portion located on the rotational axis 30c on the side opposite to the movable member 40. The tilt rotation mechanism 143 includes, for example, a motor and various power transmission members. The tilt rotation mechanism 143 rotates the movable member 40 about the rotational axis 30c.

The movable member 40 is formed in a substantially flat square tubular shape and has an upper surface 41 and a lower surface 42. The movable camera 120 and various substrates associated with the movable camera 120 are fixed onto the movable member 40. In this state, an optical axis 120c (FIG. 9) of an optical system of the movable camera 120 is parallel to the upper surface 41 of the movable member 40. The substrate 43 on which the marker driving circuit 130 of FIG. 3 is mounted is provided at an upper end part of the movable member 40 so as to close an opening at the center of the movable member 40.

Figure 10A:
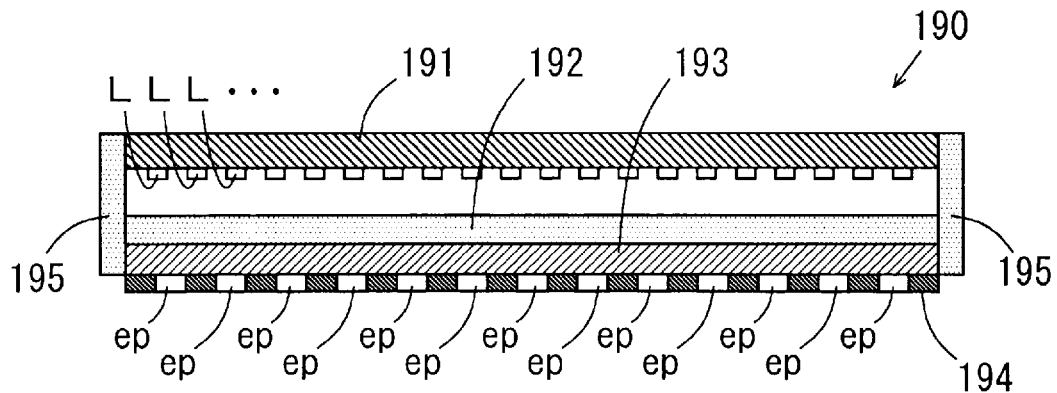
FIG. 10A is a schematic longitudinal sectional view of a reference member of FIG. 9.

As illustrated in FIG. 9, the reference member 190 having a plurality of markers ep (FIG. 3) is provided inside the movable member 40. FIG. 10A is a schematic longitudinal sectional view of the reference member 190 of FIG. 9, and FIG. 10B is a bottom view of the reference member 190.

Figure 10B:
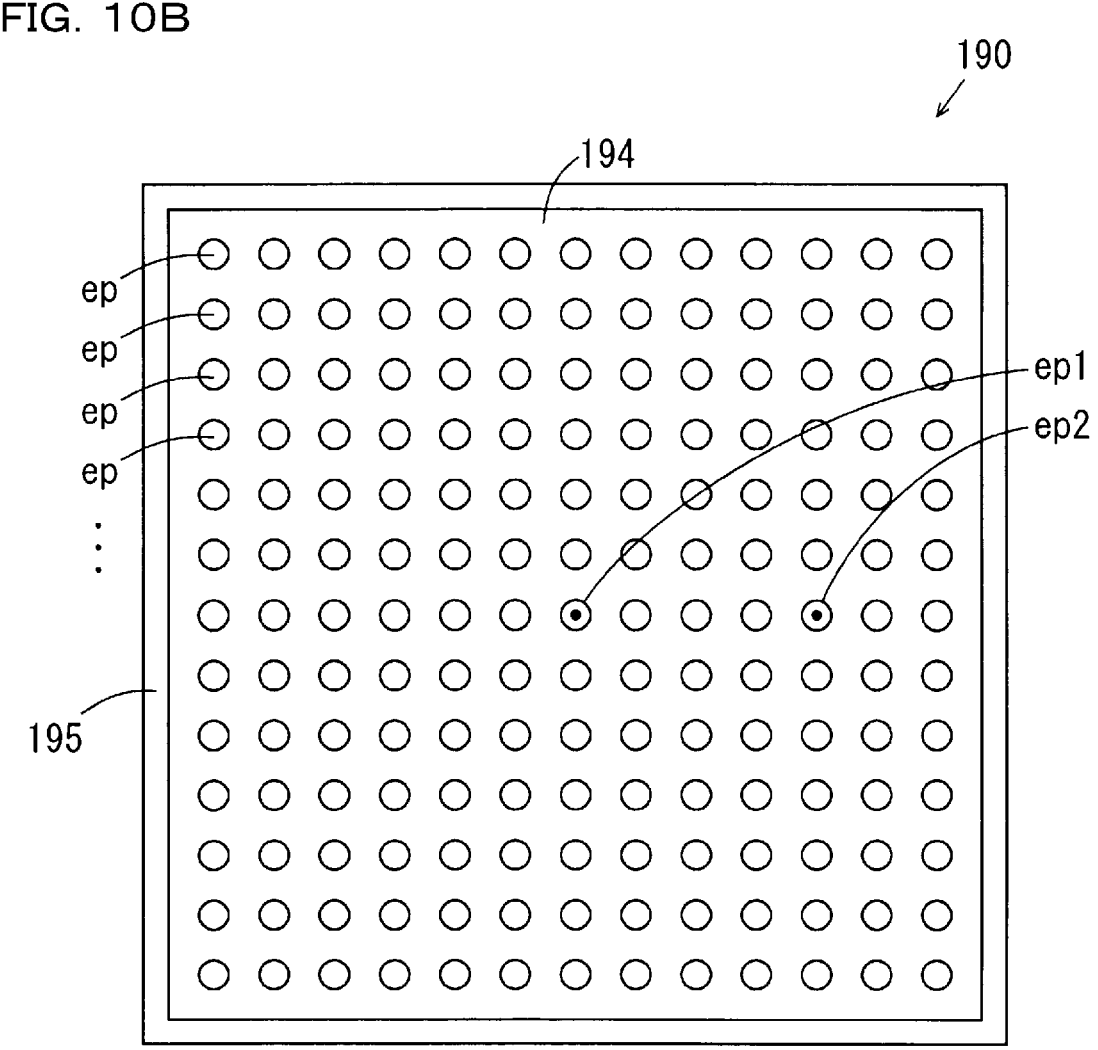
FIG. 10B is a bottom view of the reference member.

As illustrated in FIGS. 10A and 10B, the reference member 190 includes a light emitting substrate 191, a diffusion plate 192, a glass plate 193, and a diffusion reflection sheet 195. The light emitting substrate 191, the diffusion plate 192, and the glass plate 193 are laminated so as to be arranged in this order from the upper side to the lower side. The diffusion reflection sheet 195 is provided so as to surround an outer peripheral part of such a laminated body.

A plurality of light emitting elements L are mounted over the entire lower surface of the light emitting substrate 191. Each of the light emitting elements L is, for example, an infrared LED (light emitting diode). The marker driving circuit 130 drives the plurality of light emitting elements L on the light emitting substrate 191. As a result, the plurality of light emitting elements L emit light.

The diffusion plate 192 is, for example, a plate member made of resin, and transmits light generated from the plurality of light emitting elements L downward while diffusing the light. The diffusion reflection sheet 195 is, for example, a strip-shaped sheet member made of resin, and reflects the light, directed from the plurality of light emitting elements L toward the side (outside) of the reference member 190, inward while diffusing the light.

The glass plate 193 is a plate member made of, for example, quartz glass or soda glass. A mask 194 having a plurality of circular openings is provided on a lower surface of the glass plate 193. The mask 194 is, for example, a chromium mask formed on the lower surface of the glass plate 193 by a sputtering method or a vapor deposition method.

With the above configuration, the light generated from the plurality of light emitting elements L and diffused by the diffusion plate 192 and the diffusion reflection sheet 195 is released to the lower side of the reference member 190 through the glass plate 193 and the plurality of circular openings of the mask 194. In this manner, the plurality of markers ep of a self-emission type corresponding to the plurality of circular openings are formed.

In the present embodiment, the plurality of markers ep are arranged at equal intervals in a matrix on a lower surface (plane) of the reference member 190 as illustrated in FIG. 10B. Among the plurality of markers ep, the marker ep located at the center and one marker ep separated from the marker ep at the center by a predetermined distance are given with identification marks (points in this example) for identification from the other markers ep. These identification marks are formed by a part of the mask 194. In the following description, the marker ep at the center including the identification mark is referred to as a first marker ep1 in a case where the two markers ep given with the identification marks are distinguished from the plurality of markers ep. In addition, the other marker ep including the identification mark is referred to as a second marker ep2.

In the above configuration, the reference member 190 is attached to the movable member 40 such that the plurality of markers ep facing downward are located within a range of the imaging field of view of the reference camera 110. Further, the reference member 190 is attached to the movable member 40 such that the first marker ep1 is located on the optical axis 110c when the upper surface 41 and the lower surface 42 of the movable member 40 are perpendicular to a direction of the optical axis 110c of the reference camera 110.

When the support member 30 rotates on the fixing and coupling section 20 and when the movable member 40 rotates about the rotational axis 30c, an image of the plurality of markers ep obtained as the reference camera 110 captures an image of the reference member 190 changes. Therefore, for example, a case in which an image, obtained when the support member 30 and the movable member 40 are in predetermined reference postures, has changed is assumed. In this case, how much the support member 30 is rotated from the reference posture can be obtained based on a positional relationship between the first marker ep1 and the second marker ep2 in the image. In addition, how much the movable member 40 is rotated from the reference posture can be obtained based on distortion generated in the arrangement of the plurality of markers ep in the image.

As described above, the movable camera 120 and the reference member 190 are integrally fixed to the movable member 40. As a result, it is possible to calculate a position and a posture of the movable camera 120 with respect to the reference camera 110 based on image data (hereinafter, referred to as reference image data) obtained as the reference camera 110 captures the image of the plurality of markers ep of the reference member 190.

A bellows 50 optically and spatially blocking an imaging space rs (FIG. 9), which includes the imaging field of view of the reference camera 110 from the reference camera 110 to the reference member 190, from the outside of the imaging space rs, is provided between the movable member 40 and the rotation base 31.

An upper end part of the bellows 50 of this example is joined to the lower surface 42 of the movable member 40, and a lower end part of the bellows 50 is joined to an upper surface of the rotation base 31. As a result, when the support member 30 rotates within the horizontal plane, the bellows 50 also rotates together with the support member 30.

In addition, the bellows 50 of this example has a substantially square tubular shape, and is configured to be capable of maintaining the optically and spatially blocked state of the imaging space rs by being deformed following the rotation of the movable member 40 caused by the tilt rotation mechanism 143. Further, the bellows 50 is provided such that the bellows 50 does not interfere with the imaging field of view of the reference camera 110 when being deformed following the rotation of the movable member 40.

With such a configuration, light is prevented from entering the imaging space rs from the outside of the imaging space rs. In addition, even when a motor or the like generates heat around the imaging space rs, the generated heat is prevented from entering the imaging space rs. As a result, the atmosphere of the imaging space rs is prevented from fluctuating. Therefore, the image of the plurality of markers ep is captured with high accuracy, the position and posture of the movable camera 120 with respect to the reference camera 110 can be calculated with high accuracy. In addition, according to the above configuration, an internal space of the bellows 50 is spatially blocked from an external space so that the atmosphere in the internal space of the bellows 50 is stabilized.

In the imaging head 100, the center of gravity of a portion provided between the pair of support frames 32 and 33 (a configuration mainly including the movable member 40 and the movable camera 120) is desirably located on the rotational axis 30c as illustrated in FIG. 8. Accordingly, the rotation of the movable member 40 about the rotational axis 30c is stabilized. In addition, in the imaging head 100, the center of gravity of the portion (configuration mainly including support member 30, movable member 40, and movable camera 120) rotating with respect to the fixing and coupling section 20 is desirably located on the optical axis 110c of the reference camera 110. Accordingly, the rotation of the support member 30 about the optical axis 110c is stabilized. In addition, it is possible to reduce a driving force required for rotating the support member 30 and the movable member 40. As a result, a load applied to a drive unit such as a motor is reduced. In this example, weights Wa and Wb for adjusting a position of the center of gravity of the portion rotating with respect to the fixing and coupling section 20 are attached to the pair of support frames 32 and 33 of the support member 30.

The bird's eye view camera 180 provided in the fixing and coupling section 20 is provided in the fixing and coupling section 20 such that the imaging field of view thereof is directed toward the front side of the imaging head 100. An angle of view of the bird's eye view camera 180 is larger than angles of view of the reference camera 110 and the movable camera 120. Thus, the imaging field of view of the bird's eye view camera 180 is larger than the imaging fields of view of the reference camera 110 and the movable camera 120.

In tracking processing to be described later, the bird's eye view camera 180 is used to capture an image of the probe 200 over a wide range. In this case, the image of the probe 200 is captured by the bird's eye view camera 180, for example, even when the probe 200 is out of the imaging field of view of the movable camera 120 due to movement of the probe 200, so that an approximate position of the probe 200 can be identified based on image data (hereinafter, referred to as bird's eye view image data) by the capturing. The position and posture of the movable camera 120 are adjusted based on the identified position such that the probe 200 is located within the imaging field of view of the movable camera 120.

In addition, the substrate casing 93 is connected to the lower casing 91 so as to be out of the imaging field of view of the bird's eye view camera 180 in this example. As a result, a range in which an image can be captured by the bird's eye view camera 180 is prevented from being limited by the substrate casing 93.

Figure 11A:
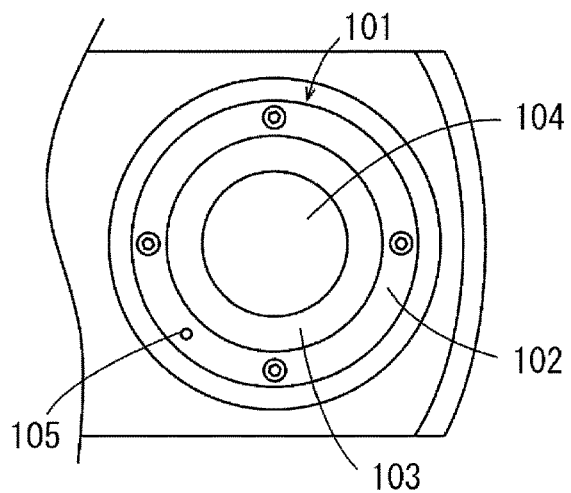
FIGS. 11A and 11B are a bottom view and a side view of a head bottom.
Figure 11B:
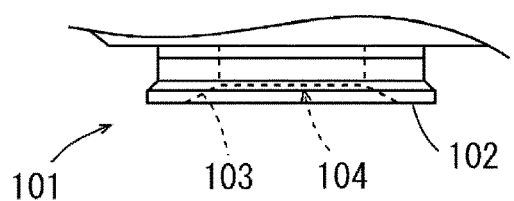
Figure 12A:
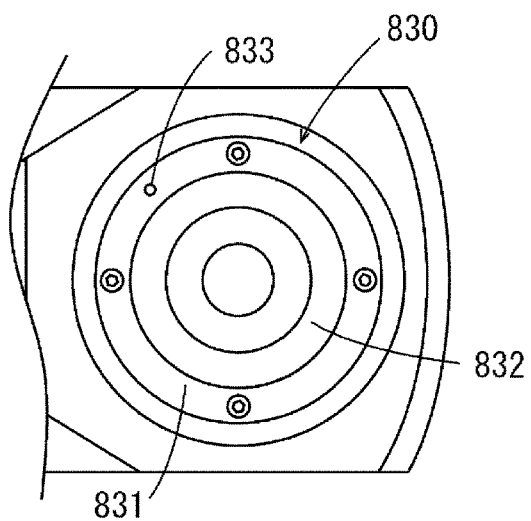
FIGS. 12A and 12B are a plan view and a side view of a head base of FIG. 1.
Figure 12B:
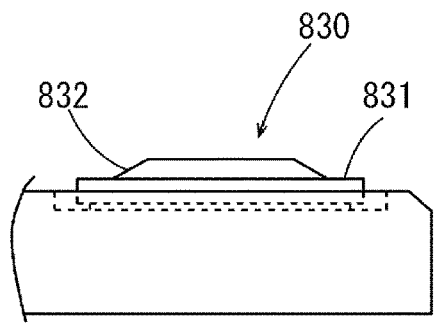

FIGS. 11A and 11B are a bottom view and a side view of the head bottom 101, and FIG. 12 is a plan view and a side view of the head base 830 of FIG. 1. As illustrated in FIGS. 11A and 11B, the head bottom 101 has an annular bottom surface 102 and an annular inclined surface 103 which have an annular shape. The annular inclined surface 103 is inclined upward by a certain distance from an inner edge of the annular bottom surface 102 toward the inner side thereof. An opening part 104 is formed at the inner side of the annular inclined surface 103. A vertical hole 105 that is open downward is formed in a predetermined portion of the annular bottom surface 102.

Meanwhile, the head base 830 has an annular support surface 831 and an annular inclined surface 832 which have an annular shape as illustrated in FIG. 12. The annular support surface 831 has the same shape as the annular bottom surface 102 of the head bottom 101, and is configured to be slidable with respect to the annular bottom surface 102. In addition, the annular inclined surface 832 corresponds to the annular inclined surface 103 of the head bottom 101, and is inclined upward by a certain distance from an inner edge of the annular inclined surface 832 toward the inner side thereof. Further, the annular inclined surface 832 is configured to be slidable with respect to the annular inclined surface 103.

With such a configuration, the head bottom 101 is placed on the head base 830 when the head bottom 101 is attached onto the head base 830. In this state, the annular bottom surface 102 and the annular inclined surface 103 of the head bottom 101 are in contact with the annular support surface 831 and the annular inclined surface 832 of the head base 830. Next, the user slides the head bottom 101 on the head base 830 in the circumferential direction to rotate the direction of the head bottom 101.

Here, a vertical hole 833 that is open upward is formed in the annular support surface 831 of the head base 830. The vertical hole 833 corresponds to the vertical hole 105 of the head bottom 101 and overlaps with the vertical hole 105 in a case where the head bottom 101 and the head base 830 are in a predetermined positional relationship. Thus, for example, a stretchable pin member (not illustrated) is inserted into one of the two vertical holes 105 and 833. In this case, the pin member is inserted into both the two vertical holes 105 and 833 when the head bottom 101 and the head base 830 are set in the predetermined positional relationship by rotating the head bottom 101 on the head base 830. As a result, the head bottom 101 and the head base 830 are fixed in the predetermined positional relationship. Accordingly, the attachment of the head bottom 101 to the head base 830 is completed.

The head base 911 of the reference stand 900 of FIG. 2 has the annular support surface 831 and the annular inclined surface 832, which is similar to the head base 830 described above. As a result, the head bottom 101 of the imaging head 100 can be attached onto the head base 830, which is similar to the example of the head base 911.

The center of gravity of the entire imaging head 100 is desirably located in an area at the inner side of an outer edge of the head bottom 101 in a plan view. In FIG. 7, the outer edge of the head bottom 101 in the plan view of the imaging head 100 is indicated by a bold two-dot chain line. In a case where the center of gravity of the entire imaging head 100 is located at the inner side of the outer edge of the head bottom 101 in the plan view, a support state of the imaging head 100 is stabilized in a state in which the imaging head 100 is attached onto the head base 830 or 911.

As illustrated in FIG. 3, the reference camera 110, the movable camera 120, the marker driving circuit 130, the rotation driving circuit 140, the wireless communication circuit 160, and the communication circuit 170 are connected to the head control circuit 150. The head control circuit 150 includes a central processing unit (CPU) and a memory or a microcomputer, and controls the reference camera 110, the movable camera 120, the marker driving circuit 130, the rotation driving circuit 140, and the bird's eye view camera 180.

As described above, each of the reference camera 110, the movable camera 120, and the bird's eye view camera 180 includes a CMOS image sensor capable of detecting an infrared ray. In addition, each of the reference camera 110, the movable camera 120, and the bird's eye view camera 180 includes a plurality of lenses (the optical system) (not illustrated). An analog electrical signal (hereinafter, referred to as a light reception signal) corresponding to a detection amount is output from each pixel of the reference camera 110, the movable camera 120, and the bird's eye view camera 180 to the head control circuit 150.

An A/D converter (analog/digital converter) and a first-in first-out (FIFO) memory (not illustrated) are mounted on the head control circuit 150. The light reception signals output from the reference camera 110, the movable camera 120, and the bird's eye view camera 180 are sampled at a constant sampling period and converted into digital signals by the A/D converter of the head control circuit 150. The digital signals output from the A/D converter are sequentially accumulated in the FIFO memory. The digital signals accumulated in the FIFO memory are sequentially transferred to the processing device 300 as pixel data.

The marker driving circuit 130 drives the light emitting substrate 191 of FIG. 10A based on the control of the head control circuit 150. As a result, the plurality of light emitting elements L on the light emitting substrate 191 emit light, and light is released from the plurality of markers ep of the reference member 190. Note that this light emission timing is synchronized with an imaging timing of the reference camera 110.

The rotation driving circuit 140 drives the horizontal rotation mechanism 141 of FIG. 8 based on the control of the head control circuit 150. As a result, the support member 30 in FIG. 8 rotates on the fixing and coupling section 20, and the movable member 40 and the upper casing 92 (FIG. 4) rotate. At this time, as the support member 30 rotates, the imaging field of view of the movable camera 120 guided from the inside to the outside of the upper casing 92 through the rectangular opening 92S (FIG. 4) rotates in the horizontal direction on the head base 830 of FIG. 1 or the head base 911 of FIG. 2.

In addition, the rotation driving circuit 140 drives the tilt rotation mechanism 143 of FIG. 8 based on the control of the head control circuit 150. As a result, the movable member 40 in FIG. 8 rotates about the rotational axis 30c between the pair of support frames 32 and 33. At this time, the imaging field of view of the movable camera 120 passing through the rectangular opening 92S (FIG. 4) rotates in the up-down direction along the rectangular opening 92S on the head base 830 of FIG. 1 or the head base 911 of FIG. 2. These rotations of the imaging field of view of the movable camera 120 by the rotation driving circuit 140 are performed based on the tracking processing, which will be described later, in the processing device 300.

The head control circuit 150 performs wireless communication with the probe 200 through the wireless communication circuit 160. In addition, the head control circuit 150 performs wired communication with the processing device 300 through the communication circuit 170 and the cable CA (FIGS. 1 and 2).

(2) Processing Device 300

As illustrated in FIG. 3, the processing device 300 includes a communication circuit 301, a main body control circuit 302, and a main body memory 303. The communication circuit 301 and the main body memory 303 are connected to the main body control circuit 302. In addition, the main body operation unit 320 and the main body display unit 310 are connected to the main body control circuit 302.

The main body memory 303 includes a read-only memory (ROM), a random access memory (RAM), and a hard disk. The main body memory 303 stores a measurement processing program and a tracking processing program, which will be described later, together with a system program. In addition, the main body memory 303 is used to process various types of data and store various types of data such as pixel data provided from the imaging head 100.

The main body control circuit 302 includes a CPU. In the present embodiment, the main body control circuit 302 and the main body memory 303 are implemented by a personal computer. The main body control circuit 302 generates image data based on pixel data provided from the imaging head 100 through the cable CA (FIGS. 1 and 2) and the communication circuit 301. The image data is a set of a plurality of pieces of pixel data.

In the present embodiment, the reference image data, the measurement image data, and the bird's eye view image data respectively corresponding to the reference camera 110, the movable camera 120, and the bird's eye view camera 180 provided in the imaging head 100 are generated. In addition, image data corresponding to a probe camera 208, which will be described later, provided in the probe 200 is generated. The main body control circuit 302 calculates a position of the contact part 211a (FIGS. 1 and 2) of the probe 200 based on the reference image data and the measurement image data.

The main body display unit 310 is configured using, for example, a liquid crystal display panel or an organic electroluminescence (EL) panel. The main body display unit 310 displays coordinates of a measurement point on the measurement target S, a measurement result of each part of the measurement target S, and the like based on the control of the main body control circuit 302. In addition, the main body display unit 310 displays a screen for performing various settings related to the measurement (see a measurement screen ms in FIG. 26 to be described later).

The main body operation unit 320 includes a keyboard and a pointing device. The pointing device includes a mouse, a joystick, or the like. The main body operation unit 320 is operated by the user U.

[3] Configuration of Probe 200

(1) Basic Configuration of Probe 200

Figure 13:
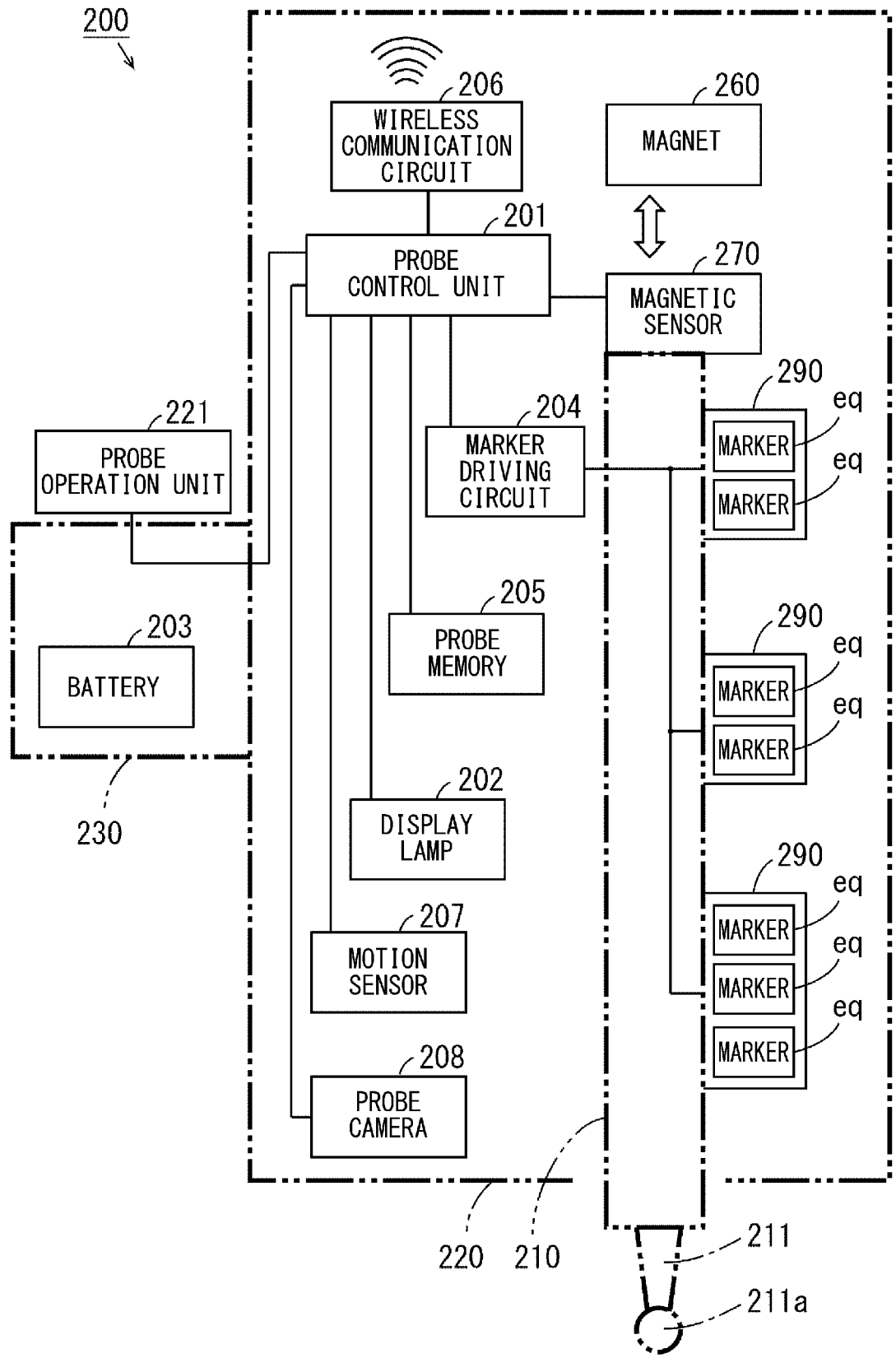
FIG. 13 is a block diagram illustrating a basic configuration of a probe.

FIG. 13 is a block diagram illustrating a basic configuration of the probe 200. As illustrated in FIG. 13, the probe 200 includes, as electrical and magnetic configurations, a probe control unit 201, a display lamp 202, a battery 203, a marker driving circuit 204, a probe memory 205, a wireless communication circuit 206, a motion sensor 207, a probe camera 208, a probe operation unit 221, a magnet 260, a magnetic sensor 270, and a plurality of (three in this example) target members 290.

In addition, as indicated by bold two-dot chain lines in FIG. 13, the probe 200 includes a probe holding unit 210, a probe casing 220, and a grip section 230 as configurations for accommodating, supporting, or holding each of the above-described constituent elements. The probe holding unit 210 holds the plurality of target members 290. In addition, a stylus 211 and the magnetic sensor 270 as specifying units are attached to the probe holding unit 210. The stylus 211 is attached to the probe holding unit 210 in a predetermined positional relationship with respect to the plurality of target members 290. The stylus 211 is a rod-shaped member having the contact part 211a at its tip. The probe casing 220 accommodates most of the probe holding unit 210, and accommodates the probe control unit 201, the display lamp 202, the marker driving circuit 204, the probe memory 205, the wireless communication circuit 206, and the motion sensor 207. In addition, the magnet 260 is fixed to a predetermined portion of the probe casing 220 inside the probe casing 220.

The grip section 230 incorporates the battery 203. The grip section 230 is further provided with the probe operation unit 221. The probe operation unit 221 receives an operation input related to the measurement by the user U. The probe operation unit 221 includes a trigger switch and a plurality of push buttons. Details of the probe operation unit 221 will be described later.

The battery 203 is a rechargeable/dischargeable storage battery, and supplies power to another constituent element provided in the probe 200. More specifically, the battery 203 supplies power to at least the target member 290. The probe control unit 201 includes a CPU and a memory, or a microcomputer, and controls the display lamp 202, the marker driving circuit 204, and the probe camera 208. In addition, the probe control unit 201 performs various types of processing in response to operations of the probe operation unit 221 by the user U.

The display lamp 202 includes, for example, one or a plurality of LEDs, and is provided such that a light emitting unit thereof is exposed to the outside of the probe casing 220. The display lamp 202 performs a light emitting operation according to a state of the probe 200 based on the control of the probe control unit 201.

Each of the three target members 290 basically has the same configuration as the reference member 190 in FIGS. 10A and 10B. The marker driving circuit 204 is connected to the plurality of target members 290, and drives the plurality of light emitting elements included in each of the target members 290 based on the control of the probe control unit 201.

The probe memory 205 includes a recording medium such as a nonvolatile memory or a hard disk. The probe memory 205 stores a contact trigger output program, which will be described later, together with the system program. In addition, the probe memory 205 is used to process or store various types of data.

The motion sensor 207 includes a three-axis acceleration sensor and a three-axis gyro sensor, and detects a motion and a posture of the probe 200, for example, when the user U moves while carrying the probe 200. Specifically, the motion sensor 207 detects the motion (movement direction and acceleration) and posture of the probe 200 when the probe 200 moves.

The magnet 260 and the magnetic sensor 270 are arranged to be close to each other and face each other inside the probe casing 220. In a case where a positional relationship between the magnet 260 and the magnetic sensor 270 changes relative to a reference positional relationship, the magnetic sensor 270 detects a change amount with respect to the reference positional relationship. In other words, in the case where the positional relationship between the magnet 260 and the magnetic sensor 270 changes, the magnetic sensor 270 detects a change amount in the positional relationship between the magnet 260 and the magnetic sensor 270 with respect to the reference positional relationship as a displacement amount of the probe holding unit 210 with respect to the probe casing 220. In addition, the magnetic sensor 270 outputs a signal, which indicates the displacement amount of the probe holding unit 210 with respect to the probe casing 220, to the probe control unit 201. The probe camera 208 is, for example, a charge coupled device (CCD) camera.

The A/D converter and the FIFO memory (which are not illustrated) are mounted on the probe control unit 201 in addition to the CPU and the memory or the microcomputer. As a result, in the probe control unit 201, a signal indicating the motion of the probe 200 detected by the motion sensor 207 is converted into data (hereinafter, referred to as motion data) in a digital signal format. In addition, a signal indicating the posture of the probe 200 detected by the motion sensor 207 is converted into data (hereinafter, referred to as posture data) in a digital signal format in the probe control unit 201. The probe control unit 201 performs contact trigger output processing, which will be described later, using the motion data and the posture data in the digital format.

In addition, in the probe control unit 201, a signal indicating the displacement amount of the probe holding unit 210 detected by the magnetic sensor 270 is converted into data (hereinafter, referred to as displacement amount data) in a digital signal format. The probe control unit 201 performs the contact trigger output processing, which will be described later, using the displacement amount data in the digital format. In addition, in the probe control unit 201, light reception signals output from the respective pixels of the probe camera 208 are converted into a plurality of pieces of pixel data in a digital signal format. The probe control unit 201 transmits the motion data and the plurality of pieces of pixel data in the digital format to the imaging head 100 of FIG. 3 through the wireless communication circuit 206 by wireless communication. In this case, the pixel data is further transferred from the imaging head 100 to the processing device 300.

(2) External Structure of Probe 200

Figure 14:
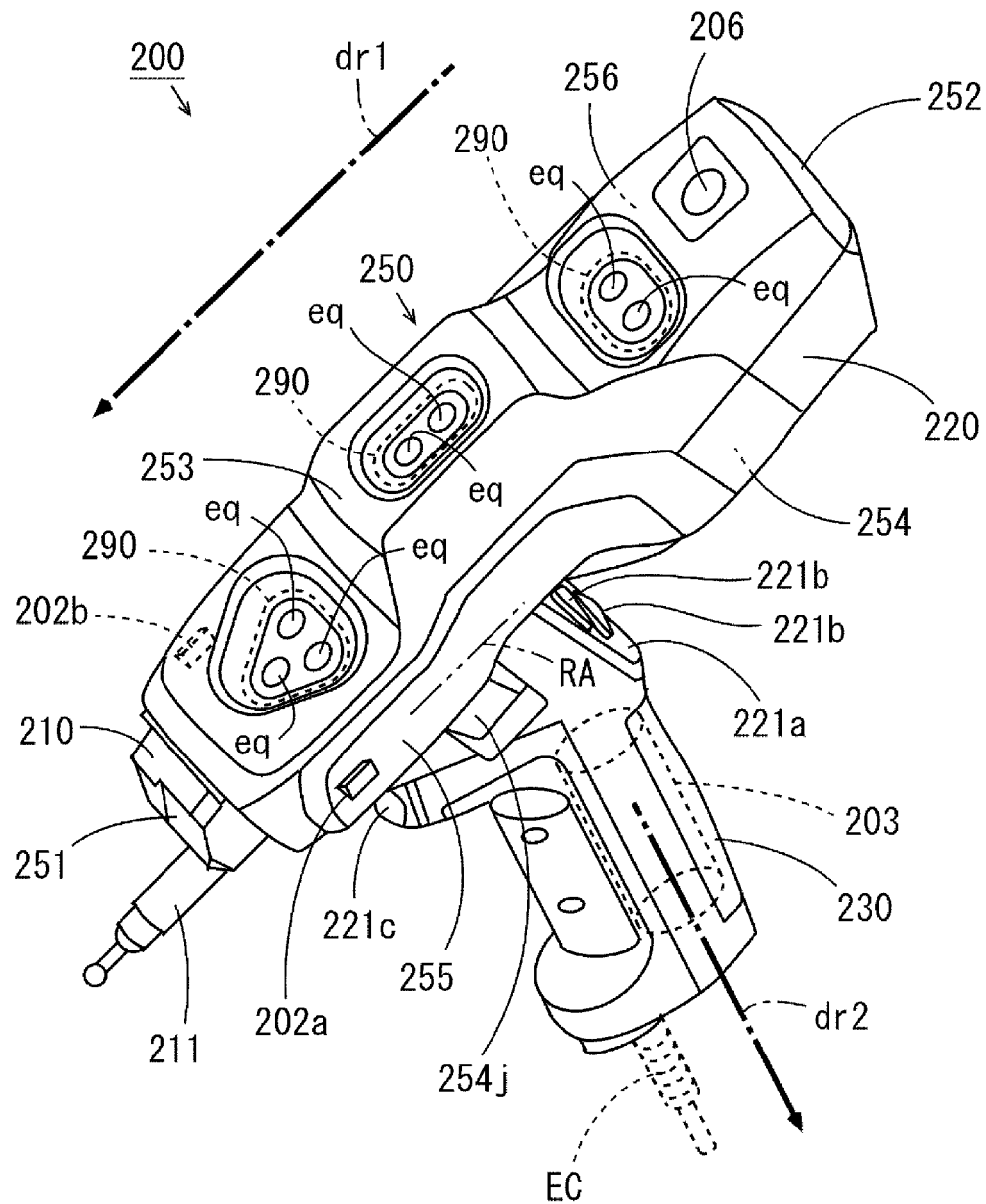
FIG. 14 is an external perspective view of the probe as viewed in one direction.
Figure 15:
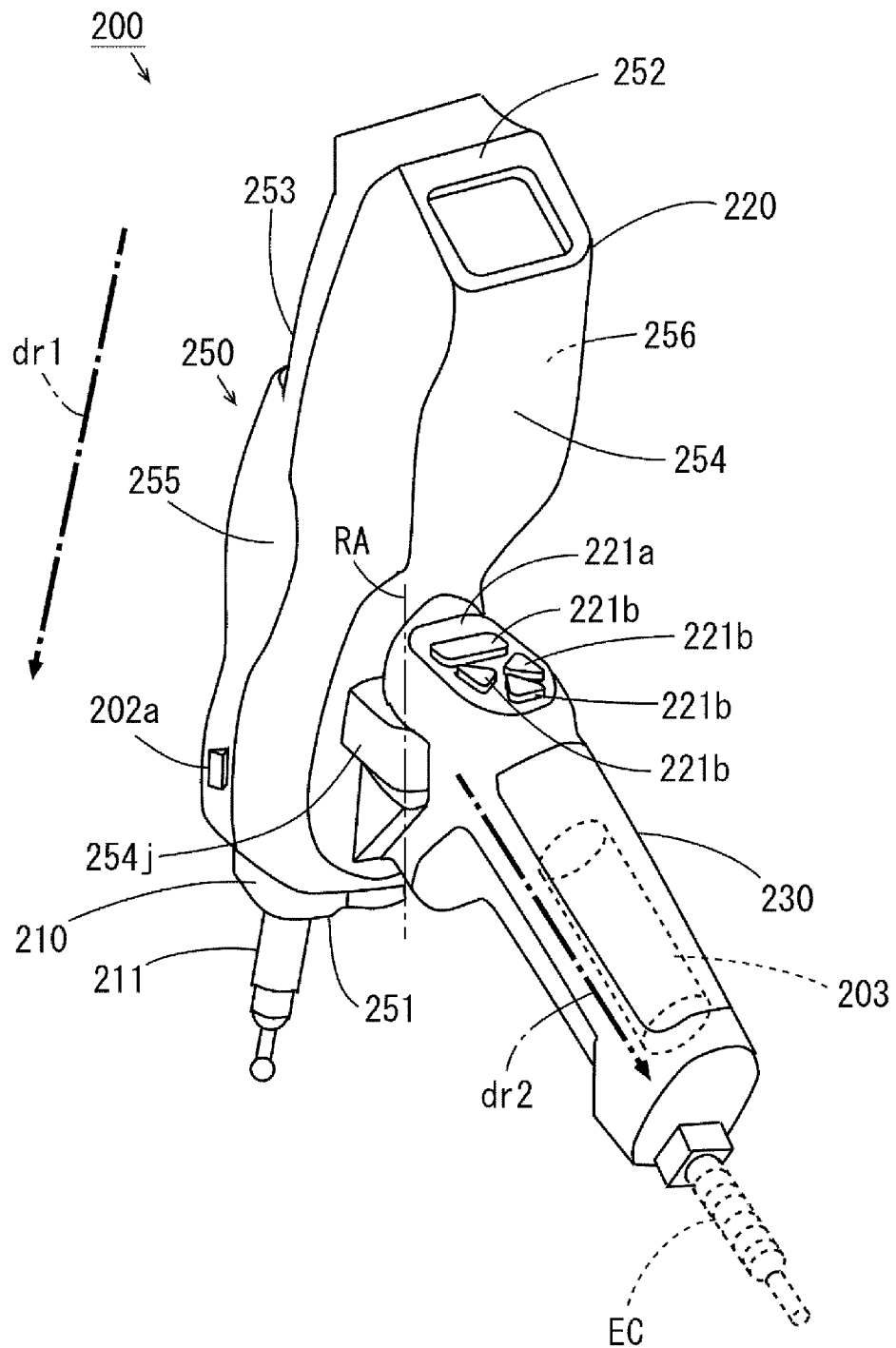
FIG. 15 is an external perspective view of the probe as viewed in another direction.

FIG. 14 is an external perspective view of the probe 200 as viewed in one direction, and FIG. 15 is the external perspective view of the probe 200 as viewed in another direction. In the following description, a structural body including a plurality of constituent elements accommodated in the probe casing 220 of FIG. 13 and the probe holding unit 210 is referred to as a main body section 250 of the probe 200. As illustrated in FIGS. 14 and 15, the main body section 250 is formed so as to extend in one direction, and has a front end part 251, a rear end part 252, an upper surface part 253, a bottom surface part 254, a one side surface part 255, and another side surface part 256. In the following description, a direction parallel to a direction in which the front end part 251 and the rear end part 252 of the main body section 250 in the probe 200 are arranged is referred to as a first direction dr1.

The front end part 251 is provided with a plurality of attachment parts to which the stylus 211 can be attached. The plurality of attachment parts are configured to face mutually different directions. The user U can attach the stylus 211 to a desired one of the plurality of attachment parts. As a result, the stylus 211 is attached to the front end part 251 with any one posture of a plurality of postures corresponding to the plurality of attachment parts. In the example of FIGS. 14 and 15, the stylus 211 is attached to the front end part 251 so as to extend in the first direction dr1. The front end part 251 is further provided with the probe camera 208.

As illustrated in FIG. 14, on the upper surface part 253 of the main body section 250, the three target members 290 and the wireless communication circuit 206 are arranged in this order from the front end part 251 to the rear end part 252. Among the three target members 290 in this example, the target member 290 closest to the front end part 251 has three markers eq. Each of the remaining two target members 290 has two markers eq. In the target members 290, all marker surfaces on which the markers eq are provided are provided on the upper surface part 253 of the main body section 250 and face the same direction. Each of the markers eq is a self-emission type marker that releases infrared light. Note that light emission timings of the plurality of markers eq are synchronized with an imaging timing of the movable camera 120 of the imaging head 100.

As illustrated in FIG. 15, a connecting part 254j for connection of the grip section 230 is formed on the bottom surface part 254 of the main body section 250 at a portion slightly closer to the front end part 251 than the rear end part 252. In the main body section 250, the upper surface part 253 on which the markers eq are provided and the bottom surface part 254 on which the connecting part 254j is provided are located on opposite sides. Therefore, the connecting part 254*j* is provided on the side opposite to the marker surface on which the marker eq is provided. The grip section 230 has a rod shape that can be gripped by the user U with one hand. The user U grips the grip section 230 when carrying the probe 200. A gripping posture of the grip section 230 is prescribed by, for example, a user manual based on ease of handling when the user U carries the probe 200. As illustrated in FIG. 14, the grip section 230 of the present embodiment has a shape that is recessed on the stylus 211 side, and it is assumed that the user U grips the grip section 230 by placing fingers on the recess. Therefore, it can be said that the gripping posture when the user U grips the grip section 230 is also prescribed by the shape of the grip section 230. One end part of the grip section 230 is connected to the connecting part 254*j* through a hinge 254*h* (FIG. 20) to be described later. In this state, the grip section 230 is rotatable about a rotational axis RA that passes through the connecting part 254*j* and is parallel to the first direction dr1. Since the rotational axis RA extends along the marker surface on which the marker eq is provided, a position of the user U who grips the grip section 230 in accordance with the gripping posture is changed with respect to the marker surface when the grip section 230 rotates about the rotational axis RA. The grip section 230 is connected to the connecting part 254*j* to prescribe the rotational axis RA of rotation with respect to the main body section 250, and thus, can rotate about the rotational axis RA as a predetermined rotational axis.

In the example of FIGS. 14 and 15, the grip section 230 extends from the connecting part 254*j* in a second direction dr2 intersecting the first direction dr1. An operation surface 221*a* is provided as a part of the probe operation unit 221 of FIG. 13 in a portion of the one end part of the grip section 230 facing the rear end part 252 side. The operation surface 221*a* includes a plurality of (four in this example) push buttons 221*b*, and is configured such that the user who grips the grip section 230 can operate the plurality of push buttons 221*b* with a thumb, for example. In addition, a trigger switch 221*c* is provided as a part of the probe operation unit 221 of FIG. 13 in a portion of the one end part of the grip section 230 facing the front end part 251 side. The user who grips the grip section 230 can operate the trigger switch 221*c* with, for example, an index finger. In this manner, the grip section 230 is provided with the push buttons 221*b* and the trigger switch 221*c* on the operation surface 221*a* on the basis of the assumed gripping posture of the user U. In other words, the gripping posture when the user U grips the grip section 230 is also prescribed by the arrangement of the probe operation unit 221.

A connector for charging the battery 203 is provided at the other end part of the grip section 230. When the battery 203 is charged, a power cable EC is connected to the connector of the grip section 230 from the outside of the probe 200. When the charging of the battery 203 is completed, the power cable EC is pulled out from the connector of the grip section 230. Note that the power cable EC may be a cable that enables communication between the probe 200 and the processing device 300. In addition, a connector may be provided separately from the connector to which the power cable EC is connected, and a cable that enables the communication between the probe 200 and the processing device 300 may be connected to this connector. For example, a USB connector may be provided separately from the connector to which the power cable EC is connected. In this manner, the connector is preferably provided in the grip section 230 even when being provided separately from the connector to which the power cable EC is connected. Since the cable is located close to the hand of the user U when the user U carries the probe 200, the cable is unlikely to interfere with capturing of an image of the marker eq.

Here, the hinge 254*h* (FIG. 20) used for connection between the connecting part 254*j* and the grip section 230 has a so-called click mechanism. As a result, in a case where a rotation angle of the grip section 230 about the rotational axis RA is at any of a plurality of predetermined rotation angles, a holding force for holding the grip section 230 at the rotation angle is generated in the hinge 254*h*. Therefore, the user U can stably measure the measurement target S while gripping the grip section 230 in the case where the rotation angle of the grip section 230 about the rotational axis RA is at any of the plurality of predetermined rotation angles. In the present embodiment, the hinge 254*h* has the click mechanism, but does not prevent the grip section 230 from being held at a rotation angle other than the plurality of predetermined rotation angles. Accordingly, the user U can carry the probe 200 in the state of rotating the grip section 230 such that the grip section 230 is held at a suitable position within a rotation angle range of the grip section 230.

In the present embodiment, a first rotation angle and a second rotation angle are set as some of the plurality of predetermined rotation angles. In this case, the grip section 230 can transition between a first state in which the rotation angle of the grip section 230 is at the first rotation angle and a second state in which the rotation angle of the grip section 230 is at the second rotation angle. The state of the grip section 230 illustrated in FIGS. 14 and 15 is referred to as the first state. Note that the rotation angle indicates a rotation position of the grip section 230 with respect to an arbitrary reference rotation position about the rotational axis RA in the present embodiment. That is, the state in which the rotation angle of the grip section 230 is at the first rotation angle indicates a state in which the grip section 230 has been rotated by a first angle with respect to the arbitrary reference rotation position.

Figure 16:
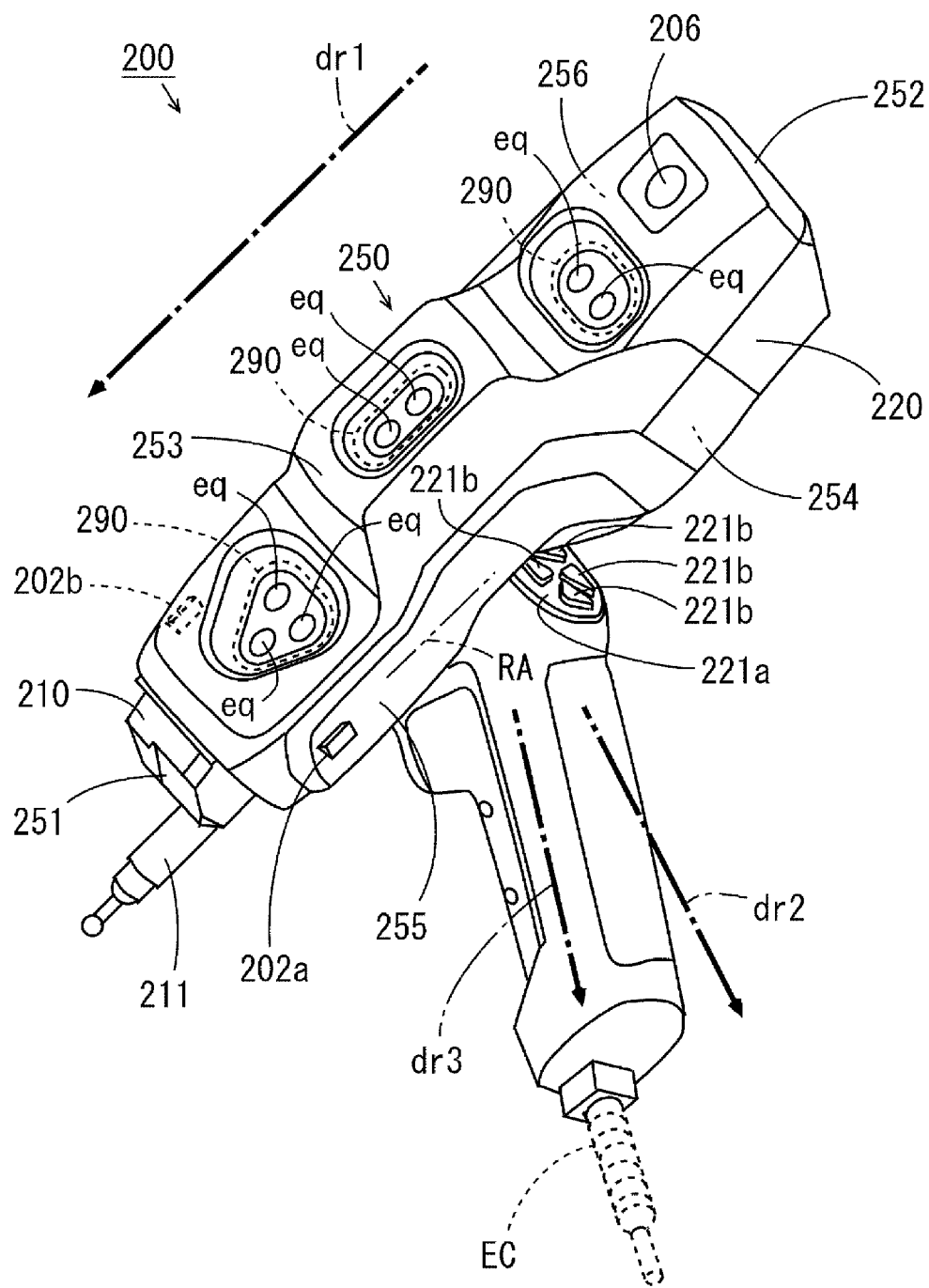
FIG. 16 is an external perspective view of the probe with a grip section in a second state as viewed in one direction.
Figure 17:
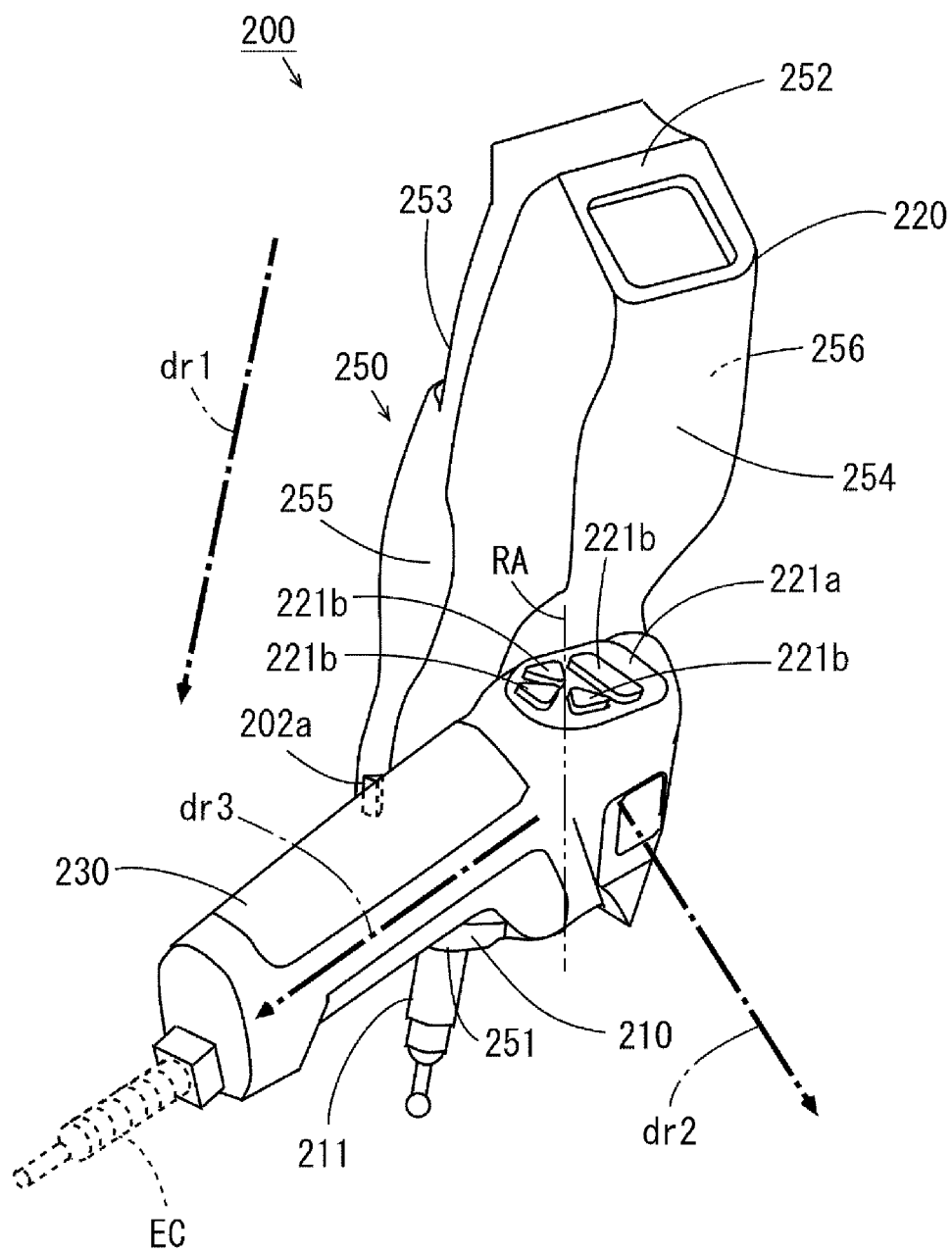
FIG. 17 is an external perspective view of the probe with the grip section in the second state as viewed in another direction.

FIG. 16 is an external perspective view of the probe 200 with the grip section 230 in the second state as viewed in one direction, and FIG. 17 is an external perspective view of the probe 200 with the grip section 230 in the second state as viewed in another direction. The rotation angle (second rotation angle) of the grip section 230 illustrated in FIGS. 16 and 17 is different from the rotation angle (first rotation angle) of the grip section 230 illustrated in FIGS. 14 and 15 by about 90°. As illustrated in FIGS. 16 and 17, the grip section 230 in the second state extends from the connecting part 254*j* (FIGS. 14 and 15) in a third direction dr3 different from the second direction dr2.

In the present embodiment, a third rotation angle that is different from the first rotation angle by about −90° is also set in addition to the first and second rotation angles as some of the plurality of predetermined rotation angles. In this case, a state of the grip section 230 can be set to a third state different from the first and second states by setting the rotation angle of the grip section 230 to the third rotation angle.

In the state illustrated in FIG. 15, the plurality of push buttons 221*b* have such an arrangement relationship that the substantially rectangular push button 221*b* is located at a position close to the main body section 250 in the second direction dr2 and the substantially triangular push button 221*b* having a side substantially parallel to a long side of the substantially rectangular push button 221*b* is located at a position far from the main body section 250 in the second direction dr2. On the other hand, in the state illustrated in FIG. 17, the plurality of push buttons 221b have such an arrangement relationship that the substantially rectangular push button 221b and the substantially triangular push button 221b having a side substantially parallel to a short side of the substantially rectangular push button 221b is located at a position close to the main body section 250 in the second direction dr2. Therefore, the arrangement relationship of the plurality of push buttons 221b with respect to the main body section 250 changes before and after the grip section 230 rotates from the first rotation angle illustrated in FIG. 15 to the second rotation angle illustrated in FIG. 17.

Note that the above embodiment adopts the configuration in which the plurality of push buttons 221b are provided on the operation surface 221a of the probe operation unit 221, but the present invention is not limited thereto. A configuration may be adopted in which the operation surface 221a is provided with a display screen capable of displaying a plurality of graphical interfaces and receiving operations of the user on the graphical user interface. In this case, the plurality of graphical user interfaces displayed on the display screen correspond to the plurality of push buttons. In this configuration as well, an arrangement relationship of the plurality of graphical user interfaces with respect to the main body section 250 changes before and after the rotation of the grip section 230 if the arrangement relationship of the plurality of graphical user interfaces with respect to the operation surface 221a is the same before and after the rotation of the grip section 230.

The user U grips the grip section 230 such that the upper surface part 253 of the main body section 250 faces the imaging head 100. Then, the user U operates the probe operation unit 221 while bringing the contact part 211a into contact with a desired portion of the measurement target S.

Figure 18:
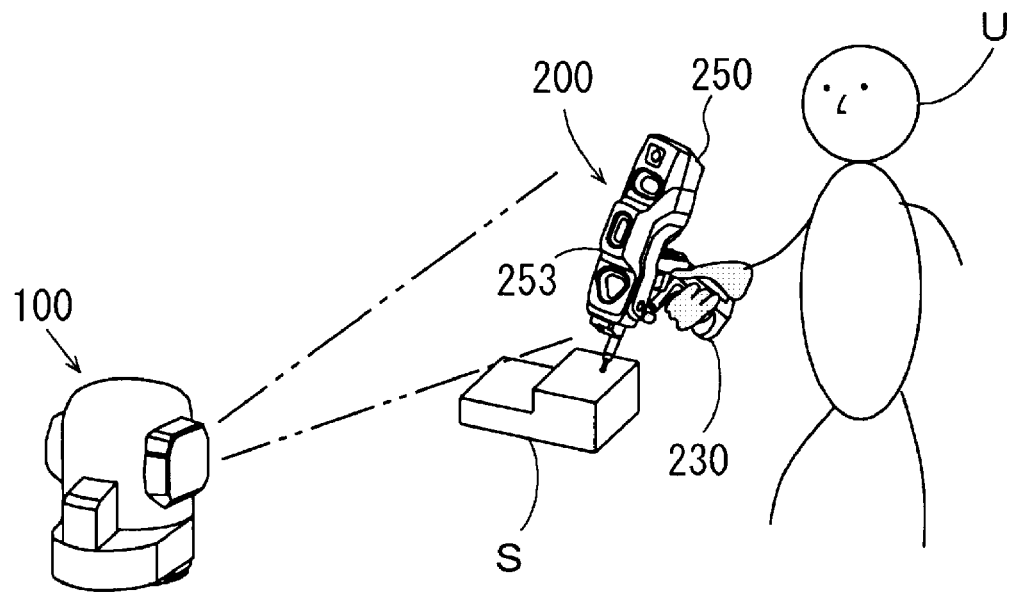
FIG. 18 is a schematic view illustrating a state in which a user measures a measurement target using the probe with the grip section in a first state.
Figure 19:
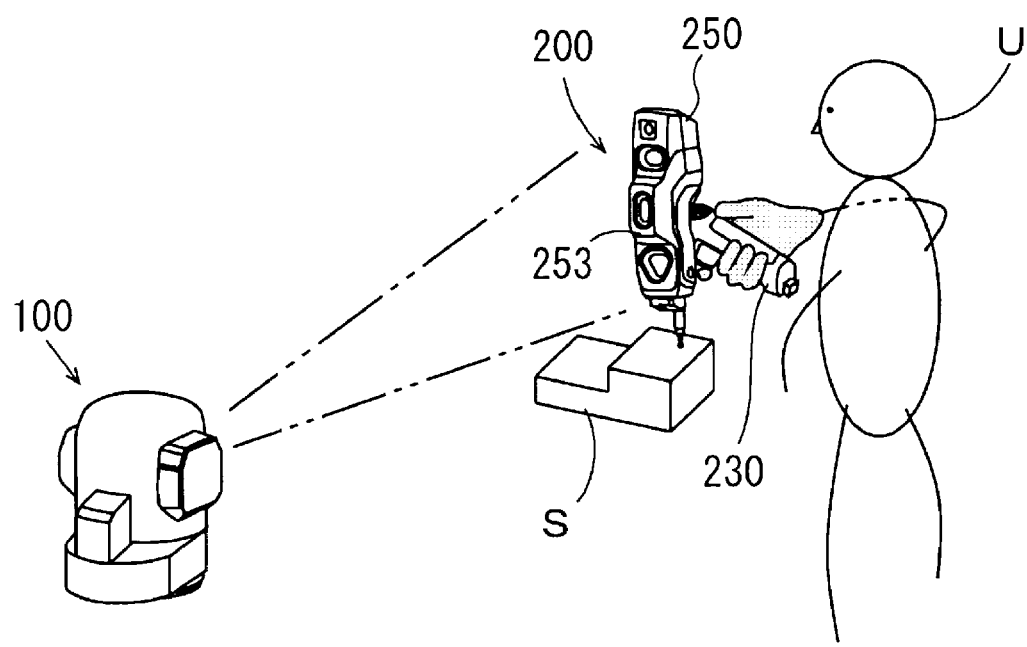
FIG. 19 is a schematic view illustrating a state in which the user measures the measurement target using the probe with the grip section in the second state.

FIG. 18 is a schematic view illustrating a state in which the user U measures the measurement target S using the probe 200 with the grip section 230 in the first state, and FIG. 19 is a schematic view illustrating a state in which the user U measures the measurement target S using the probe 200 with the grip section 230 in the second state.

As illustrated in FIGS. 14 and 15, the second direction dr2 along which the grip section 230 extends in the first state is a direction intersecting the upper surface part 253 of the main body section 250 provided with the marker surface. For this reason, as illustrated in FIG. 18, when the user U grips the grip section 230 at the first rotation angle in accordance with the prescribed gripping posture, the user U can direct the plurality of marker surfaces toward the movable camera 120 located in a direction that the user U faces.

In addition, as illustrated in FIGS. 16 and 17, the third direction dr3 along which the grip section 230 extends at the second rotation angle different from the first rotation angle is a direction along the upper surface part 253 of the main body section 250 provided with the marker surface and is a direction intersecting the first direction dr1. For this reason, as illustrated in FIG. 19, when the user U grips the grip section 230 at the second rotation angle in accordance with the prescribed gripping posture, the user U can direct the plurality of marker surfaces toward the movable camera 120 located on the side of the user U.

Therefore, when the user U grips the grip section 230 in accordance with the prescribed gripping posture, a direction that the marker surface faces in the first state is different from a direction that the marker surface faces in the second state as viewed from the user U. As described above, even when the user U grips the grip section 230 in accordance with the prescribed gripping posture, the plurality of markers eq are arranged in different directions between the first state of the grip section 230 and the second state of the grip section 230. Therefore, the user U can change the relative position and posture of the upper surface part 253 of the main body section 250 in the state of facing the imaging head 100 including the movable camera 120 with respect to the measurement target S and the imaging head 100 including the movable camera 120 by switching the grip section 230 between the first state and the second state.

Here, on the one side surface part 255 of the main body section 250, a first display unit 202a constituting the display lamp 202 of FIG. 13 is provided in a portion between the front end part 251 and the connecting part 254j in the first direction dr1 as illustrated in FIGS. 14 to 17. In addition, on the other side surface part 256 of the main body section 250, a second display unit 202b constituting the display lamp 202 of FIG. 13 is provided in a portion between the front end part 251 and the connecting part 254j in the first direction dr1.

Each of the first display unit 202a and the second display unit 202b includes a plurality of green LEDs and a plurality of red LEDs. In a case where the plurality of markers eq provided on the upper surface part 253 of the probe 200 are present within the imaging field of view of the movable camera 120 (FIG. 3), the first display unit 202a and the second display unit 202b emit green light. On the other hand, in a case where the plurality of markers eq are not present in the imaging field of view of the movable camera 120, the first display unit 202a and the second display unit 202b emit red light.

In the main body section 250, the first display unit 202a and the second display unit 202b are located between the grip section 230 and the stylus 211. As a result, the user U ca specify the measurement point by bringing the contact part 211a into contact with a desired portion of the measurement target S while visually recognizing the first display unit 202a and the second display unit 202b.

In addition, the one side surface part 255 on which the first display unit 202a is provided and the other side surface part 256 on which the second display unit 202b is provided are surfaces of the main body section 250 facing opposite directions. Since the direction that the first display unit 202a faces is different from the direction that the second display unit 202b faces, angular ranges in which the user U can visually recognize these display units are different. Thus, even when it is difficult for the user U to visually recognize the first display unit 202a at the time of operating the probe 200, it is possible to easily grasp whether or not the plurality of markers eq are present within the imaging field of view of the movable camera 120 if the second display unit 202b can be visually recognized. In addition, even when it is difficult for the user U to visually recognize the second display unit 202b at the time of operating the probe 200, it is possible to easily grasp whether or not the plurality of markers eq are present in the imaging field of view of the probe holding unit 210 if the first display unit 202a can be visually recognized. Therefore, the operability of the probe 200 at the time of specifying the measurement point is improved.

(3) Internal Structure of Main Body Section 250 of Probe 200

Figure 20:
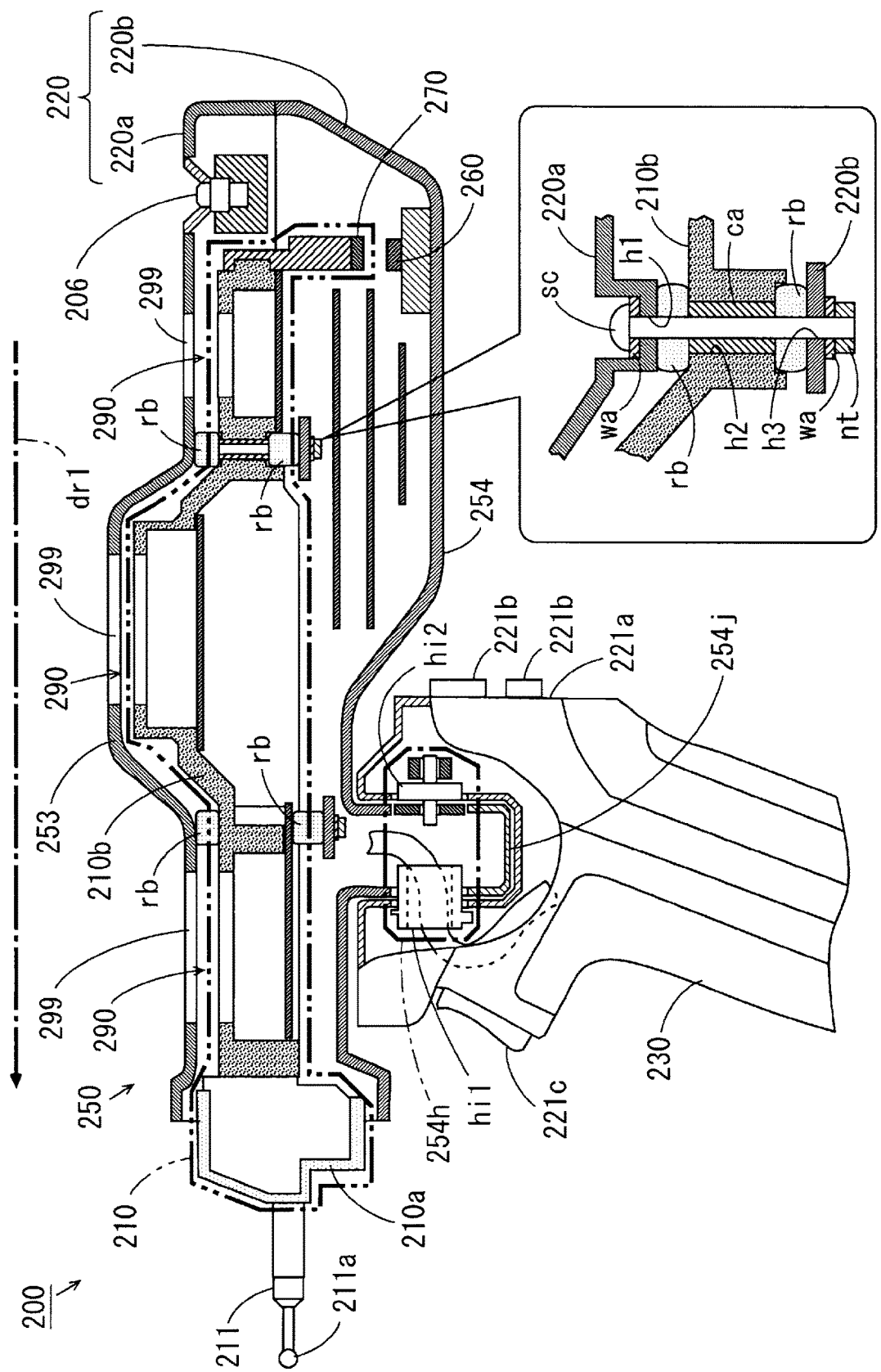
FIG. 20 is a partially cutaway sectional view of the probe illustrating an internal structure of a main body section.
Figure 21:
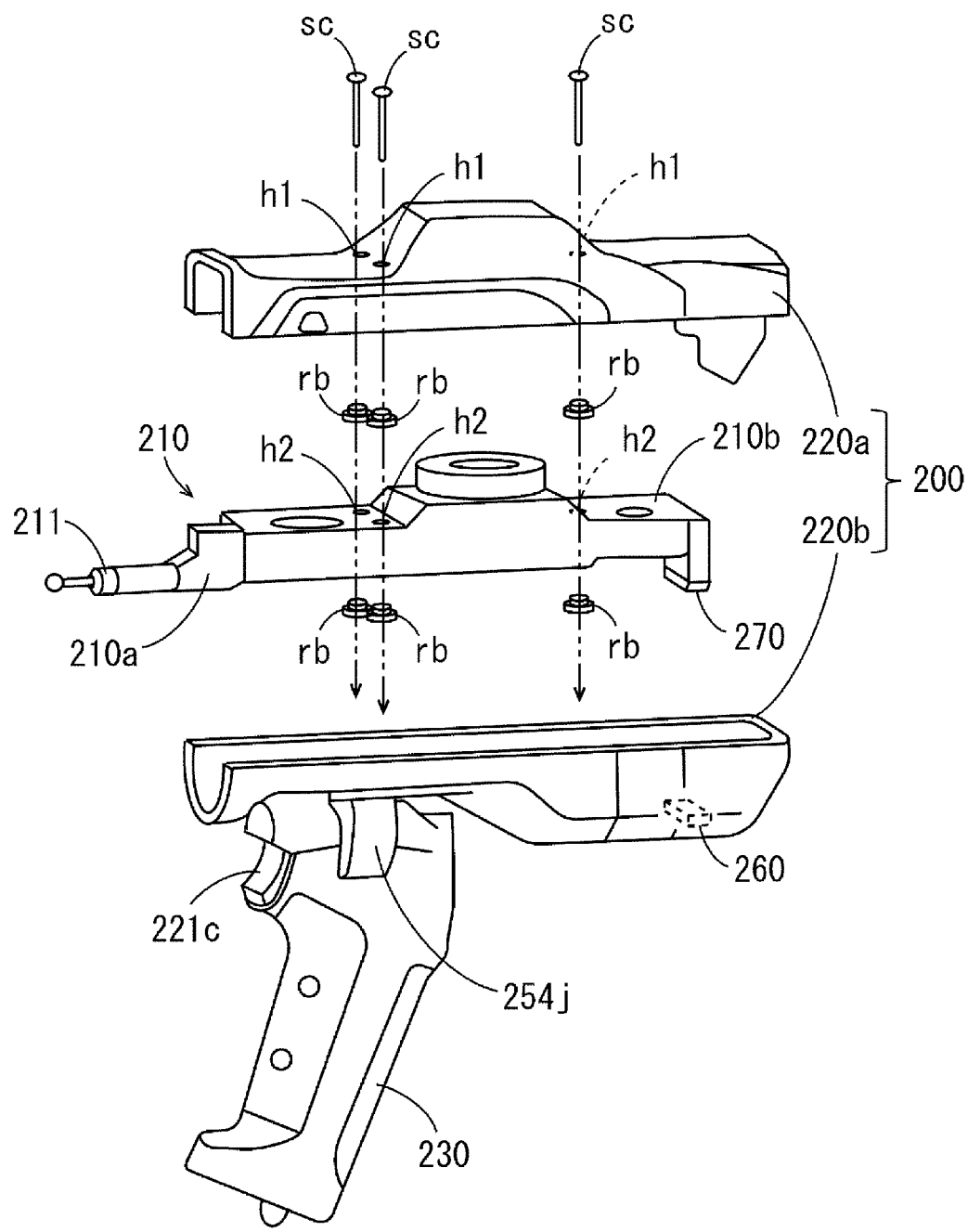
FIG. 21 is an exploded perspective view of the probe schematically illustrating the internal structure of the main body section.

FIG. 20 is a partially cutaway sectional view of the probe 200 illustrating an internal structure of the main body section 250. FIG. 21 is an exploded perspective view of the probe 200 schematically illustrating the internal structure of the main body section 250.

As illustrated in FIG. 20, the probe holding unit 210 mainly includes a stylus attachment unit 210a and a target member holding unit 210b. The stylus attachment unit 210a and the target member holding unit 210b are made of a material having low moisture absorption properties and a small linear expansion coefficient. In the present embodiment, the stylus attachment unit 210a is mainly made of invar (an alloy containing 64% of iron and 36% of nickel). In addition, the target member holding unit 210b is mainly made of quartz glass.

The plurality of attachment parts to which the stylus 211 can be attached are provided in the stylus attachment unit 210a. The target member holding unit 210b is formed to extend in one direction and holds the plurality of target members 290. The stylus attachment unit 210a is attached to one end part of the target member holding unit 210b. The stylus attachment unit 210a and the target member holding unit 210b are coupled such that a positional relationship therebetween does not change. Accordingly, in a state in which the stylus 211 is attached to the stylus attachment unit 210a, a positional relationship between the contact part 211a of the stylus 211 and the plurality of target members 290 is fixed to a predetermined positional relationship. Note that the probe holding unit 210 may be configured as a single member without being limited to the example of FIGS. 20 and 21.

On the other hand, the probe casing 220 mainly includes an upper casing 220a and a lower casing 220b. As illustrated in FIG. 21, when the probe 200 is assembled, the upper casing 220a and the lower casing 220b are arranged so as to sandwich the probe holding unit 210 and a plurality of rubber bushings rb.

As illustrated in FIG. 20, an opening part 299 is formed in the upper casing 220a at a position corresponding to the target member 290. A light-transmitting member that does not hinder capturing of an image of the target member 290 by the movable camera 120 may be arranged in the opening part 299. According to this configuration, the target member 290 is not exposed to the outside of the upper casing 220a, and thus, the possibility that the target member 290 is contaminated is reduced. In addition, the present embodiment adopts the configuration in which the opening part 299 is formed at the position corresponding to the target member 290, but the upper casing 220a itself may be configured using the light-transmitting member that does not hinder the capturing of the image of the target member 290 by the movable camera 120. Note that FIG. 21 does not illustrate the opening part 299.

Here, three through-holes h1 into which shaft parts of three screws sc can be inserted are formed in the upper casing 220a. In addition, three through-holes h2 corresponding to the three through-holes h1 of the upper casing 220a are formed in the target member holding unit 210b of the probe holding unit 210. Further, the lower casing 220b has a support section that supports the target member holding unit 210b. Three through-holes h3 (FIG. 20) respectively corresponding to the three through-holes h1 of the upper casing 220a and the three through-holes h2 of the target member holding unit 210b are formed in the support section.

The upper casing 220a and the lower casing 220b are coupled using the three screws sc. A state of one coupling section among three coupling sections coupled using the three screws sc is illustrated in a balloon of FIG. 20.

As illustrated in more detail in the balloon of FIG. 20, for example, a collar ca made of metal is inserted into the through-hole h2 of the target member holding unit 210b in each of the coupling sections. The screw sc is inserted through the through-hole h1 of the upper casing 220a, the collar ca, and the through-hole h3 of the lower casing 220b, and a nut nt is attached to a tip of the screw sc. A washer wa is arranged between an upper surface of the upper casing 220a and a head part of the screw sc, and the washer wa is arranged between the support section of the lower casing 220b and the nut nt.

Further, the rubber bushing rb having flexibility is arranged between the upper casing 220a and the target member holding unit 210b. In addition, the rubber bushing rb having flexibility is arranged between the target member holding unit 210b and the lower casing 220b. The stylus attachment unit 210a and the target member holding unit 210b have high rigidity, and the stylus attachment unit 210a and the target member holding unit 210b are firmly fixed. For this reason, when the stylus 211 is brought into contact with the measurement target S, a displacement of the probe holding unit 210 with respect to the probe casing 220 is dominant with respect to a deformation between the stylus attachment unit 210a and the target member holding unit 210b. In other words, the selection of the rubber bushing rb as an elastic body with respect to the rigidity for fixing the stylus attachment unit 210a and the target member holding unit 210b and the arrangement of the rubber bushings rb are determined such that a displacement between the probe casing 220 and the probe holding unit 210 becomes dominant with respect to a displacement between the stylus 211 and the target member 290 when the user U brings the stylus 211 into contact with the measurement target S.

With such a configuration, the probe holding unit 210 is movably held in the probe casing 220 by the plurality of rubber bushings rb. That is, the probe holding unit 210 is held in a freely movable state inside the probe casing 220. Since the rubber bushings rb are provided at positions corresponding to the screws sc, two thereof are arranged on the stylus 211 side, and one thereof is located on the magnetic sensor side.

Specifically, the probe holding unit 210 is held to be movable by about 2 mm as a load of about 1 N is applied to the probe casing 220, for example, in an up-down direction of the main body section 250 (a direction in which the upper surface part 253 and the bottom surface part 254 are arranged). In addition, the probe holding unit 210 is held to be movable by about 2 mm as a load of about 2 N is applied to the probe holding unit 210 or the probe casing 220, for example, in a left-right direction of the main body section 250 (a direction in which the one side surface part 255 and the other side surface part 256 are arranged). Further, the probe holding unit 210 is held to be movable by about 0.3 mm as a load of about 5 N is applied to the probe casing 220, for example, in a front-rear direction of the main body section 250 (a direction in which the front end part 251 and the rear end part 252 are arranged).

Since the rubber bushings rb are provided at the positions corresponding to the screws sc as described above, the two thereof are located side by side on the stylus 211 side, and the one thereof is located on the magnetic sensor side. Therefore, when a load is applied to the probe holding unit 210 or the probe casing 220 in the up-down direction of the main body section 250 in the state in which the stylus 211 is in contact with the measurement target S, the load is applied in a direction away from a plane including the three rubber bushings rb. At this time, the two rubber bushings rb on the stylus 211 side serve as fulcrums, and only the one rubber bushing rb on the magnetic sensor 270 side resists the load, and thus, the probe holding unit 210 moves with respect to the probe casing 220 even if the applied load is relatively small. In addition, when a load is applied to the probe holding unit 210 or the probe casing 220 in the front-rear direction of the main body section 250 in the state in which the stylus 211 is in contact with the measurement target S, the three rubber bushings rb resist the load, and thus, the amount of movement of the probe holding unit 210 with respect to the probe casing 220 is small even if the applied load is relatively large.

In this case, the plurality of rubber bushings rb function as buffer members, for example, even when a load directed to the measurement target S is applied to the grip section 230 in the state in which the contact part 211a of the stylus 211 is in contact with the measurement target S. As a result, the deformation of the probe holding unit 210 is suppressed, and the decrease in the measurement accuracy caused by a deviation of the positional relationship between the stylus 211 and the plurality of target members 290 is suppressed.

In addition, according to the above configuration, even when an impact is applied to the probe casing 220 due to falling or a collision of the probe 200, the impact transmitted from the probe casing 220 to the probe holding unit 210 is alleviated by the plurality of rubber bushings rb. As a result, the probe holding unit 210 is prevented from being damaged.

As illustrated in FIGS. 20 and 21, the magnetic sensor 270 is fixed to a lower end of the other end part of the target member holding unit 210b. Meanwhile, the magnet 260 is fixed to the bottom of the lower casing 220b so as to be separated from and face the magnetic sensor 270 in a state in which the probe holding unit 210 is accommodated in the probe casing 220. With such an arrangement, in a case where the probe holding unit 210 moves with respect to the probe casing 220, a change amount of a magnetic force applied from the magnet 260 to the magnetic sensor 270 is detected as the displacement amount of the probe holding unit 210 with respect to the probe casing 220.

In the present embodiment, the first direction dr1 of the probe 200 is defined as the direction parallel to the direction in which the front end part 251 and the rear end part 252 of the main body section 250 are arranged. Meanwhile, the probe holding unit 210 is held in the probe casing 220 through the plurality of rubber bushings rb as described above. Thus, in a case where a relative load is applied between the probe holding unit 210 and the probe casing 220, such as a case where the stylus 211 is brought into contact with the measurement target S, the positional relationship between the front end part 251 and the rear end part 252 of the main body section 250 changes. Therefore, the first direction dr1 is defined in a state in which a relative load is not applied between the probe holding unit 210 and the probe casing 220 and the probe 200 is in a predetermined posture in the present embodiment.

FIG. 20 illustrates not only a cross section of the main body section 250 but also a cross section of a connecting portion between the main body section 250 and the grip section 230. As illustrated in FIG. 20, the main body section 250 and the connecting part 254j are rotatably connected by the hinge 254h. The hinge 254h of this example includes a hollow member hi1 that guides the cable or the like between an internal space of the grip section 230 and an internal space of the main body section 250, and a shaft member hi2 that supports the grip section 230 with respect to the connecting part 254j.

[4] Method for Calculating Coordinates of Measurement Point

In the three-dimensional coordinate measuring device 1 according to the present embodiment, a three-dimensional coordinate system (hereinafter, referred to as a device coordinate system) having a predetermined relationship with the reference camera 110 is defined in advance. In addition, a relative positional relationship among the plurality of markers ep in the reference member 190 is stored in advance in the main body memory 303 of the processing device 300.

As described above, the reference camera 110 captures the image of the plurality of markers ep of the reference member 190. In this case, the main body control circuit 302 of FIG. 3 calculates each coordinate of each of the markers ep in the device coordinate system based on the reference image data obtained by capturing and the positional relationship among the plurality of markers ep stored in the main body memory 303. At this time, each of the plurality of markers ep of the reference member 190 is identified based on the first and second markers ep1 and ep2.

Thereafter, the main body control circuit 302 generates information indicating the a position and a posture of the movable camera 120 fixed on the reference member 190 in the device coordinate system, as first position and posture information, based on the calculated coordinates of the plurality of markers ep.

In the three-dimensional coordinate measuring device 1 according to the present embodiment, a three-dimensional coordinate system (hereinafter, referred to as a movable coordinate system) having a predetermined relationship with the movable camera 120 is defined in advance in addition to the above-described device coordinate system. In addition, a relative positional relationship among the plurality of markers eq in the probe 200 is stored in advance in the main body memory 303 of the processing device 300.

As described above, the movable camera 120 captures the image of the plurality of markers eq of the probe 200. In this case, the main body control circuit 302 of FIG. 3 calculates each coordinate of each of the markers eq in the movable coordinate system based on the measurement image data obtained by capturing and the positional relationship among the plurality of markers eq stored in the main body memory 303.

Thereafter, the main body control circuit 302 generates information indicating a position and a posture of the probe 200 in the movable coordinate system, as second position and posture information, based on the calculated coordinates of the plurality of markers eq.

The reference camera 110 is fixed onto the head bottom 101. Thus, the device coordinate system does not change when the measurement target S is measured. On the other hand, the movable camera 120 is rotatably provided such that the imaging field of view follows the movement of the probe 200. Thus, a relationship between the device coordinate system and the movable coordinate system changes as the movable camera 120 rotates.

Therefore, in the present embodiment, the main body control circuit 302 generates third position and posture information indicating a position and a posture of the probe 200 in the device coordinate system based on the first and second position and posture information. That is, the main body control circuit 302 calculates a relative relationship of the movable coordinate system with respect to the device coordinate system based on the first position and posture information, and converts the second position and posture information into information according to the device coordinate system based on the calculated relationship. As a result, the third position and posture information is generated.

Thereafter, the main body control circuit 302 calculates coordinates of a measurement point specified by the probe 200 based on the generated third position and posture information and the positional relationship between the plurality of markers eq and the contact part 211a in the probe 200.

[5] Measurement Example

The probe operation unit 221 of FIG. 13 is pressed by the user U to specify a measurement point, that is, to calculate coordinates of the measurement point. For example, the user U operates any of the plurality of push buttons 221b and the trigger switch 221c of the probe operation unit 221 in a state in which the contact part 211a is in contact with a desired portion of the measurement target S. Accordingly, a signal (hereinafter, referred to as a measurement point specifying signal) to specify a measurement point is output from the probe 200. In this case, in the processing device 300, coordinates of a contact portion of the measurement target S with the contact part 211a are calculated as the coordinates of the measurement point. The calculated coordinates of the measurement point are stored in the main body memory 303 as a measurement result and displayed on the main body display unit 310.

In the three-dimensional coordinate measuring device 1, the user U can set a desired measurement condition for the measurement target S by operating the main body operation unit 320 in FIG. 3 or by operating the probe operation unit 221 in FIG. 13.

Specifically, the user U selects a geometric element and a measurement item for the measurement target S. The geometric element is a type of geometric shape indicating a shape of a portion that needs to be measured in the measurement target S. Types of geometric shapes include a point, a straight line, a plane, a circle, a cylinder, a sphere, and the like. In addition, the measurement item indicates what needs to be measured for the measurement target S, and includes various physical quantities such as a distance, an angle, and flatness.

For example, the geometric element is selected. After selecting the geometric element, the user U specifies one or a plurality of measurement points using the probe 200 regarding the selected geometric element. As a result, information (hereinafter, referred to as element identifying information) indicating the selected geometric element identified by one or a plurality of measurement points on the measurement target S in the device coordinate system is generated. Thereafter, the measurement item is selected. After the selection of the measurement item, a value of the selected measurement item selected for the generated element identifying information is calculated.

For example, in a case where the user U wants to measure a distance between a first surface and a second surface of the measurement target S having the first surface and the second surface parallel and opposite to each other, the user U selects geometric elements "plane 1" and "plane 2".

In this case, the user U specifies a plurality of (three or more in this example) portions of the first surface of the measurement target S as measurement points using the probe 200 in order to identify the plane (first surface) on the measurement target S corresponding to the geometric element "plane 1". Accordingly, element identifying information corresponding to the geometric element "plane 1" is generated.

Further, the user U specifies a plurality of (three or more in this example) portions of the second surface of the measurement target S as measurement points using the probe 200 in order to identify the plane (second surface) on the measurement target S corresponding to the geometric element "plane 2". Accordingly, element identifying information corresponding to the geometric element "plane 2" is generated.

Thereafter, a measurement item "distance" is selected. At this time, the user U designates that "distance" is a distance between "plane 1" and "plane 2" for which pieces of the element identifying information have been generated. As a result, the distance between the first surface and the second surface of the measurement target S corresponding to the measurement item "distance" is calculated based on the two pieces of element identifying information respectively corresponding to the geometric elements "plane 1" and "plane 2". The calculated measurement result is stored in the main body memory 303 and displayed on the main body display unit 310.

[6] Measurement Processing

Figure 22:
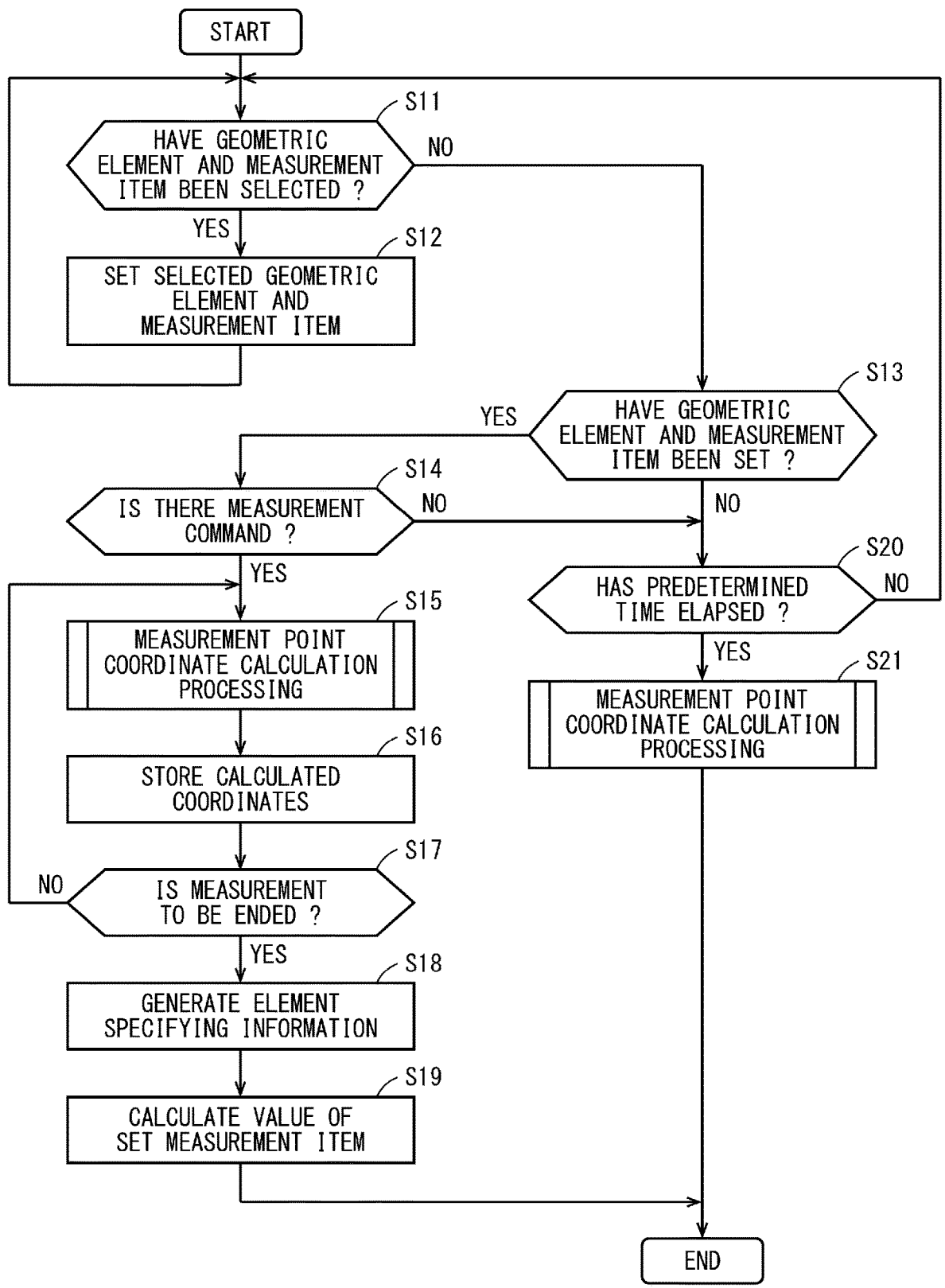
FIG. 22 is a flowchart illustrating a flow of measurement processing by a main body control circuit of FIG. 3.

FIG. 22 is a flowchart illustrating a flow of measurement processing by the main body control circuit 302 of FIG. 3. The measurement processing of FIG. 22 is repeatedly performed at a predetermined period as the CPU of the main body control circuit 302 of FIG. 3 executes the measurement processing program stored in the main body memory 303. In addition, a timer incorporated in the main body control circuit 302 is reset and started at the time of starting the measurement processing.

First, the main body control circuit 302 determines whether or not a geometric element and a measurement item have been selected based on whether or not the user U has operated the main body operation unit 320 in FIG. 3 (step S11). Note that the geometric element and the measurement item may be selected based on the operation of the probe operation unit 221 of FIG. 13 as described above. In this case, the main body control circuit 302 determines whether or not the selection of the geometric element and the measurement item has been performed based on whether or not a signal related to the selection of the geometric element and the measurement item has been received from the probe 200.

In a case where the geometric element and the measurement item have been selected, the main body control circuit 302 stores the selected geometric element and measurement item in the main body memory 303 of FIG. 3 to set the geometric element and the measurement item as the measurement condition (step S12). Thereafter, the main body control circuit 302 returns to the processing of step S11.

In a case where the geometric element and the measurement item are not selected in step S11, the main body control circuit 302 determines whether or not the geometric element and the measurement item have been set (step S13). In a case where the geometric element and the measurement item have been set, the main body control circuit 302 determines whether or not a command to start the measurement of the measurement target S is received (step S14). This determination is performed based on, for example, whether or not the user U operates the main body operation unit 320.

In a case where a command to start the measurement of the measurement target S is received, the main body control circuit 302 performs measurement point coordinate calculation processing (step S15). Details of the measurement point coordinate calculation processing will be described later. With this processing, the main body control circuit 302 calculates coordinates of a measurement point for identifying the selected geometric element based on the operation of the probe 200 by the user.

In addition, the main body control circuit 302 stores coordinates of one or more measurement points, calculated by the measurement point coordinate calculation processing of step S15, in the main body memory 303 (step S16).

Next, the main body control circuit 302 determines whether or not a command to end the measurement of the measurement target S has been received (step S17). This determination is performed based on, for example, whether or not the user U operates the main body operation unit 320.

In a case where such a measurement end command is not received, the main body control circuit 302 returns to the processing of step S15 described above. On the other hand, when receiving the measurement end command, the main body control circuit 302 generates element identifying information for the geometric element set from the coordinates of the one or more measurement points stored in the main body memory 303 in the immediately preceding process of the step S16 (step S18).

Thereafter, the main body control circuit 302 calculates a value of the measurement item set based on the element identifying information generated in the processing of step S18 (step S19), and ends the measurement processing. Note that, in a case where a plurality of geometric elements (for example, two planes or the like) have been set in the determination in step S13, the processes in steps S14 to S18 are performed for each of the set geometric elements.

In a case where the geometric element and the measurement item have not been set in step S13 and in a case where the command to start the measurement of the measurement target S is not received in step S14, the main body control circuit 302 determines whether or not a predetermined time has elapsed after the start of the measurement processing based on the time measured by the built-in timer (step S20).

In a case where the predetermined time has not elapsed, the main body control circuit 302 returns to the processing of step S11. On the other hand, in a case where the predetermined time has elapsed, the main body control circuit 302 performs measurement point coordinate calculation processing to be described later similarly to the processing of step S15 (step S21). Thereafter, the main body control circuit 302 ends the measurement processing.

Note that the processing of step S21 is performed to determine whether or not the probe 200 is within the imaging field of view of the movable camera 120 or the bird's eye view camera 180 in the tracking processing to be described later, for example.

Figure 23:
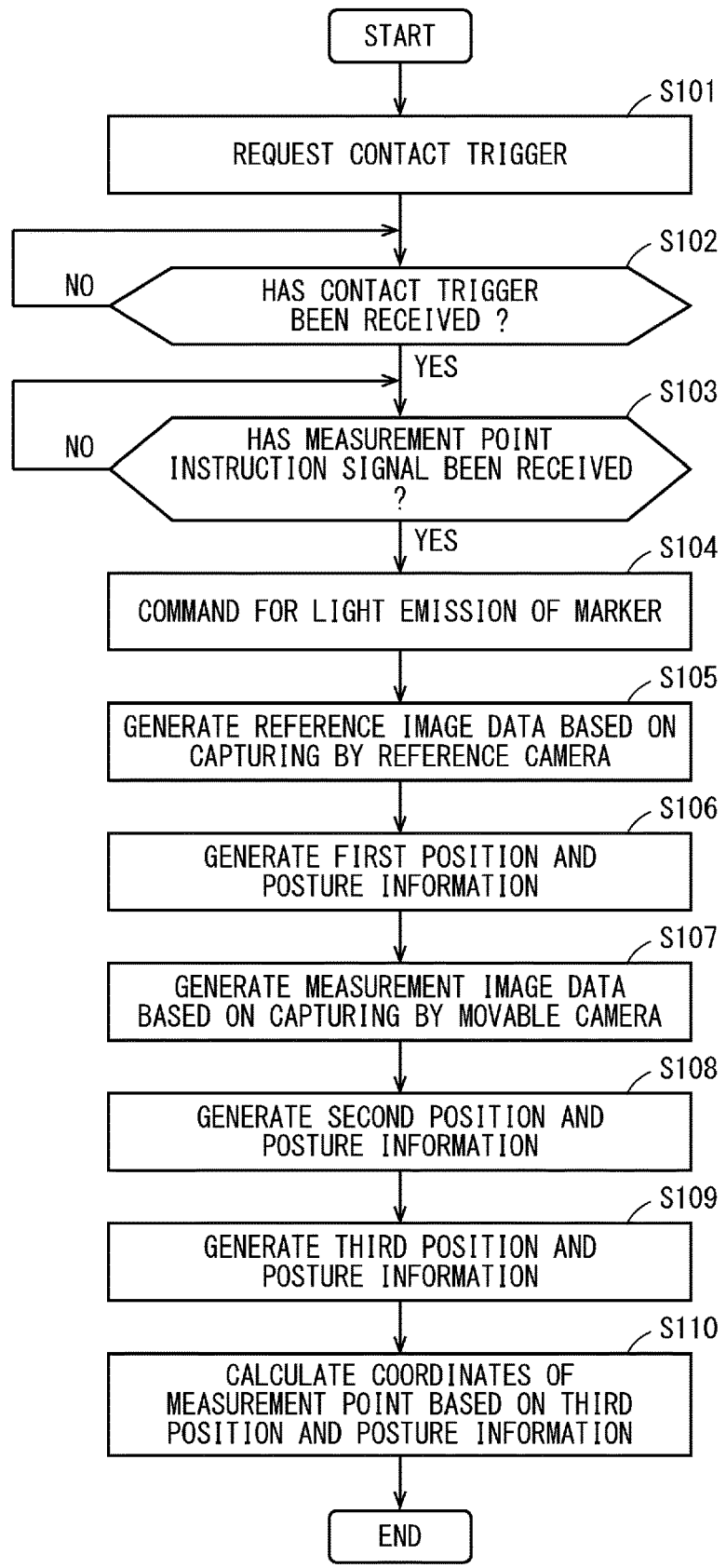
FIG. 23 is a flowchart illustrating a flow of measurement point coordinate calculation processing.

FIG. 23 is a flowchart illustrating a flow of the measurement point coordinate calculation processing. First, the main body control circuit 302 requests the probe control unit 201 of the probe 200 to output a contact trigger (step S101). Details of the contact trigger will be described later. Thereafter, the main body control circuit 302 determines whether or not the contact trigger is received from the probe 200 (step S102).

In a case where the contact trigger is not received in step S102, the main body control circuit 302 repeats the processing of step S102. On the other hand, in a case where the contact trigger has been received, the main body control circuit 302 determines whether or not the user U has operated the probe operation unit 221 to specify a measurement point. That is, the main body control circuit 302 determines whether or not the measurement point specifying signal has been received from the probe 200 based on the operation of the probe operation unit 221 by the user U (step S103).

In a case where the measurement point specifying signal is not received in step S103, the main body control circuit 302 repeats the processing of step S103. On the other hand, in a case where the measurement point specifying signal has been received, the main body control circuit 302 commands the probe control unit 201 of the probe 200 to perform light emission of the plurality of markers eq (FIG. 14), and commands the head control circuit 150 of the imaging head 100 to perform light emission of the plurality of markers ep (FIG. 10B) of the reference member 190 (step S104).

Next, the main body control circuit 302 causes the head control circuit 150 to capture an image of the plurality of markers ep of the reference member 190 using the reference camera 110 to generate the reference image data (step S105). In addition, the main body control circuit 302 generates the first position and posture information indicating the position and posture of the movable camera 120 by the device coordinate system based on the generated reference image data (step S106).

Next, the main body control circuit 302 captures an image of the plurality of markers eq of the probe 200 using the movable camera 120 to generate the measurement image data (step S107). In addition, the main body control circuit 302 generates the second position and posture information indicating the position and posture of the probe 200 by the movable coordinate system based on the generated measurement image data (step S108).

Thereafter, the main body control circuit 302 generates the third position and posture information indicating the position and posture of the probe 200 in the device coordinate system based on the first and second position and posture information (step S109). In addition, the main body control circuit 302 calculates coordinates of the measurement point specified by the probe 200 based on the generated third position and posture information (step S110).

In the above-described measurement point coordinate calculation processing, the processing of step S103 may be omitted. In this case, the main body control circuit 302 performs the processing of step S104 in response to the contact trigger output from the probe 200. Note that the processing of steps S105 and S106 and the processing of steps S107 and S108 may be performed in reverse order.

In addition, regarding the processing of steps S104 and S107 described above, the main body control circuit 302 may output a command for capturing an image of the plurality of markers eq by the movable camera 120 before commanding the probe 200 to perform the light emission of the plurality of markers eq (FIG. 14). Alternatively, the main body control circuit 302 may output the command for the light emission and the command for the capturing such that the imaging timing of the movable camera 120 is synchronized with the light emission timing of the plurality of markers eq. In this case, it is desirable to output the command for the light emission and the command for the capturing in consideration of a delay time according to a type of wireless communication (optical communication or Bluetooth (registered trademark)) between the imaging head 100 and the probe 200. In these cases, the light emission time of the plurality of markers eq of the probe 200 can be shortened, and thus, the consumption of the battery 203 of the probe 200 can be reduced.

According to the above-described measurement processing, the user U can easily measure a desired physical quantity in the measurement target S by selecting desired geometric element and measurement item from among a plurality of predetermined geometric elements and a plurality of predetermined measurement items.

[7] Contact Trigger Output Processing

In the measurement point coordinate calculation processing of FIG. 23, coordinates of a measurement point are not calculated unless the contact trigger is output from the probe 200 to the processing device 300. In the probe 200, the contact trigger is output by the probe control unit 201 executing the contact trigger output processing to be described hereinafter.

Figure 24:
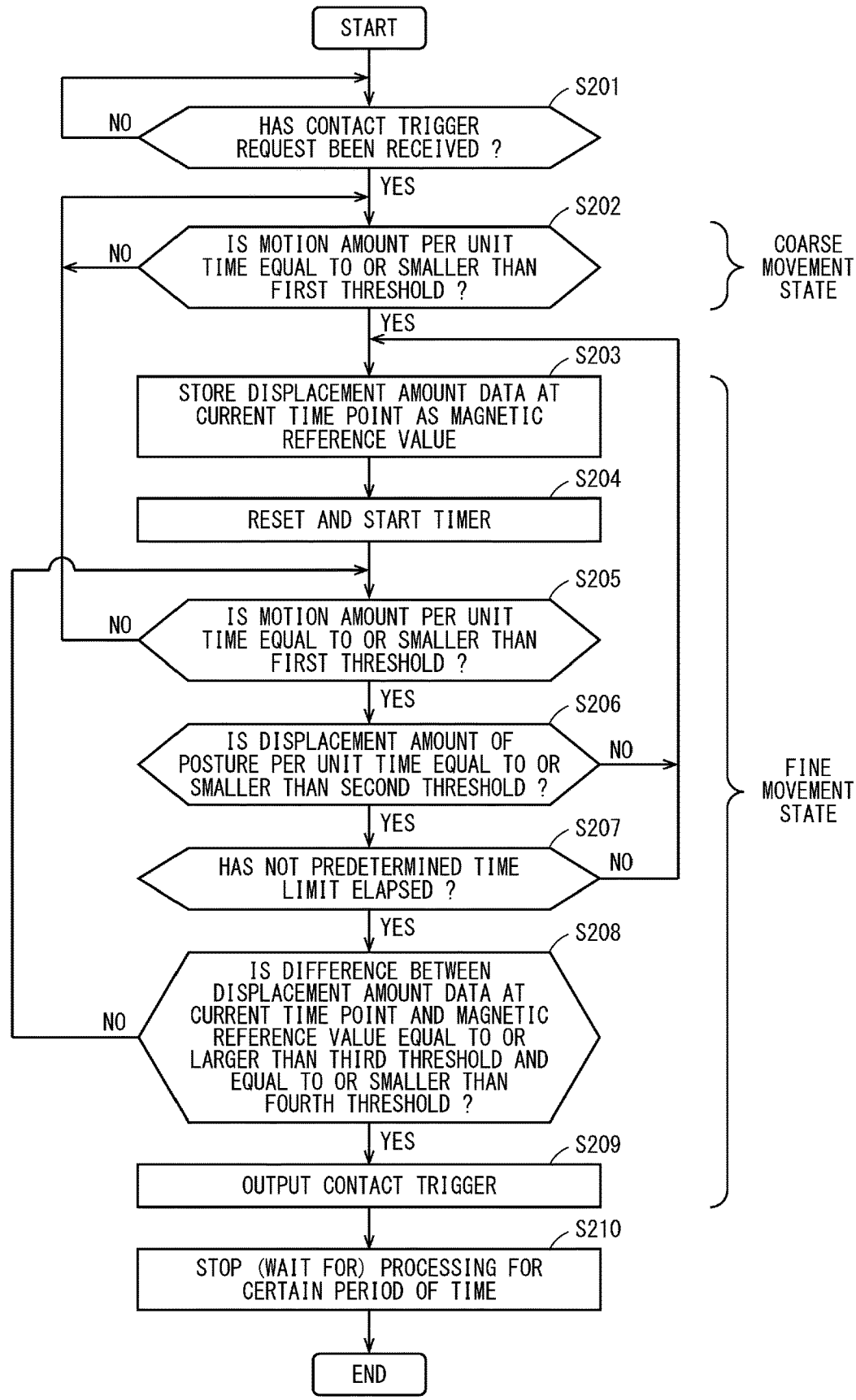
FIG. 24 is a flowchart illustrating a flow of contact trigger output processing by a probe control unit of FIG. 13.

FIG. 24 is a flowchart illustrating a flow of the contact trigger output processing by the probe control unit 201 in FIG. 13. The contact trigger output processing of FIG. 24 is repeatedly performed at a predetermined period as the CPU of the probe control unit 201 of FIG. 13 executes the contact trigger output program stored in the probe memory 205.

First, the probe control unit 201 determines whether or not a contact trigger request has been received from the processing device 300 (step S201). In a case where the contact trigger request is not received, the probe control unit 201 repeats the processing of step S201. On the other hand, in a case where the contact trigger has been received, the probe control unit 201 determines whether or not a motion amount of the probe 200 per unit time is equal to or smaller than a first threshold based on the motion data obtained by the motion sensor 207 (step S202).

The processing of step S202 is processing for determining whether or not the probe 200 is in a state of greatly moving with respect to the measurement target S (hereinafter, referred to as a coarse movement state) at a predetermined time in a stage a predetermined time before a time point at which a measurement point is specified. Thus, the first threshold is set to, for example, a value (for example, acceleration of about 1.1 m/sec$^2$) estimated as the speed of the probe 200 immediately before the measurement point is specified.

In the following description, a state in which the probe 200 itself hardly moves and a posture of the probe 200 has changed and a state in which the probe 200 itself hardly moves and a positional relationship between the probe holding unit 210 and the probe casing 220 has changed are referred to as a fine movement state. The fine movement state of the probe 200 is, for example, the state of the probe 200 immediately before the time point at which the measurement point is specified.

In addition, a state in which the probe 200 itself hardly moves, the posture of the probe 200 hardly changes, and the positional relationship between the probe holding unit 210 and the probe casing 220 hardly changes is referred to as a stop state in the following description. The stop state of the probe 200 is a state of the probe 200 suitable for specifying a measurement point.

In step S202, in a case where the motion amount of the probe 200 per unit time is larger than the first threshold, the probe control unit 201 repeats the processing of step S202. In this case, it is determined that the probe 200 is in the state of greatly moving, that is, in the coarse movement state. On the other hand, in a case where the motion amount of the probe 200 per unit time is equal to or smaller than the first threshold, the probe control unit 201 determines that the probe 200 itself hardly moves, and is at least in the fine movement state. In the case where the motion amount of the probe 200 per unit time is equal to or smaller than the first threshold, the probe control unit 201 causes the probe memory 205 to store the displacement amount data obtained by the magnetic sensor 270 at the current time point as a magnetic reference value (step S203). This processing of step S203 corresponds to setting of a reference condition of the present invention.

Subsequently, whether or not the probe 200 has changed from the fine movement state to the stop state is determined in steps S204 to S208 to be described later. Specifically, after the processing of step S203, the probe control unit 201 resets the timer built in the probe control unit 201 and starts counting (step S204). Thereafter, the probe control unit 201 determines whether or not the motion amount of the probe 200 per unit time is equal to or smaller than the first threshold based on the motion data obtained by the motion sensor 207 similarly to the processing of step S202 (step S205). In the case where the motion amount per unit time is larger than the first threshold in step S205, the probe control unit 201 returns the processing to step S202. On the other hand, in the case where the motion amount of the probe 200 per unit time is equal to or smaller than the first threshold in step S205, the probe control unit 201 determines whether or not a change amount of the posture of the probe 200 per unit time is equal to or smaller than a second threshold based on the posture data obtained by the motion sensor 207 (step S206). That is, the probe control unit 201 determines whether or not the posture of the probe 200 is maintained in a substantially stable state.

Here, in a case where the change amount of the posture is larger than the second threshold, the probe control unit 201 returns the processing to step S203. On the other hand, in a case where the change amount of the posture is equal to or smaller than the second threshold, the probe control unit 201 determines whether or not a predetermined time limit has elapsed from a start time point of step S204 based on the counting of the built-in timer (step S207).

In step S207, in a case where the predetermined time limit has elapsed from the start time point of step S204, the probe control unit 201 returns the processing to step S203. As a result, according to the processing of step S203 after the processing of step S207, the magnetic reference value is updated with new displacement amount data every time the time limit elapses unless processing of step S209, which will be described later, is performed. This time limit is set to, for example, about 2 to 5 sec.

Inside the probe casing 220 of the probe 200, a relatively high mobility of the probe holding unit 210 is secured by the plurality of rubber bushings rb. Thus, in a case where the posture of the probe 200 gradually changes, the probe holding unit 210 moves in the probe casing 220 by its own weight. On the other hand, according to the processing of step S206 described above, the magnetic reference value is updated per time limit. As a result, even when the magnetic reference value is not an appropriate value due to the gradual change in the posture of the probe 200, an appropriate magnetic reference value is reset by new displacement amount data every time the time limit elapses.

In a case where the predetermined time limit has not elapsed from the start time point of step S204 in step S207, the probe control unit 201 determines whether or not a difference between the displacement amount data obtained by the magnetic sensor 270 at the current time point and the magnetic reference value is equal to or larger than a predetermined third threshold and equal to or smaller than a fourth threshold (step S208).

Here, the third threshold is set to, for example, a displacement amount of the probe holding unit 210 estimated to change at a minimum immediately before the measurement point is specified. In other words, the third threshold is set to the displacement amount of the probe holding unit 210 estimated when the user U has pressed the stylus 211 against the measurement target S.

On the other hand, the fourth threshold is set to a displacement amount of the probe holding unit 210 considered not to be inappropriate when the measurement point is specified. Specifically, the fourth threshold is set to the displacement amount that is lower than a value at which distortion is estimated to occur in the probe holding unit 210 due to excessive movement of the probe holding unit 210 with respect to the probe casing 220. Therefore, the fourth threshold is preferably updated when the magnetic reference value is updated.

In step S208, in a case where the difference between the displacement amount data and the magnetic reference value is not within a range from the third threshold to the fourth threshold, the probe control unit 201 advances the processing to step S205. On the other hand, in a case where the difference between the displacement amount data and the magnetic reference value is within the range from the third threshold to the fourth threshold, the probe control unit 201 outputs the contact trigger as a signal indicating that the measurement point can be appropriately specified in the current state of the probe 200 (step S209). In other words, the contact trigger is a signal to permit a start of processing for calculating the coordinates of the specified measurement point. The contact trigger is transmitted to the imaging head 100 through the wireless communication circuit 206, and is further transmitted from the imaging head 100 to the processing device 300. For this reason, when the difference between the displacement amount data and the magnetic reference value is within the predetermined range, it is determined whether or not the measurement point specifying signal has been received in step S103. That is, the probe 200 is often in the state suitable for the measurement when the user U operates the probe operation unit 221. Therefore, reproducibility of the measurement is improved. It goes without saying that the reproducibility of the measurement is improved even when step S103 is omitted.

Finally, the probe control unit 201 stops the processing operation for a certain period of time after the output of the contact trigger (step S210). That is, the probe control unit 201 is set to a standby state. This processing is performed to prevent a new contact trigger from being output when the contact part 211a in contact with the measurement target S is pulled apart from the measurement target S. The certain period of time in step S210 is, for example, about 0.5 sec. Thereafter, the contact trigger output processing ends.

[8] Tracking Processing

Figure 25:
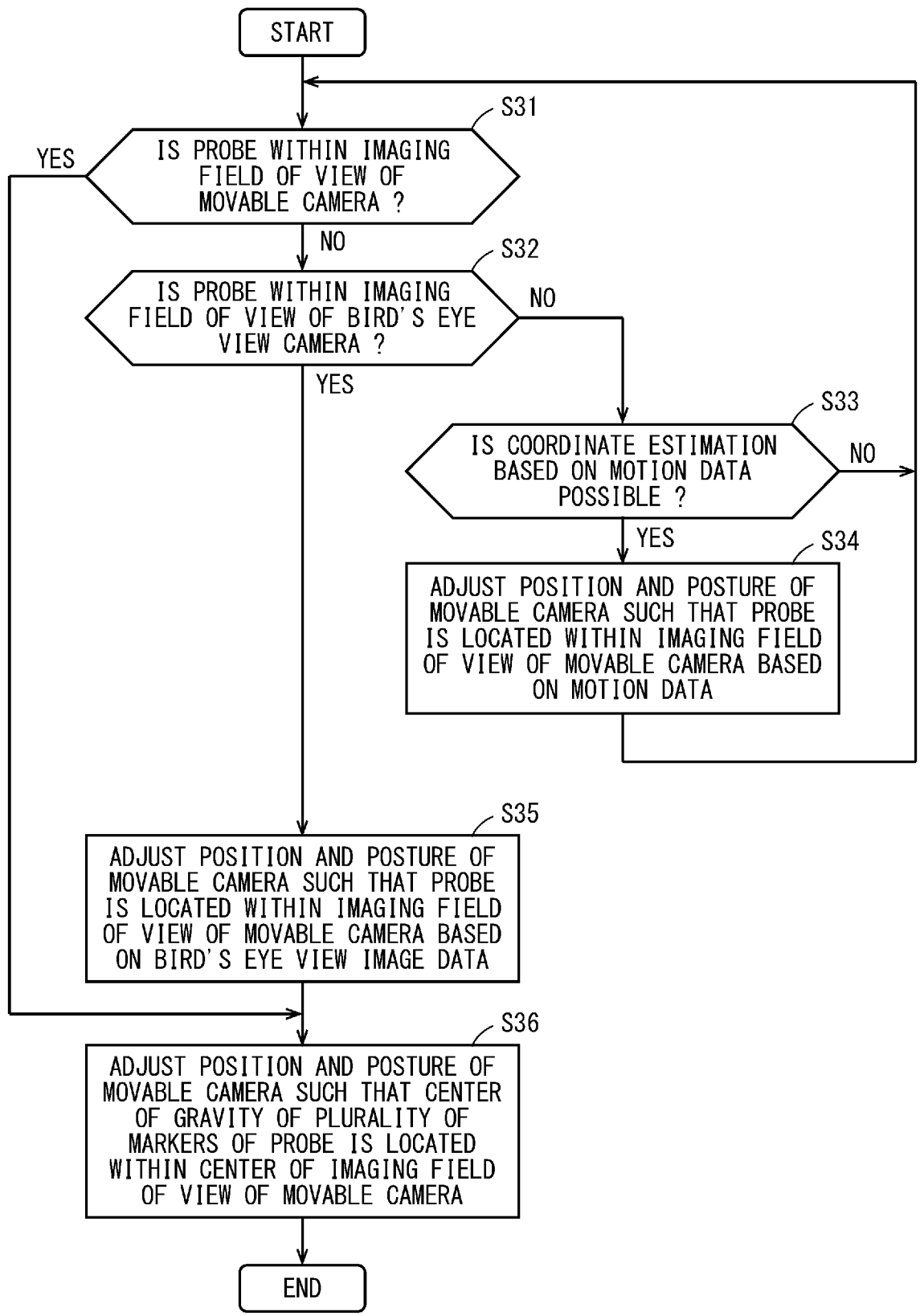
FIG. 25 is a flowchart illustrating a flow of tracking processing by the main body control circuit of FIG. 3.

FIG. 25 is a flowchart illustrating a flow of the tracking processing by the main body control circuit 302 of FIG. 3. The tracking processing of FIG. 25 is repeatedly performed at a predetermined period as the CPU of the main body control circuit 302 of FIG. 3 executes the tracking processing program stored in the main body memory 303.

First, the main body control circuit 302 determines whether or not the probe 200 is within the imaging field of view of the movable camera 120 (step S31). This determination is performed by determining whether or not image data corresponding to the plurality of markers eq is included in the measurement image data generated during the processing of steps S15 and S21 in the measurement processing.

In a case where the probe 200 is within the imaging field of view of the movable camera 120, the main body control circuit 302 proceeds to processing of step S36 to be described later. On the other hand, in a case where the probe 200 is not within the imaging field of view of the movable camera 120, the main body control circuit 302 determines whether or not the probe 200 is within the imaging field of view of the bird's eye view camera 180 (step S32). This determination is performed by determining whether or not image data corresponding to the plurality of markers eq is included in the bird's eye view image data generated during the processing of steps S15 and S21 in the measurement processing.

The motion data generated in the probe 200 is sent from the probe 200 to the processing device 300 through the imaging head 100. In a case where the probe 200 is within the imaging field of view of the bird's eye view camera 180, the main body control circuit 302 proceeds to processing of step S35 to be described later. On the other hand, in a case where the probe 200 is not within the imaging field of view of the movable camera 120, the main body control circuit 302 determines whether or not estimation of coordinates of the probe 200 can be performed based on the motion data transferred from the probe 200 (step S33). This determination is performed based on, for example, whether or not the motion data indicates an abnormal value or whether or not the value indicated by the motion data is zero. In a case where the motion data indicates an abnormal value or in a case where the motion data is zero, the estimation of coordinates of the probe 200 is not possible.

In a case where the estimation of coordinates of the probe 200 is not possible, the main body control circuit 302 returns to the processing of step S31. On the other hand, in a case where the estimation of coordinates of the probe 200 is possible, the main body control circuit 302 estimates a position of the probe 200 based on the motion data. In addition, the main body control circuit 302 commands to adjust a position and a posture of the movable camera 120 such that the probe 200 is located within the imaging field of view of the movable camera 120 (step S34). Thereafter, the main body control circuit 302 returns to the processing of step S31.

In step S32, in a case where the probe 200 is within the imaging field of view of the bird's eye view camera 180, the main body control circuit 302 calculates a position of the probe 200 based on the bird's eye view image data. In addition, the main body control circuit 302 commands the head control circuit 150 to adjust a position and a posture of the movable camera 120 such that the probe 200 is located within the imaging field of view of the movable camera 120 (step S35).

Next, the main body control circuit 302 commands the head control circuit 150 to adjust the position and posture of the movable camera 120 such that the center of gravity of the plurality of markers eq of the probe 200 is located at the center of the imaging field of view of the movable camera 120 when the probe 200 is located within the imaging field of view of the movable camera 120 (step S36). Thereafter, the main body control circuit 302 ends the tracking processing.

According to the above-described tracking processing, the imaging field of view of the movable camera 120 follows the plurality of markers eq of the probe 200 even when the probe 200 moves. As a result, the user U does not need to manually adjust the imaging field of view of the movable camera 120. Therefore, it is possible to measure coordinates of a desired measurement point of the measurement target S in a wide range without requiring complicated adjustment work.

[9] Effects (1) In the probe 200, the contact part 211a of the stylus 211 is brought into contact with the measurement target S to specify the measurement point. The stylus 211 and the probe holding unit 210 are coupled to each other in the predetermined positional relationship. The coordinates of the specified measurement point are calculated based on image data obtained by capturing the image of the plurality of markers eq held by the probe holding unit 210 and the positional relationship between the stylus 211 and the probe holding unit 210. Thus, the load applied from the contact part 211a of the stylus 211 to the measurement target S when the measurement point is specified is desirably set to a degree that does not cause a change in the positional relationship between the stylus 211 and the probe holding unit 210. That is, the load is desirably set to a degree that does not cause excessive distortion in the stylus 211 and the probe holding unit 210.

In the probe 200, the probe holding unit 210 is connected to the probe casing 220 so as to be freely movable. Thus, in the case where the contact part 211*a* of the stylus 211 is brought into contact with the measurement target S, the stylus 211 and the probe holding unit 210 move relative to the probe casing 220 before distortion occurs in the stylus 211 and the probe holding unit 210. At this time, a change in the output of the displacement amount data obtained by the magnetic sensor 270 represents a change in the positional relationship between the stylus 211 and the probe holding unit 210, and the probe casing 220. Therefore, it is possible to appropriately determine a timing for specifying the measurement point so as to prevent the excessive distortion in the stylus 211 and the probe holding unit 210 based on a degree of the change in the positional relationship between the stylus 211 and the probe holding unit 210, and the probe casing 220 according to the displacement amount data. As a result, it is possible to calculate the coordinates of the measurement point of the measurement target S with high accuracy regardless of the rigidity of the stylus 211 and the probe holding unit 210.

(2) In the probe 200, the magnet 260 and the magnetic sensor 270 are used to detect the displacement amount of the probe holding unit 210 with respect to the probe casing 220. According to the magnetic sensor 270, it is possible to detect the displacement amount of the probe holding unit 210 with respect to the probe casing 220 regardless of a displacement fluctuation direction. In this case, it is unnecessary to prepare a plurality of displacement gauges for detecting displacements respectively corresponding to a plurality of directions. Therefore, an increase in the number of components of the probe 200 is suppressed.

[10] Use Example of Probe Camera 208

When an image of the measurement target S is captured by the probe camera 208 in FIG. 13, the image of the measurement target S can be displayed on the main body display unit 310 in FIG. 3. Hereinafter, the image obtained by the probe camera 208 is referred to as a captured image.

The positional relationship between the plurality of markers eq of the probe 200 and the probe camera 208 and characteristics (angle of view, distortion, and the like) of the probe camera 208 are stored in advance as imaging information in the main body memory 303 of FIG. 3, for example. Thus, in a case where the plurality of markers eq are present within the imaging field of view of the movable camera 120, an area whose image is captured by the probe camera 208 is recognized by the main body control circuit 302 in FIG. 3. That is, a three-dimensional space corresponding to the captured image is recognized by the main body control circuit 302. In this case, it is possible to superimpose and display the geometric element and measurement item set at the time of measuring the measurement target S while displaying the captured image on the main body display unit 310.

[11] Preferred Functions
(1) Preferred Selection Function Related to Measurement Point Coordinate Calculation Processing As described above, the processing of step S103 in FIG. 23 may be omitted in the measurement point coordinate calculation processing. Here, an operating state of the main body control circuit 302 when the series of processing in FIG. 23 is executed is referred to as a first specifying mode, and an operating state of the main body control circuit 302 when the series of processing of FIG. 23 excluding the processing of step S103 is executed is referred to as a second specifying mode.

The three-dimensional coordinate measuring device 1 preferably has a specifying mode selection function capable of selecting an operation of the main body control circuit 302 between the first specifying mode and the second specifying mode based on an operation of the main body operation unit 320 by the user U, for example. In this case, the user U can easily select an operating mode of the main body control circuit 302 between the first specifying mode and the second specifying mode according to the own preference.

In a case where the operating state of the main body control circuit 302 is in the first specifying mode, the user U brings the contact part 211*a* into contact with a desired portion of the measurement target S, and operates the probe operation unit 221 in the state in which the contact part 211*a* is in contact with the measurement target S. As a result, a measurement point is specified.

On the other hand, in a case where the operating state of the main body control circuit 302 is in the second specifying mode, the user U brings the contact part 211*a* into contact with a desired portion of the measurement target S. As a result, a measurement point is specified by performing the processing of step S104 in response to the contact trigger output from the probe 200. In this manner, the user U does not need to operate the probe operation unit 221 at the time of specifying the measurement point according to the second specifying mode.

(2) Screen Operation Function Using Probe 200

As described above, the user U can measure a desired physical quantity related to the measurement target S after setting a desired measurement condition. The user U selects a geometric element and a measurement item to set the desired measurement condition. A screen for selecting the geometric element and the measurement item is displayed on the main body display unit 310 (FIG. 3) as a measurement screen, for example. Therefore, the user U selects the geometric element and the measurement item on the measurement screen of the main body display unit 310 by operating the main body operation unit 320 (FIG. 3).

Figure 26:
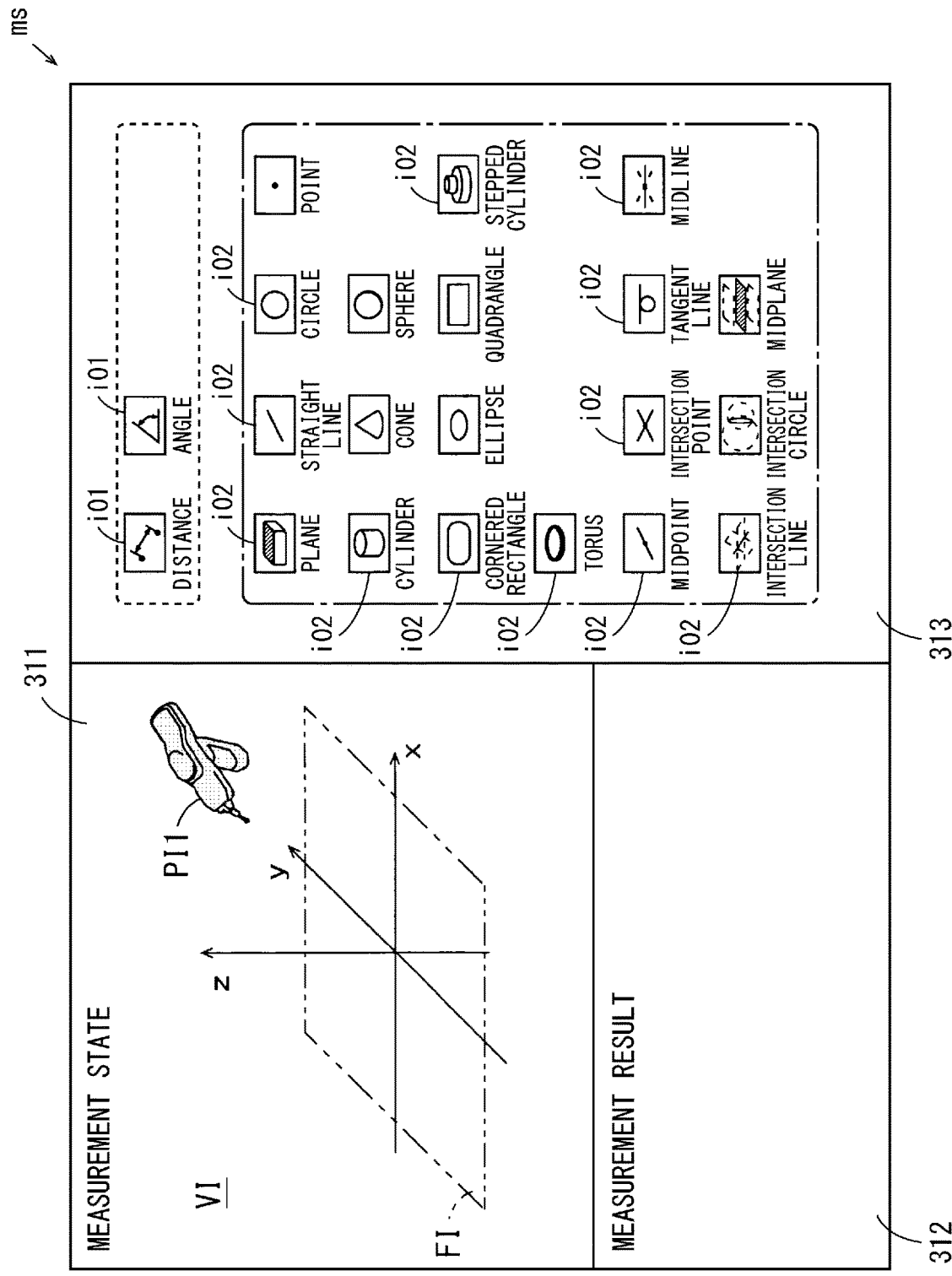
FIG. 26 is a view illustrating an example of a measurement screen displayed on a main body display unit in the initial stage of measurement of the measurement target.

FIG. 26 is a view illustrating an example of the measurement screen displayed on the main body display unit 310 in the initial stage of measurement of the measurement target S. In the measurement screen ms, a display area of the main body display unit 310 is divided into a measurement state display area 311, a result display area 312, and an operation display area 313.

As illustrated in FIG. 26, an image (hereinafter, referred to as a measurement area virtual image) VI that virtually represents an area in which coordinates of a measurement point can be calculated by the three-dimensional coordinate measuring device 1, in other words, an area in which dimensions of the measurement target S can be measured by the three-dimensional coordinate measuring device 1 is illustrated in the measurement state display area 311.

In the three-dimensional coordinate measuring device 1, an x-axis and a y-axis of the device coordinate system are set so as to be orthogonal to each other and parallel with a flat and horizontal virtual floor surface and a z-axis is set so as to be orthogonal to the floor surface. The measurement area virtual image VI of FIG. 26 includes a floor image FI corresponding to the virtual floor surface in addition to the x-axis, the y-axis, and the z-axis of the device coordinate system. Further, an image (hereinafter, referred to as a probe image) PI1 indicating a position and a posture of the probe 200 in the device coordinate system is included. Information indicating the position and posture of the probe 200 can be acquired by the measurement point coordinate calculation processing. Accordingly, the user U can easily grasp which position and posture in the device coordinate system the probe 200 is arranged at by visually recognizing the measurement area virtual image VI.

The result display area 312 is an area that mainly displays a measurement result. Thus, no information is displayed in the result display area 312 in the initial stage of measurement. The operation display area 313 is an area in which at least one of an icon and a button to be operated by the user U and a display field indicating predetermined information is displayed.

Specifically, a plurality of (two in this example) item icons i01 respectively corresponding to a plurality of predetermined measurement items are displayed in the operation display area 313 in FIG. 26 as indicated in a dotted line frame. The two item icons i01 in this example correspond to measurement items "distance" and "angle", respectively.

In addition, a plurality of (nineteen in this example) element icons i02 respectively corresponding to a plurality of predetermined geometric elements are displayed in the operation display area 313 as indicated in a one-dot chain line frame. The plurality of element icons i02 include a plurality of element icons i02 respectively corresponding to geometric elements "plane", "straight line", "circle", "point", "cylinder", "cone", and "sphere". Further, the plurality of element icons i02 include a plurality of element icons i02 respectively corresponding to geometric elements "rounded rectangle", "ellipse", "quadrangle", "stepped cylinder", "torus", "midpoint", "intersection point", "tangent line", "midline", "intersection line", "intersection circle", and "midplane".

The user U can select the element icon i02 indicating a desired geometric element from the plurality of element icons i02 by operating the main body operation unit 320 in FIG. 3. In addition, the user U can select the item icon i01 indicating a desired measurement item from the plurality of item icons i01 by operating the main body operation unit 320 in FIG. 3. In addition, in a case where the three-dimensional coordinate measuring device 1 has the specifying mode selection function as described above, the user U can select a desired specifying mode for the operating state of the main body control circuit 302 by operating the main body operation unit 320 in FIG. 3.

Meanwhile, if a distance between the measurement target S and the main body operation unit 320 is large, it is difficult for the user U to perform the work of specifying the measurement point using the probe 200 and the work of selecting the geometric element, the measurement item, and the specifying mode using the main body operation unit 320 at one site. In this case, the user U needs to frequently move between the measurement target S and the main body operation unit 320 at the time of measuring the measurement target S. In this manner, the frequent movement of the user U between the measurement target S and the main body operation unit 320 significantly lowers the measurement efficiency of the measurement target S. Thus, the three-dimensional coordinate measuring device 1 according to the present embodiment may have a screen operation function capable of selecting each of the geometric element, the measurement item, and the specifying mode using the probe 200. Hereinafter, an example of the screen operation function will be described.

(3) Screen Transition Example by Screen Operation Function

In the following description, the substantially rectangular push button 221b among the four push buttons 221b illustrated in FIG. 15 is referred to as an up button. In addition, the push button 221b located farthest from the up button among the remaining three push buttons 221b is referred to as a down button. Further, the two push buttons 221b, arranged on the left and right sides between the up button and the down button when the operation surface 221a is viewed such that the up button and the down button are located up and down, are referred to as a left button and a right button.

In the three-dimensional coordinate measuring device 1 having the screen operation function, the up button, the down button, the left button, and the right button of the probe 200 are used as an operation button for selecting any of the plurality of types of buttons or icons displayed on the main body display unit 310. In addition, the trigger switch 221c illustrated in FIG. 14 is appropriately used as a determination button.

Figure 27:
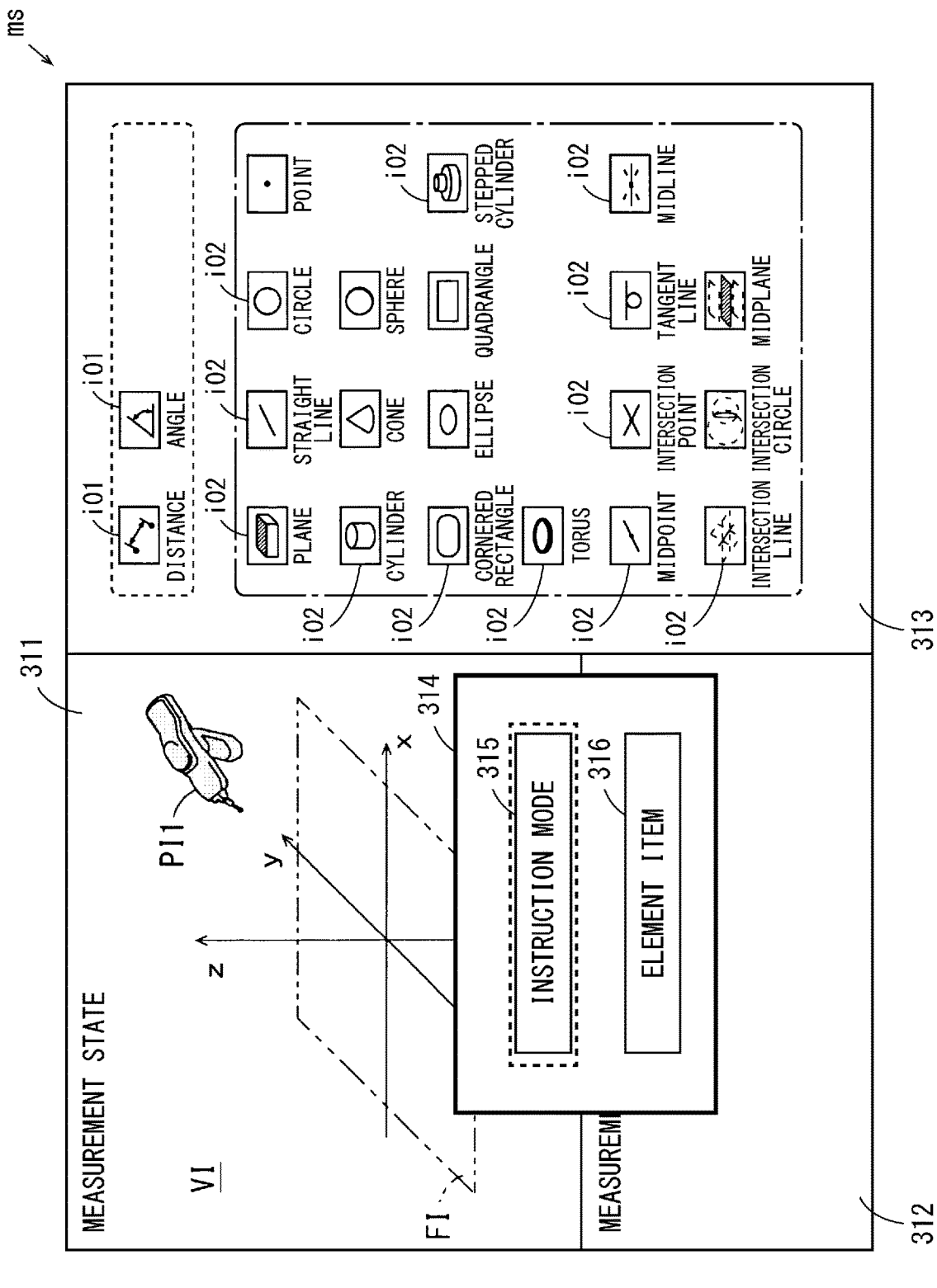
FIG. 27 is a view illustrating an example of a measurement screen when a screen operation function is activated at the time of measuring the measurement target.

FIG. 27 is a view illustrating an example of the measurement screen ms when the screen operation function is activated at the time of measuring the measurement target S. The screen operation function is activated when the user U presses, for example, one of the plurality of push buttons 221b of the probe operation unit 221 (for example, the up button) for about 2 sec. Note that the screen operation function may be activated by long-pressing of the trigger switch 221c (FIG. 14) instead of the up button.

When the screen operation function is activated, a selection setting window 314 for setting a screen operation by the probe 200 is superimposed and displayed on the measurement screen ms as illustrated in FIG. 27. In the selection setting window 314, a specifying mode setting button 315 and an element item setting button 316 are displayed so as to be arranged up and down in this order.

The specifying mode setting button 315 is a button for setting a specifying mode by the probe 200. The element item setting button 316 is a button for selecting a geometric element and a measurement item by the probe 200. One of the specifying mode setting button 315 and the element item setting button 316 (the specifying mode setting button 315 in this example) is surrounded by a cursor frame indicating the selection of the button. In the selection setting window 314 of FIG. 27, the cursor frame is indicated by a bold dotted line. The user U can move the cursor frame between the specifying mode setting button 315 and the element item setting button 316 by operating the up button and the down button of the probe operation unit 221.

In a case where the user U wants to select the specifying mode, the user U operates the up button and the down button to place the cursor frame on the specifying mode setting button 315. At this time, the trigger switch 221c of the probe operation unit 221 functions as the determination button. Thus, the user U operates the trigger switch 221c in the state in which the cursor frame is placed on the specifying mode setting button 315. In this case, the selection setting window 314 is changed to a specifying mode selection window that enables the user U to select either the first specifying mode or the second specifying mode.

Figure 28:
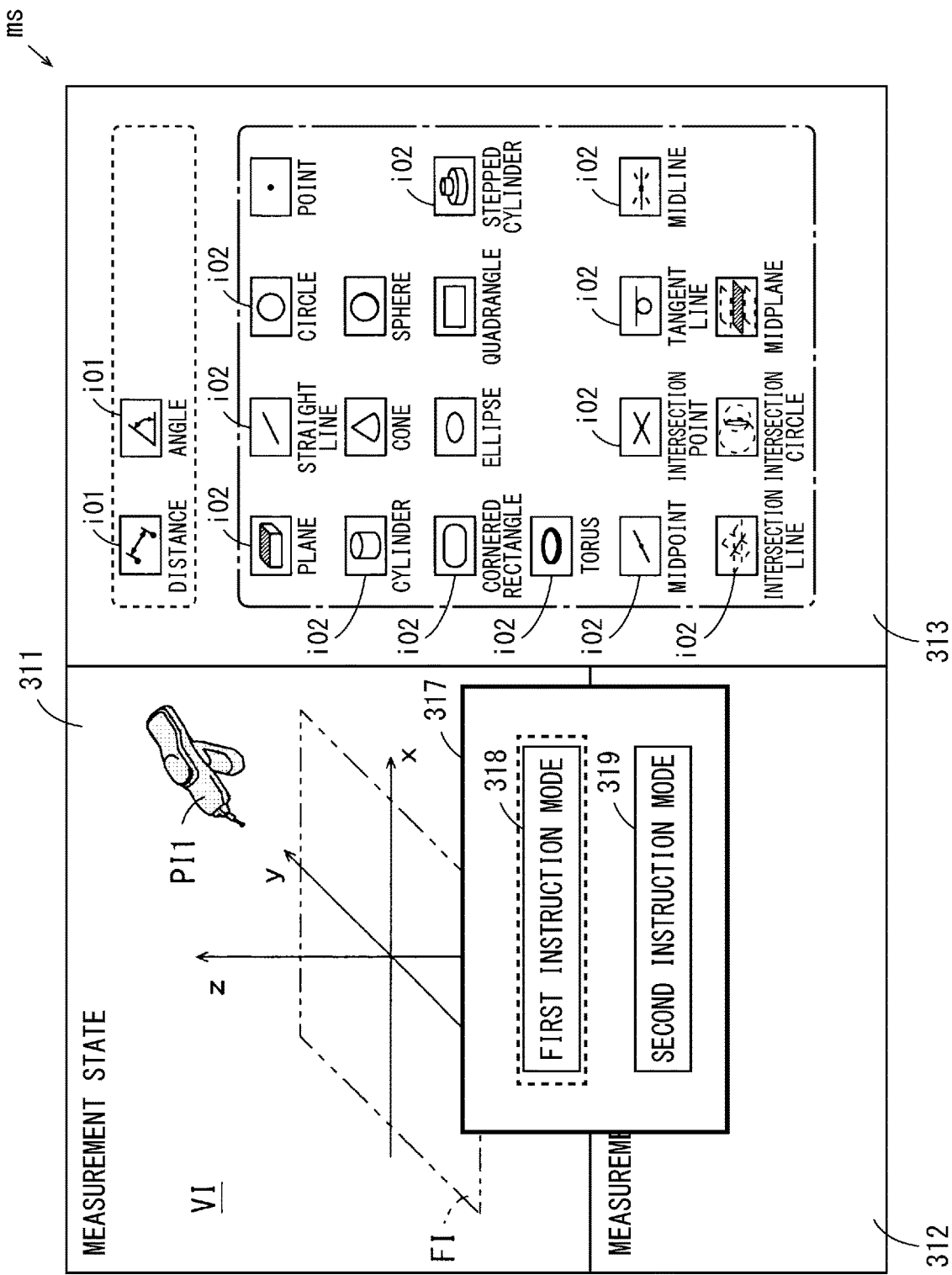
FIG. 28 is a view illustrating an example of a measurement screen on which a specifying mode selection window is displayed in a superimposed manner.

FIG. 28 is a view illustrating an example of the measurement screen ms on which the specifying mode selection window is displayed in a superimposed manner. In a specifying mode selection window 317 of FIG. 28, a first specifying mode button 318 and a second specifying mode button 319 are displayed so as to be arranged up and down in this order.

The first specifying mode button 318 is a button for setting the operating state of the main body control circuit 302 to the first specifying mode. The second specifying mode button 319 is a button for setting the operating state of the main body control circuit 302 to the second specifying mode. One of the first specifying mode button 318 and the second specifying mode button 319 (the first specifying mode button 318 in this example) is surrounded by a cursor frame indicating the selection of the button. In the specifying mode selection window 317 of FIG. 28, the cursor frame is indicated by a bold dotted line. The user U can move the cursor frame between the first specifying mode button 318 and the second specifying mode button 319 by operating the up button and the down button of the probe operation unit 221.

In a case where the user U wants to set the operating state of the main body control circuit 302 to the first specifying mode, the user U operates the up button and the down button to place the cursor frame on the first specifying mode button 318. At this time, the trigger switch 221c of the probe operation unit 221 functions as the determination button. Thus, the user U operates the trigger switch 221c in the state in which the cursor frame is placed on the first specifying mode button 318. As a result, the operating state of the main body control circuit 302 is set to the first specifying mode.

On the other hand, in a case where the user U wants to set the operating state of the main body control circuit 302 to the second specifying mode, the user U operates the up button and the down button to place the cursor frame on the second specifying mode button 319. Further, the user U operates the trigger switch 221c in the state in which the cursor frame is placed on the second specifying mode button 319. As a result, the operating state of the main body control circuit 302 is set to the second specifying mode.

In a case where the user U wants to select a geometric element and a measurement item, the user U operates the up button and the down button to place the cursor frame on the element item setting button 316 in the state in which the selection setting window 314 of FIG. 27 is displayed on the measurement screen ms of the main body display unit 310. At this time, the trigger switch 221c of the probe operation unit 221 functions as the determination button. Thus, the user U operates the trigger switch 221c in the state in which the cursor frame is placed on the element item setting button 316. In this case, the selection setting window 314 disappears from the measurement screen ms. In addition, it becomes possible to select a geometric element and a measurement item by the probe 200.

Figure 29:
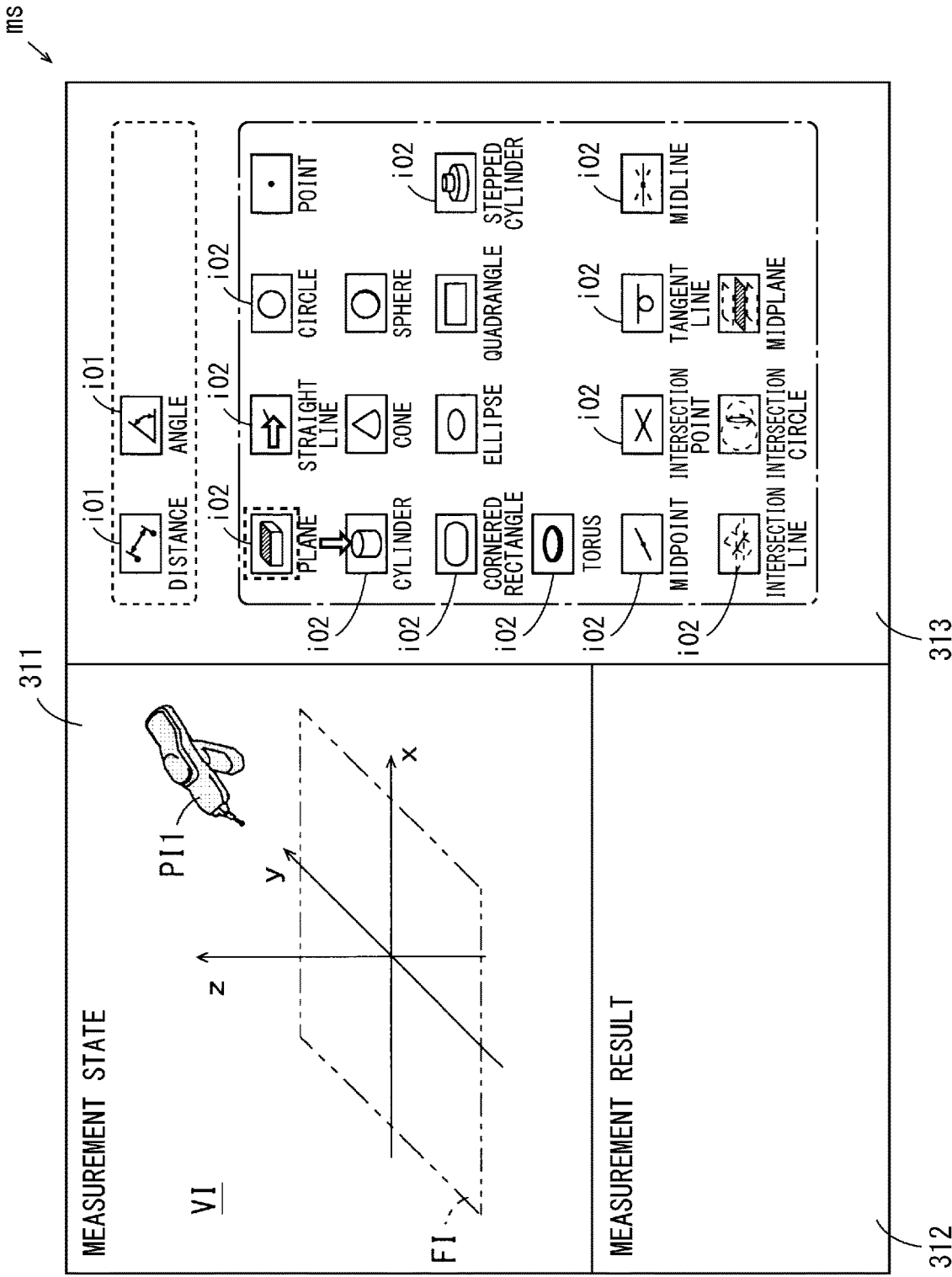
FIG. 29 is a view illustrating a display example of a measurement screen when selection of a geometric element and a measurement item by the probe becomes possible.

FIG. 29 is a view illustrating a display example of the measurement screen ms when selection of a geometric element and a measurement item by the probe 200 becomes possible. In a state in which the selection of the geometric element and the measurement item becomes possible, a cursor frame is displayed in the operation display area 313 of the measurement screen ms. The cursor frame displayed at this time surrounds any one of the plurality of item icons i01 and the plurality of element icons i02 displayed in the operation display area 313. In the operation display area 313 of FIG. 29, the cursor frame is indicated by a bold dotted line.

The user U can move the cursor frame among the plurality of item icons i01 and the plurality of element icons i02 as indicated by white arrows in FIG. 29 by operating the up button, the down button, the left button, and the right button of the probe operation unit 221. At this time, the trigger switch 221c of the probe operation unit 221 functions as the determination button. Thus, the user U operates the trigger switch 221c in a state in which the cursor frame is placed on an icon corresponding to a desired geometric element or a desired measurement item. As a result, the geometric element or the measurement item corresponding to the icon to which the cursor frame has been placed is selected.

In this manner, the user U can select the desired geometric element and the desired measurement item without using the main body operation unit 320 by operating the probe operation unit 221 of the probe 200.

A specific example will be described. For example, as described in the measurement example of the above-described item [5], the user U selects the item icon i01 corresponding to the geometric element "plane" by operating the probe operation unit 221 in a case where the user U wants to measure the distance between the first surface and the second surface of the measurement target S.

Thereafter, a measurement point is specified by bringing the contact part 211a into contact with a plurality of portions on the first surface of the measurement target S. As a result, element identifying information of a plane identified by the plurality of measurement points specified for the first surface is generated as, for example, "plane 1".

Figure 30:
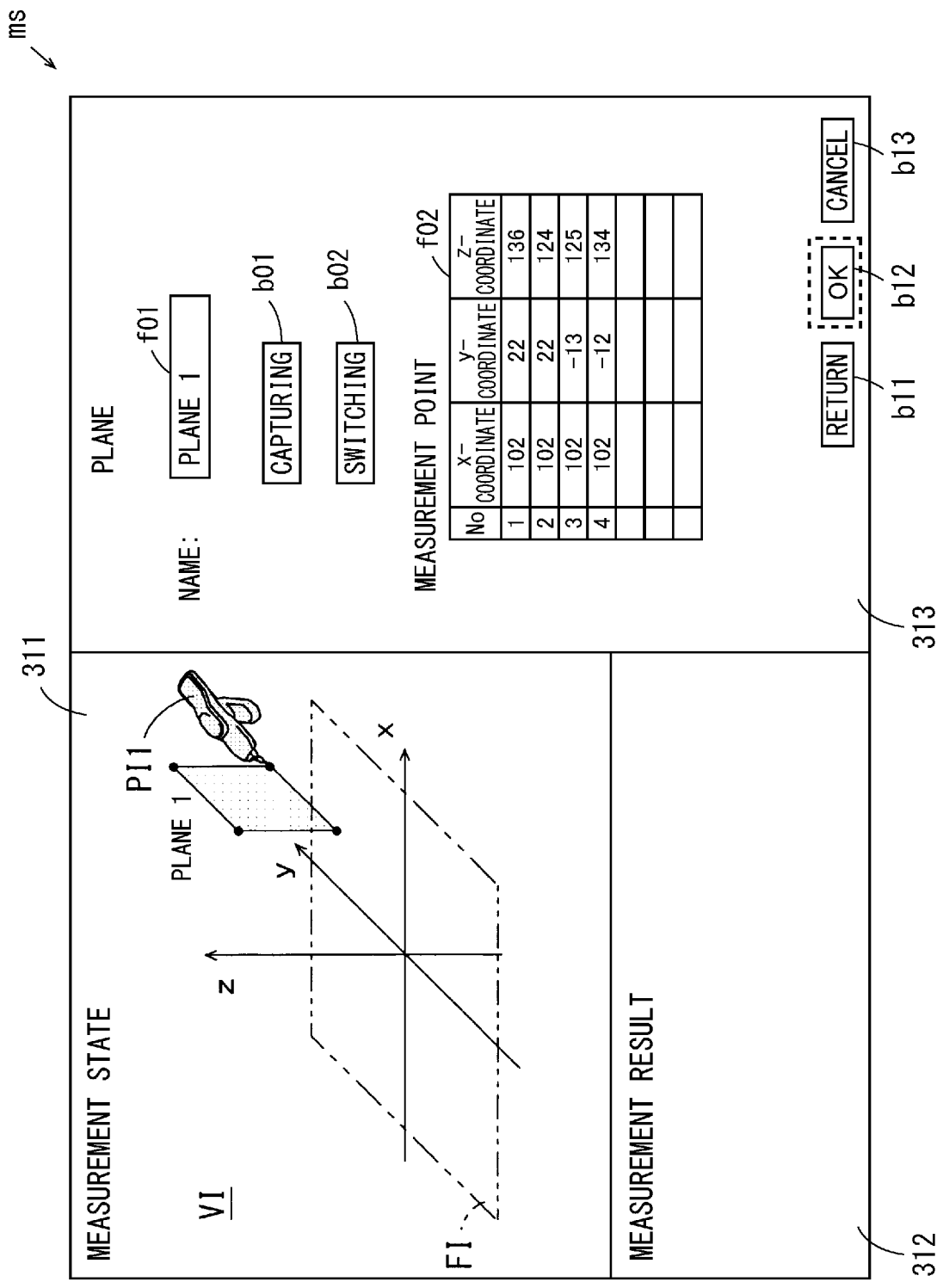
FIG. 30 is a view illustrating an example of a measurement screen when a plurality of measurement points are specified after the selection of the geometric element.

FIG. 30 is a view illustrating an example of the measurement screen ms when a plurality of measurement points are specified after selection of a geometric element. When the geometric element "plane" is selected as illustrated in FIG. 30, an element name field f01, a capturing button b01, a switching button b02, and a measurement point coordinate display field f02 are displayed in the operation display area 313 of the measurement screen ms.

In the element name field f01, a name for identifiably storing the element identifying information generated for the selected geometric element is displayed according to a predetermined method. In this example, "plane 1" is displayed.

The capturing button b01 is a button for capturing an image of the measurement target S by the probe camera 208 of FIG. 13 provided in the probe 200. When the capturing button b01 is operated, the probe camera 208 captures the image of the measurement target S. Image data obtained by the capturing is stored in the main body memory 303 as data of the captured image.

The switching button b02 is a button for switching an image displayed in the measurement state display area 311 between the measurement area virtual image VI and the captured image obtained by operating the capturing button b01. A specific display example of the captured image in the measurement state display area 311 will be described later. Note that, when a measurement point is specified on the measurement area virtual image VI or the captured image displayed in the measurement state display area 311, an index such as a black dot indicating a position of the coordinate of the specified measurement point is superimposed and displayed. Further, an image indicating the geometric element identified by the plurality of measurement points is superimposed and displayed.

The measurement point coordinate display field f02 is a display field for sequentially displaying coordinates of the measurement points acquired by the operation of specifying the measurement point. In this example, four measurement points are designated to set the first surface of the measurement target S as a measurement target portion. As a result, the coordinates of the four measurement points are displayed in the measurement point coordinate display field f02.

In the operation display area 313 of the measurement screen ms, a return button b11, an OK button b12, and a cancel button b13 are further displayed. The return button b11 is a button for returning a state of the three-dimensional coordinate measuring device 1 to a state in which the measurement screen ms in FIG. 26 or 27 is displayed on the main body display unit 310 so as to receive the operation of selecting a geometric element and a measurement item. The OK button b12 is a button for commanding the three-dimensional coordinate measuring device 1 that the designation of all the measurement points has been completed for the selected geometric element. Accordingly, element identifying information of the selected geometric element is generated based on the designated one or more measurement points. The cancel button b13 is a button for deleting information on the measurement point acquired by the operation of specifying the measurement point.

In a case where the screen operation function is activated, a cursor frame for selecting one of the plurality of buttons displayed in the operation display area 313 is displayed. In the example of FIG. 30, the cursor frame is indicated by a bold dotted line so as to surround the OK button b12. The user U can move the cursor frame among the capturing button b01, the switching button b02, the return button b11, the OK button b12, and the cancel button b13 by operating the up button, the down button, the left button, and the right button of the probe operation unit 221.

It is assumed that, for example, pieces of element identifying information corresponding to the first surface and the second surface of the measurement target S are generated by repeating the selection of the geometric element and the specifying of the measurement point on the measurement screen ms in FIG. 29. Further, it is assumed that element identifying information corresponding to another surface (third surface) of the measurement target S is generated.

After the pieces of element identifying information respectively corresponding to the first to third surfaces of the measurement target S are generated, the user U selects the measurement item "distance" on the measurement screen ms in FIG. 29 in order to measure the distance between the first surface and the second surface.

Figure 31:
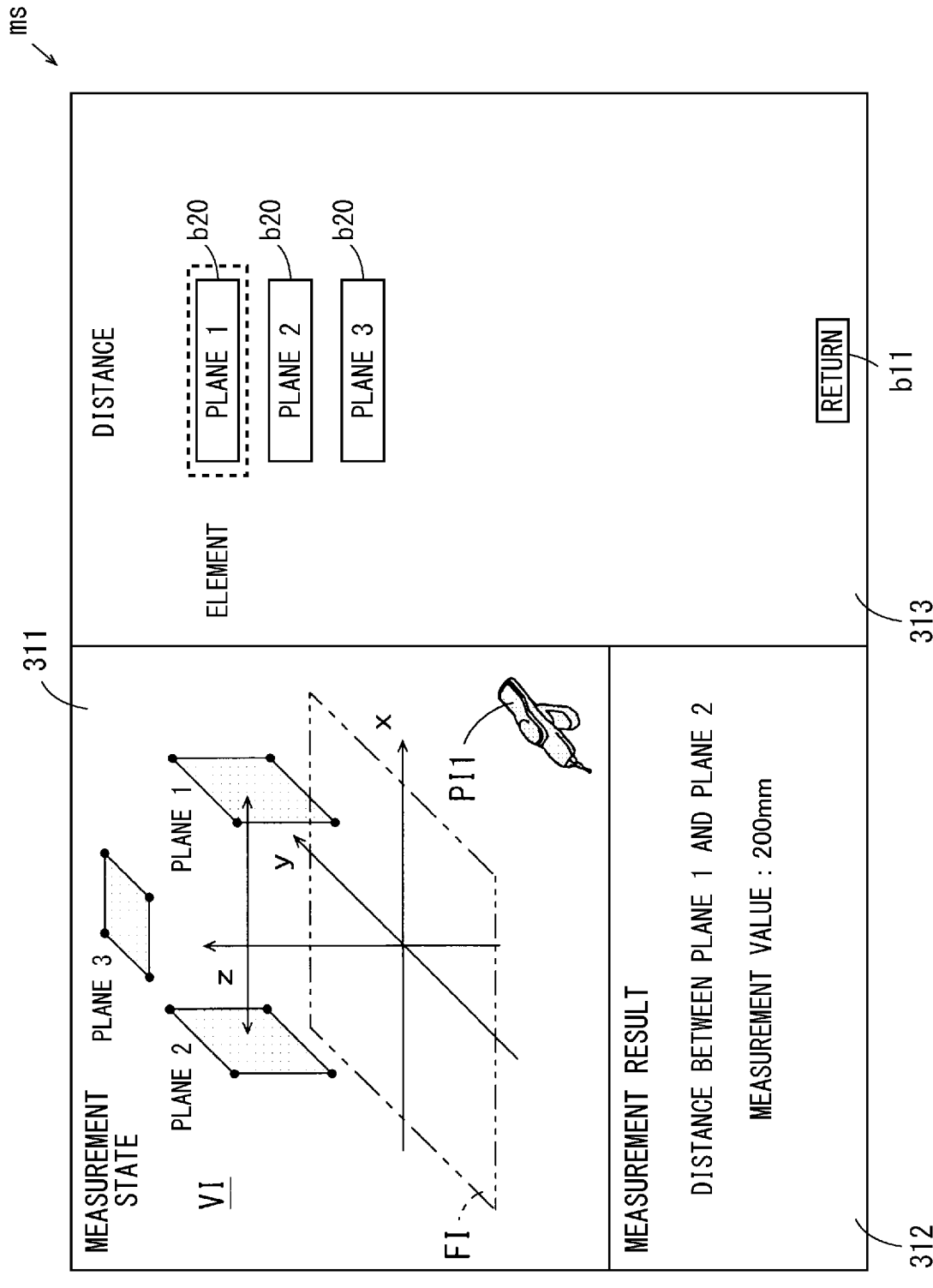
FIG. 31 is a view illustrating an example of a measurement screen after the selection of the measurement item.

FIG. 31 is a view illustrating an example of the measurement screen ms after the selection of the measurement item. In a case where the measurement item "distance" is selected after the generation of the pieces of element identifying information corresponding to the first to third surfaces, it is necessary to identify that this "distance" is the distance between the first surface and the second surface. Thus, three target buttons b20 representing the pieces of element identifying information corresponding to the first to third surfaces are displayed in the operation display area 313 in the example of FIG. 31. In addition, the return button b11 is displayed.

In a case where the screen operation function is activated, a cursor frame for selecting one of the plurality of buttons displayed in the operation display area 313 is displayed. In the example of FIG. 31, the cursor frame is indicated by a bold dotted line. The user U can move the cursor frame among the plurality of target buttons b20 and the plurality of return buttons b11 by operating the up button, the down button, the left button, and the right button of the probe operation unit 221. In addition, the user U can determine selection of a button on which the cursor frame has been placed by operating the trigger switch 221c of the probe operation unit 221. Thus, the user U designates "plane 1" corresponding to the element identifying information of the first plane and "plane 2" corresponding to the element identifying information of the second plane. As a result, the distance (measurement value) between the first surface and the second surface of the measurement target S is displayed on the measurement screen ms as illustrated in the result display area 312 of FIG. 31.

As described above, the screen operation function enables the user U to set the measurement condition of the measurement target S and specify the measurement point without using the main body operation unit 320 by operating the probe 200. As a result, the measurement efficiency of the measurement target S is improved.

(4) Switching of Image Displayed in Measurement State Display Area 311

As described above, the user U can operate the switching button b02 to display the captured image in the measurement state display area 311 when the image of the measurement target S has been captured using the probe camera 208 by operating the capturing button b01 in FIG. 30.

Figure 32:
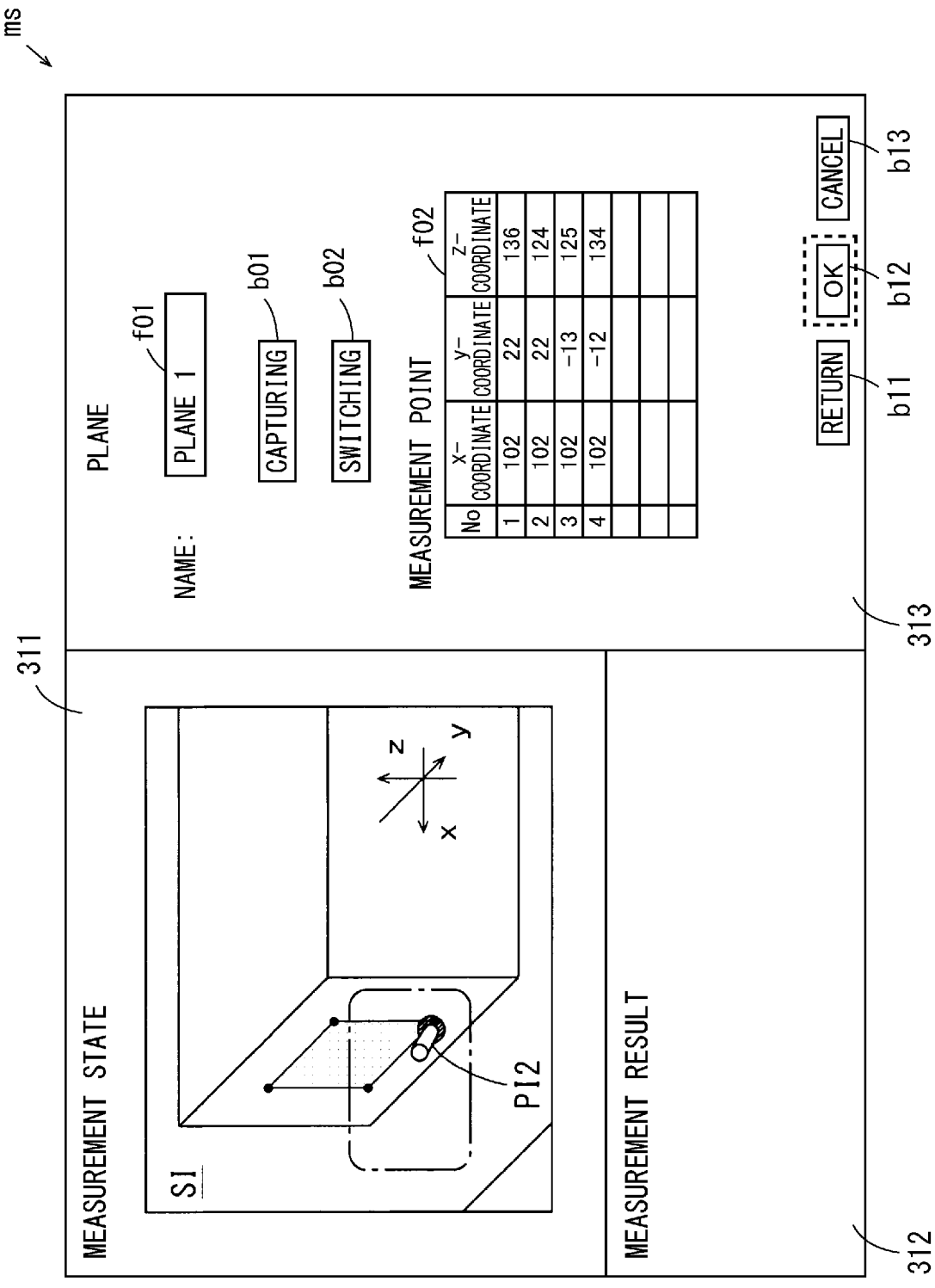
FIG. 32 is a view illustrating an example of a measurement screen when a captured image is displayed in a measurement state display area.

FIG. 32 is a view illustrating an example of the measurement screen ms when a captured image is displayed in the measurement state display area 311. In the example of FIG. 32, a captured image SI of the measurement target S is displayed in the measurement state display area 311. In addition, the x-axis, the y-axis, and the z-axis of the device coordinate system are superimposed and displayed on the captured image SI so as to correspond to a three-dimensional space indicated by the captured image SI based on the above-described imaging information. Further, a stylus image PI2 is superimposed and displayed on the captured image SI as an image corresponding to the probe image PI1 of FIG. 29. The stylus image PI2 represents positions and postures of the contact part 211a of the stylus 211 of the probe 200 and a portion in the vicinity of the contact part 211a.

When the image displayed in the measurement state display area 311 is switched from the measurement area virtual image VI to the captured image SI, the index indicating the position and posture of the probe 200 is switched between the probe image PI1 and the stylus image PI2.

The measurement area virtual image VI basically represents the entire measurable space, but does not include an image virtually representing the measurement target S itself. Thus, it is difficult for the user U to grasp the position and posture of the measurement target S in the device coordinate system even by referring to the measurement area virtual image VI. In the present embodiment, the probe image PI1 illustrating the entire probe 200 is displayed when the measurement area virtual image VI is displayed in the measurement state display area 311. Accordingly, the user U can easily recognize whether or not the position and posture of the probe 200 are within a measurable range of the measurement target S in the three-dimensional coordinate measuring device 1 based on the contents displayed in the measurement state display area 311.

Here, a case is assumed in which the user U captures an image and specifies a measurement point at a fixed position with respect to the measurement target S. As described above, the probe camera 208 is attached to the front end part 251 (FIG. 14) of the main body section 250 in the probe 200 according to the present embodiment. The imaging field of view of the probe camera 208 is directed in the first direction dr1. Thus, when the user U captures an image of the measurement target S using the probe camera 208 in the above case, it is considered that the captured image SI obtained by the capturing includes an image of a portion of the measurement target S that is to be specified as the measurement point.

When the probe image PI1 indicating the entire probe 200 is superimposed and displayed on the captured image SI obtained by the capturing, there is a high possibility that at least a part of the probe image PI1 overlaps with the image of the portion of the measurement target S that is to be specified as the measurement point. In FIG. 32, a display range of the probe image PI1 assumed in the case where the probe image PI1 is superimposed and displayed on the captured image SI is indicated by a one-dot chain line frame. In this case, it is difficult for the user U to recognize an image of a desired portion of the measurement target S even if visually recognizing the captured image SI. Thus, the stylus image PI2 indicating only a part of the stylus 211 is superimposed and displayed on the captured image SI when the captured image SI is displayed in the measurement state display area 311 in the present embodiment. Accordingly, the overlap of the image of the probe 200 (particularly, the image of the main body section 250) with most of the captured image SI is reduced. Accordingly, the user U can easily grasp which position and posture the probe 200 (stylus 211) is arranged at with respect to the measurement target S by visually recognizing the image displayed in the measurement state display area 311. Therefore, the user U can specify the measurement point with high accuracy for the desired portion of the measurement target S while visually recognizing the surface of the measurement target S with the naked eye and visually recognizing the captured image SI displayed in the measurement state display area 311.

In the probe 200 according to the present embodiment, the posture of the grip section 230 with respect to the main body section 250 is switched in a plurality of stages. As a result, the degree of freedom of the position and posture of the user U with respect to the measurement target S is expanded. Thus, the measurable range of the portion of the measurement target S by the probe camera 208 is also expanded. In this case, the image (stylus image PI2) of the tip of the stylus 211 is displayed to be compact on the captured image SI, and thus, a decrease in the visibility of a measurement site in the captured image SI is suppressed as the degree of freedom of the position and posture of the probe 200 that can be arranged with respect to the measurement target S is improved.

Figure 33:
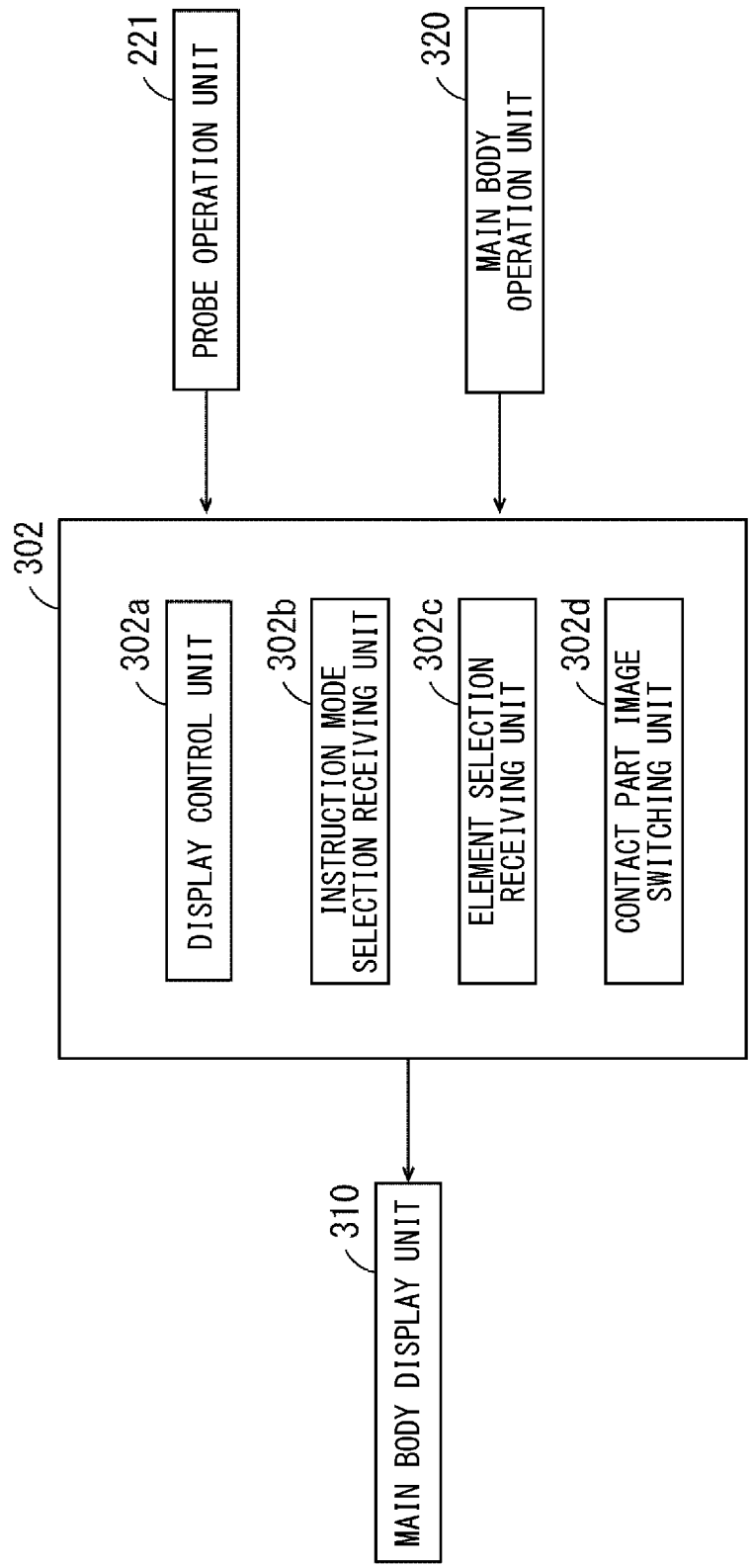
FIG. 33 is a block diagram illustrating a functional configuration of the main body control circuit related to an operation for measurement.

(5) Functional Configuration of Main Body Control Circuit 302 Related to Operation for Measurement FIG. 33 is a block diagram illustrating a functional configuration of the main body control circuit 302 related to an operation for measurement. As illustrated in FIG. 33, the main body control circuit 302 includes a display control unit 302a, a specifying mode selection receiving unit 302b, an element selection receiving unit 302c, and a contact part image switching unit 302d as functional configurations related to the operation for measurement. In this example, an operation program corresponding to the screen operation function is stored in the main body memory 303, in addition to the system program, the measurement processing program, and the tracking processing program described above. As a result, the respective functional units illustrated in FIG. 33 are implemented as the CPU of the main body control circuit 302 executes the operation program stored in the main body memory 303.

The display control unit 302a causes the main body display unit 310 to display the measurement screen ms (FIGS. 28 to 32) including the measurement state display area 311, the result display area 312, and the operation display area 313 in response to an operation of the probe operation unit 221 or the main body operation unit 320 by the user U.

The specifying mode selection receiving unit 302b receives a command regarding any of the first and second specifying modes to which the operating state of the main body control circuit 302 is to be set in response to an operation of the probe operation unit 221 or the main body operation unit 320 by the user U.

The element selection receiving unit 302c receives selection of geometric elements or measurement items corresponding to the plurality of item icons i01 and the plurality of element icons i02 displayed in the operation display area 313 in response to an operation of the probe operation unit 221 or the main body operation unit 320 by the user U.

The contact part image switching unit 302d receives switching of an image displayed in the measurement state display area 311 in response to an operation of the probe operation unit 221 or the main body operation unit 320 by the user U in a state in which data of a captured image is stored in the main body memory 303. In addition, the contact part image switching unit 302d displays the received image in the measurement state display area 311. Further, when the measurement area virtual image VI is displayed in the measurement state display area 311, the contact part image switching unit 302d superimposes and displays the probe image PI1 on the measurement area virtual image VI. On the other hand, when the captured image SI is displayed in the measurement state display area 311, the contact part image switching unit 302d superimposes and displays the stylus image PI2 on the captured image SI.

2. Second Embodiment

Figure 34:
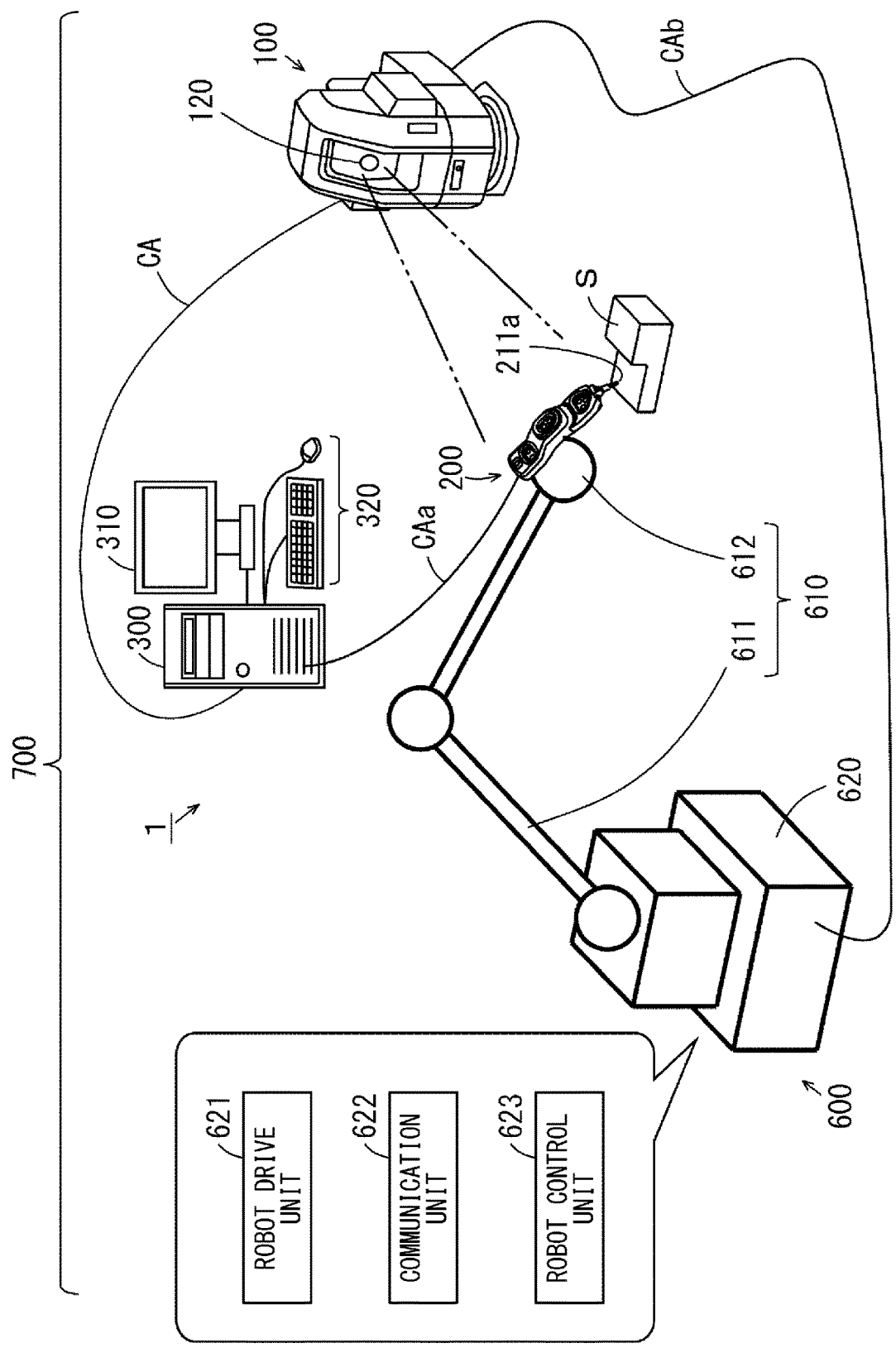
FIG. 34 is a schematic view illustrating a configuration example of a three-dimensional coordinate measuring system according to a second embodiment.

FIG. 34 is a schematic view illustrating a configuration example of a three-dimensional coordinate measuring system according to a second embodiment. As illustrated in FIG. 34, a three-dimensional coordinate measuring system 700 according to the present embodiment includes a probe operation robot 600 in addition to the three-dimensional coordinate measuring device 1 according to the first embodiment. Note that FIG. 34 does not illustrate a reference stand 900 for fixing the imaging head 100 onto a floor surface.

In the three-dimensional coordinate measuring system 700, the imaging head 100 is arranged such that an imaging field of view of the movable camera 120 at least covers the measurement target S placed on the floor surface and a peripheral area of the measurement target S, for example.

The probe operation robot 600 includes a robot operating section 610 and a robot main body section 620. The robot operating section 610 mainly includes an articulated arm 611 and a probe gripping mechanism 612. The articulated arm 611 extends from the robot main body section 620. The probe gripping mechanism 612 is provided at a tip of the articulated arm 611. The probe gripping mechanism 612 is connected to the probe 200.

Figure 35:
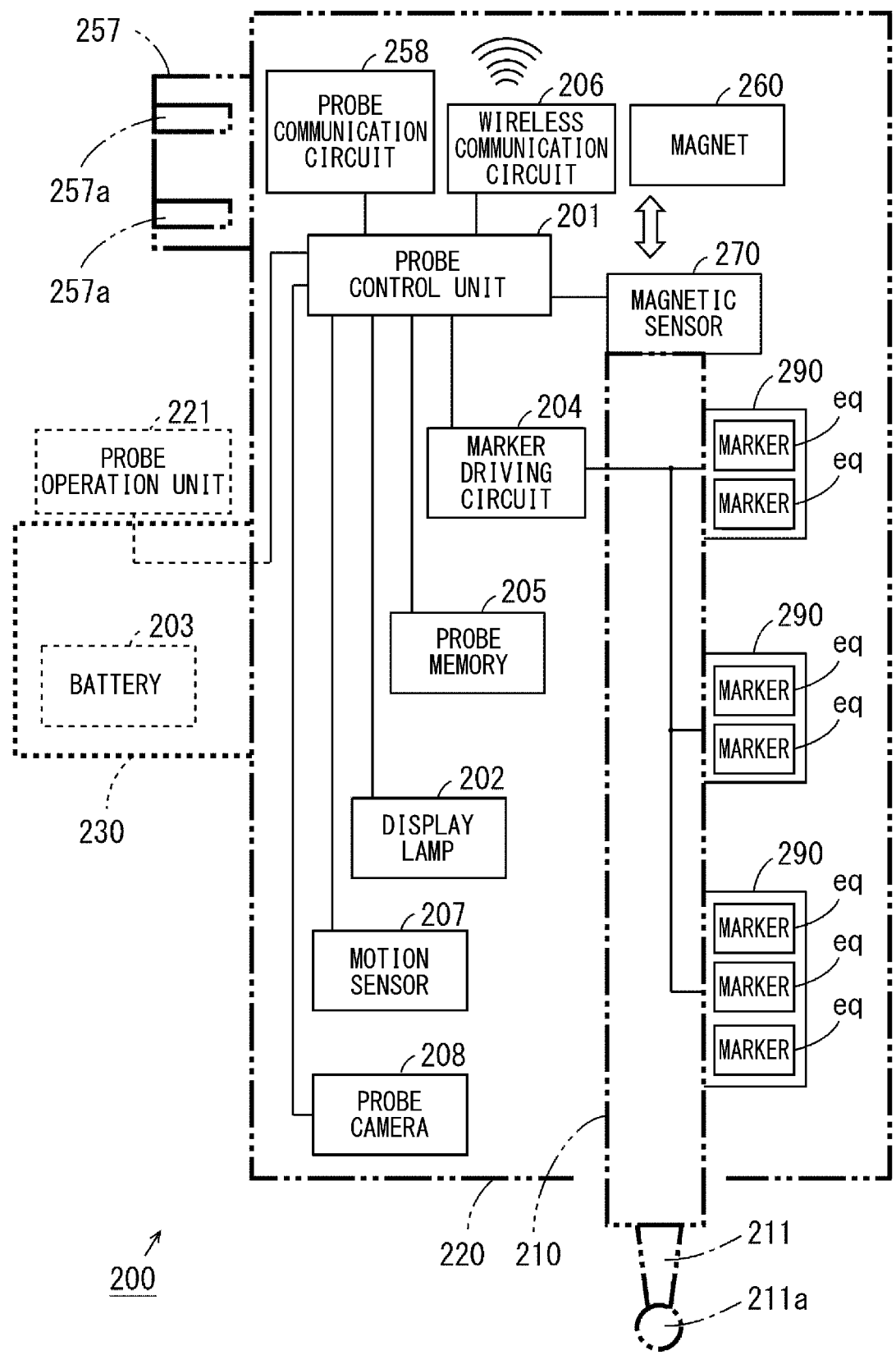
FIG. 35 is a block diagram illustrating a basic configuration of a probe of FIG. 34.

FIG. 35 is a block diagram illustrating a basic configuration of the probe 200 of FIG. 34. As illustrated in FIG. 35, a robot connecting part 257 is connected to the probe casing 220 in the present embodiment. The robot connecting part 257 is provided with a fixing element 257a for fixing the probe gripping mechanism 612 and the robot connecting part 257. The fixing element 257a is, for example, a female screw, and the probe gripping mechanism 612 and the robot connecting part 257 are fixed with the screw. In addition, the user U does not carry the probe 200 in the present embodiment, and thus, the grip section 230 is preferably attachable to and detachable from the probe casing 220. In the example of FIG. 34, the probe 200 is illustrated in a state in which the grip section 230 has been removed from the probe casing 220. In a case where the grip section 230 is not removed from the probe casing 220, the grip section 230 and the robot connecting part 257 are preferably arranged such that at least the grip section 230 does not interfere with the fixation between the probe gripping mechanism 612 and the robot connecting part 257. In addition, the grip section 230 may rotate about the rotational axis RA (FIG. 14 and the like) to move to a position that does not interfere with the fixation between the robot connecting part 257 and the probe gripping mechanism.

In addition, the probe 200 of the present embodiment includes a probe communication circuit 258 accommodated in the probe casing 220. As illustrated in FIG. 34, the probe 200 and the processing device 300 are connected by a cable CAa for communication. The probe 200 and the processing device 300 communicate with each other through the probe communication circuit 258 and the cable CAa. A contact trigger output from the probe control unit 201 is transmitted from the probe communication circuit 258 to the processing device 300 through the cable CAa. The cable CAa is, for example, a universal serial bus (USB) cable. In a case where the grip section 230 is removed from the probe casing 220, power may be supplied to the probe 200 through the cable CAa.

As illustrated in a balloon of FIG. 34, the robot main body section 620 incorporates a robot drive unit 621, a communication unit 622, and a robot control unit 623. The robot drive unit 621 includes a plurality of motors and the like, and drives the articulated arm 611. The robot control unit 623 includes, for example, a CPU and a memory, or a microcomputer, and controls the robot drive unit 621. The robot main body section 620 is connected to the imaging head 100 through a cable CAb for communication. The robot control unit 623 can exchange various types of data with the imaging head 100, the probe 200, and the processing device 300 through the communication unit 622 and the cable CAb.

An encoder (not illustrated) is provided in each of joint portions of the articulated arm 611. The robot control unit 623 controls the robot drive unit 621 based on, for example, predetermined coordinate information on the measurement target S and an output of the encoder of each of the joint portions of the articulated arm 611. As a result, for example, the contact part 211a of the probe 200 is brought into contact with a desired portion of the measurement target S.

Figure 36:
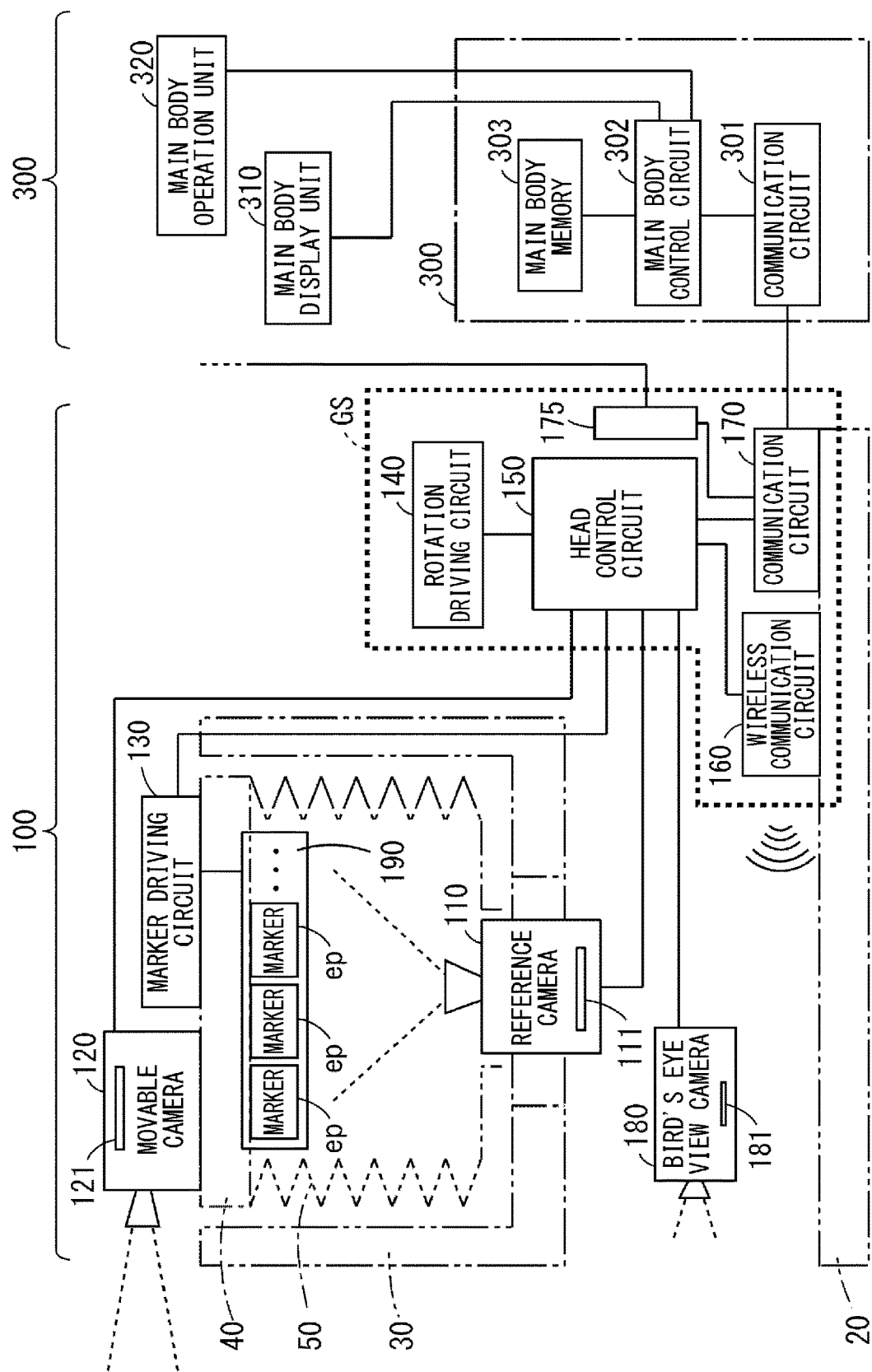
FIG. 36 is a block diagram illustrating configurations of an imaging head and a processing device of FIG. 34.

FIG. 36 is a block diagram illustrating configurations of the imaging head 100 and the processing device 300 in FIG. 34. As illustrated in FIG. 36, the imaging head 100 includes an external I/O 175 that is connected to the communication circuit 170 to output a signal to an external device. The external I/O 175 is, for example, a terminal block to which the cable CAb of FIG. 34 is connected. Examples of a signal output from the external I/O 175 to the robot control unit 623 through the cable CAb include a signal based on the contact trigger output from the probe 200. According to this configuration, a binary signal having a high output and a low output is output from the imaging head 100 to the robot control unit 623, and thus, the imaging head 100 can output a signal obtained by associating the contact trigger output from the probe 200 with rising or falling of the binary signal to the robot control unit 623. Therefore, according to the imaging head 100 of the present embodiment, it is possible to construct the three-dimensional coordinate measuring system 700 having high responsiveness in the control of the robot drive unit 621 by the robot control unit 623.

As described above, the contact trigger output from the probe 200 is transmitted to the processing device 300 through the cable CAa. Further, the contact trigger or the signal based on the contact trigger is transmitted from the processing device 300 to the probe operation robot 600 through the cable CA, the imaging head 100, and the cable CAb. In this case, the robot control unit 623 controls the robot drive unit 621 such that the operation of the robot operating section 610 is temporarily stopped in response to the contact trigger output from the probe 200. Further, the main body control circuit 302 of the processing device 300 gives a command for light emission of the plurality of markers eq (FIG. 14) and ep (FIG. 10B) of the probe 200 and the imaging head 100 in response to the contact trigger.

According to the above operation, an image of the plurality of markers eq (FIG. 14) of the probe 200 is captured by the movable camera 120 of the imaging head 100 in a state in which the probe 200 in contact with the measurement target S is temporarily stopped. Therefore, coordinates of a measurement point specified by the probe 200 can be calculated with high accuracy.

Note that displacement amount data may be transmitted from the probe 200 to the probe operation robot 600, instead of the contact trigger. In this case, for example, the robot control unit 623 may execute processing (FIG. 24) similar to steps S203, S204, S207, and S208 in the contact trigger output processing to determine that the contact part 211a of the probe 200 appropriately comes into contact with the measurement target S. Then, the robot control unit 623 may control the robot drive unit 621 such that the operation of the robot operating section 610 is temporarily stopped when determining that the contact part 211a appropriately comes into contact with the measurement target S.

In the three-dimensional coordinate measuring system 700, the probe operation robot 600 operates based on the contact trigger or displacement amount data output from the probe 200 so as not to cause excessive distortion in the stylus 211 and the probe holding unit 210. More specifically, it is determined in step S208 that a difference between a magnetic reference value appropriately updated based on the determination in each step and displacement amount data at the current time point is equal to or smaller than the fourth threshold, and thus, the excessive distortion hardly occurs in the stylus 211 and the probe holding unit 210. In addition, a timing for specifying a measurement point is appropriately determined. As a result, coordinates of the measurement point specified by the probe operation robot 600 are calculated with high accuracy.

3. Other Embodiments (1) Although the magnet 260 and the magnetic sensor 270 are provided in the probe 200 in order to detect the displacement amount of the probe holding unit 210 with respect to the probe casing 220 in the above embodiment, the present invention is not limited thereto. The probe 200 may be provided with another configuration capable of detecting the displacement amount between the probe casing 220 and the probe holding unit 210, instead of the magnet 260 and the magnetic sensor 270. As such a configuration, for example, an optical sensor or an ultrasonic sensor capable of measuring the displacement amount can be used.

(2) Although the output of the motion sensor 207 is used to determine whether the states of the motion and posture of the probe 200 are in states appropriate for specifying a measurement point in steps S202 and S205 of the contact trigger output processing in the above embodiment, the present invention is not limited to the above example. Whether or not the states of the motion and posture of the probe 200 are in the states appropriate for specifying a measurement point may be determined, for example, based on the movement speed and the change in the positional relationship of the plurality of markers eq of the probe 200 continuously captured using the movable camera 120 or the bird's eye view camera 180.

(3) Although the contact trigger output processing is executed by the probe control unit 201 of the probe 200 in the above embodiment, the present invention is not limited thereto. In the probe 200, the motion data and posture data obtained by the motion sensor 207 may be transmitted to the processing device 300 through the imaging head 100. In addition, the displacement amount data obtained by the magnetic sensor 270 may be transmitted to the processing device 300 through the imaging head 100. In these cases, the main body control circuit 302 of the processing device 300 may execute the contact trigger output processing based on the motion data, the posture data, and the displacement amount data given from the probe 200. Alternatively, the above-described contact trigger output processing may be executed by the head control circuit 150 of the imaging head 100 instead of the probe control unit 201 of the probe 200.

(4) Although the magnetic sensor 270 is fixed to the probe holding unit 210 and the magnet 260 is fixed to the probe casing 220 in the probe 200 according to the above embodiment, the present invention is not limited thereto. The magnet 260 may be fixed to the probe holding unit 210, and the magnetic sensor 270 may be fixed to the probe casing 220.

(5) Although a currently selected button among the plurality of buttons, which are targets to be selected by the probe operation unit 221, is surrounded by the cursor frame in each of the display examples of the measurement screen ms illustrated in FIGS. 27 to 32, the present invention is not limited thereto. The button currently selected by the probe operation unit 221 may be displayed so as to be distinguishable from other unselected buttons. For example, the currently selected button may be displayed in a display mode different from those of the other buttons by highlight display, emphasis display, or the like instead of adding the cursor frame or in addition to adding the cursor frame.

(6) Although the captured image SI is displayed in the measurement state display area 311 by operating the capturing button b01 and the switching button b02 displayed in FIG. 30 in the above embodiment, the present invention is not limited thereto. In the measurement state display area 311, an image (hereinafter, referred to as an existing data image) based on existing dimension data such as computer-aided design (CAD) data may be displayed instead of the measurement area virtual image VI and the captured image SI or in addition to the measurement area virtual image VI and the captured image SI. When the existing data image is displayed in the measurement state display area 311, the stylus image PI2 may be displayed on the existing data image in addition to the x-axis, the y-axis, and the z-axis of the device coordinate system.

(7) Although the stylus image PI2 of FIG. 32 is superimposed and displayed on the captured image SI so as to include the image of the contact part 211a of the stylus 211 and the peripheral portion of the contact part 211a, the present invention is not limited thereto. The stylus image PI2 may be superimposed and displayed on the captured image SI so as to include only the image of the portion of the contact part 211a.

(8) In each of the display examples of the measurement screen ms illustrated in FIGS. 26 to 31, a scale of the measurement area virtual image VI displayed in the measurement state display area 311 (a range of a space on the device coordinate system represented by the measurement area virtual image VI) may be changeable. In this case, either the probe image PI1 or the stylus image PI2 may be selectively superimposed and displayed on the measurement area virtual image VI according to a size of the space represented by the measurement area virtual image VI.

(9) Although the probe operation unit 221 of the probe 200 includes the four push buttons 221b arranged in a cross shape on the operation surface 221a in the above embodiment, the present invention is not limited thereto. On the operation surface 221a of the probe operation unit 221, another pointing devices such as a track ball or a pointing stick that can be operated by the user U while gripping the grip section 230 may be provided instead of the four push buttons 221b or in addition to the four push buttons 221b.

4. Correspondence Relationship Between Each Constituent Element of Claims and Each Unit of Embodiments Hereinafter, an example of the correspondence between each constituent element of the claims and each unit of the embodiments will be described, but the present invention is not limited to the following example.

In the above embodiment, the three-dimensional coordinate measuring device 1 is an example of a three-dimensional coordinate measuring device, the probe 200 is an example of a probe, the plurality of markers eq of the probe 200 are examples of a plurality of measurement markers, the movable camera 120 is an example of an imaging unit, the probe holding unit 210 is an example of a holding unit, the contact part 211a is an example of a contact part, the stylus 211 is an example of a stylus, the probe casing 220 is an example of a probe casing, the plurality of rubber bushings rb are examples of an elastic body, and the magnet 260 and the magnetic sensor 270 are examples of a displacement sensor.

In addition, the contact trigger is an example of a trigger signal, the magnetic reference value is an example of a reference displacement amount, the probe control unit 201 is an example of a probe control unit and a condition setting unit, the range from the third threshold to the fourth threshold is an example of a predetermined allowable range, the motion sensor 207 is an example of a motion detection unit and a posture detection unit, the magnetic sensor 270 is an example of a magnetic sensor, the grip section 230 is an example of a grip section, the main body control circuit 302 is an example of a calculation unit, the robot operating section 610 and the robot drive unit 621 are examples of a robot, the robot control unit 623 is an example of a robot control unit, and the three-dimensional coordinate measuring system 700 is an example of a three-dimensional coordinate measuring system.

Various other elements having the configurations or functions described in the claims can be used as the respective constituent elements of the claims

What is claimed is:

1. A probe for a three-dimensional coordinate measuring device,
   the probe being used in a three-dimensional coordinate measuring device that calculates coordinates of a measurement point in a measurement target based on a plurality of measurement markers whose image has been captured by an imaging unit, the probe for a three-dimensional coordinate measuring device comprising:
a probe holding unit that holds the plurality of measurement markers;
a stylus that includes a contact part and is attached to the probe holding unit with a predetermined positional relationship with respect to the plurality of measurement markers, wherein the contact part is brought into contact with the measurement target to specify the measurement point;
a probe casing that accommodates at least a part of the probe holding unit so as to enable capturing of an image of the plurality of measurement markers from an outside;
an elastic body that is accommodated in the probe casing and arranged between the probe casing and the probe holding unit so as to enable the probe holding unit to be displaced with respect to the probe casing in accordance with the contact between the stylus and the measurement target; and
a displacement sensor that is accommodated in the probe casing and outputs a signal corresponding to a displacement amount of the probe holding unit with respect to the probe casing as a signal related to the contact between the stylus and the measurement target.

2. The probe for a three-dimensional coordinate measuring device according to claim 1, further comprising
a probe control unit that outputs a trigger signal to permit a start of processing for calculating the coordinates of the specified measurement point in a case where a predetermined reference condition for the displacement amount corresponding to the signal output from the displacement sensor is satisfied when the measurement point is specified.

3. The probe for a three-dimensional coordinate measuring device according to claim 2, further comprising
a condition setting unit that sets the reference condition, wherein the reference condition is that a difference between the displacement amount corresponding to the signal output from the displacement sensor and a reference displacement amount is within a predetermined allowable range, and
the condition setting unit sets a displacement amount corresponding to a signal output from the displacement sensor at one time point as the reference displacement amount, and updates the reference displacement amount with a displacement amount corresponding to a signal output from the displacement sensor after a predetermined time has elapsed from the one time point.

4. The probe for a three-dimensional coordinate measuring device according to claim 2, further comprising
a motion detection unit that detects a motion of the probe casing,
wherein the probe control unit outputs the trigger signal in a case where a motion amount per unit time detected by the motion detection unit is equal to or smaller than a first threshold, and does not output the trigger signal in a case where the motion amount per unit time detected by the motion detection unit is larger than the first threshold.

5. The probe for a three-dimensional coordinate measuring device according to claim 4, further comprising
a posture detection unit that detects a posture of the probe casing,
wherein the probe control unit outputs the trigger signal in a case where a change amount of the posture per unit time detected by the posture detection unit is equal to or smaller than a second threshold, and does not output the trigger signal in a case where the change amount of the posture per unit time detected by the posture detection unit is larger than the second threshold.

6. The probe for a three-dimensional coordinate measuring device according to claim 1, wherein
the displacement sensor includes a magnetic sensor.

7. The probe for a three-dimensional coordinate measuring device according to claim 1, wherein
a grip section that is grippable by a user is connected to the probe casing.

8. A three-dimensional coordinate measuring device comprising:
the probe for a three-dimensional coordinate measuring device according to claim 1;
an imaging unit that captures an image of the plurality of measurement markers of the probe based on an output signal of the displacement sensor; and
a calculation unit that calculates coordinates of the measurement point specified by the contact part based on image data indicating the image of the plurality of measurement markers captured by the imaging unit.

9. A three-dimensional coordinate measuring system comprising:
a three-dimensional coordinate measuring device that calculates coordinates of a measurement point in a measurement target based on a plurality of measurement markers whose image has been captured by an imaging unit;
a probe including the plurality of measurement markers;
a robot configured to be capable of moving while holding the probe; and
a robot control unit,
wherein the probe includes:
a probe holding unit that holds the plurality of measurement markers;
a stylus that includes a contact part, which is brought into contact with the measurement target to specify the measurement point, and is attached to the probe holding unit with a predetermined positional relationship with respect to the plurality of measurement markers;
a probe casing that is held by the robot and accommodates at least a part of the probe holding unit so as to enable capturing of an image of the plurality of measurement markers from an outside;
an elastic body that is accommodated in the probe casing and arranged between the probe casing and the probe holding unit so as to enable the probe holding unit to be displaced with respect to the probe casing in accordance with the contact between the stylus and the measurement target;
a displacement sensor that is accommodated in the probe casing and outputs a signal corresponding to a displacement amount of the probe holding unit with respect to the probe casing as a signal related to the contact between the stylus and the measurement target; and
a probe control unit that outputs a trigger signal to permit a start of processing for calculating the coordinates of the specified measurement point in a case where a predetermined reference condition for the displacement amount corresponding to the signal output from the displacement sensor is satisfied when the measurement point is specified, the robot control unit controls an operation of the robot based on an output of the displacement sensor, and the three-dimensional coordinate measuring device includes:

the imaging unit that captures an image of the plurality of measurement markers of the probe in a case where the trigger signal is output from the probe control unit; and a calculation unit that calculates the coordinates of the measurement point specified by the contact part based on image data indicating the image of the plurality of measurement markers captured by the imaging unit.

10. A three-dimensional coordinate measuring method for calculating coordinates of a measurement point in a measurement target using a probe, the probe including:

a probe holding unit that holds a plurality of measurement markers;

a stylus that includes a contact part, which is brought into contact with the measurement target to specify the measurement point, and is attached to the probe holding unit with a predetermined positional relationship with respect to the plurality of measurement markers;

a probe casing that accommodates at least a part of the probe holding unit so as to enable capturing of an image of the plurality of measurement markers from an outside;

an elastic body that is accommodated in the probe casing and arranged between the probe casing and the probe holding unit so as to enable the probe holding unit to be displaced with respect to the probe casing in accordance with the contact between the stylus and the measurement target; and a displacement sensor that is accommodated in the probe casing and outputs a signal corresponding to a displacement amount of the probe holding unit with respect to the probe casing as a signal related to the contact between the stylus and the measurement target, the three-dimensional coordinate measuring method comprising:

a step of outputting a trigger signal to permit a start of processing for calculating the coordinates of the specified measurement point in a case where a predetermined reference condition for the displacement amount corresponding to the signal output from the displacement sensor is satisfied when the measurement point is specified; and a step of capturing an image of the plurality of measurement markers in response to the output of the trigger signal and calculating the coordinates of the measurement point specified by the contact part based on image data indicating the captured image of the plurality of measurement markers.

11. The three-dimensional coordinate measuring method according to claim 10, further comprising a step of setting the reference condition, wherein the reference condition is that a difference between the displacement amount corresponding to the signal output from the displacement sensor and a reference displacement amount is within a predetermined allowable range, and the step of setting the reference condition includes setting a displacement amount corresponding to a signal output from the displacement sensor at one time point as the reference displacement amount, and updating the reference displacement amount with a displacement amount corresponding to a signal output from the displacement sensor after a predetermined time has elapsed from the one time point.

12. The three-dimensional coordinate measuring method according to claim 10, further comprising a step of detecting a motion of the probe casing, wherein the step of outputting the trigger signal is performed in a case where a motion amount per unit time detected in the step of detecting the motion is equal to or smaller than a first threshold, and is not performed in a case where the motion amount per unit time detected in the step of detecting the motion is larger than the first threshold.

13. The three-dimensional coordinate measuring method according to claim 12, further comprising a step of detecting a posture of the probe casing, wherein the step of outputting the trigger signal is performed in a case where a change amount of the posture per unit time detected in the step of detecting the posture is equal to or smaller than a second threshold, and is not performed in a case where the change amount of the posture per unit time detected in the step of detecting the posture is larger than the second threshold.

* * * * *